US008966996B2

(12) United States Patent
Okada et al.

(10) Patent No.: US 8,966,996 B2
(45) Date of Patent: Mar. 3, 2015

(54) FORCE SENSOR

(75) Inventors: Kazuhiro Okada, Saitama (JP);
Nobuhisa Nishioki, Saitama (JP)

(73) Assignee: Tri-Force Management Corporation, Ageo-Shi, Saitama (JP)

( * ) Notice: Subject to any disclaimer, the term of this patent is extended or adjusted under 35 U.S.C. 154(b) by 0 days.

(21) Appl. No.: 13/984,364

(22) PCT Filed: Jul. 27, 2011

(86) PCT No.: PCT/JP2011/067714
§ 371 (c)(1),
(2), (4) Date: Aug. 8, 2013

(87) PCT Pub. No.: WO2013/014803
PCT Pub. Date: Jan. 31, 2013

(65) Prior Publication Data
US 2013/0319135 A1    Dec. 5, 2013

(51) Int. Cl.
*G01D 7/00*    (2006.01)
*G01L 5/16*    (2006.01)
*G01L 1/14*    (2006.01)
*G01L 1/22*    (2006.01)
*G01L 3/14*    (2006.01)
*G01L 5/00*    (2006.01)

(52) U.S. Cl.
CPC . *G01L 5/165* (2013.01); *G01L 1/14* (2013.01); *G01L 1/2206* (2013.01); *G01L 3/1442* (2013.01); *G01L 3/1457* (2013.01); *G01L 5/0076* (2013.01); *G01L 5/161* (2013.01)
USPC ............. 73/862.043; 73/862.042; 73/862.041

(58) Field of Classification Search
USPC ........................ 73/862.043, 862.042, 862.041
See application file for complete search history.

(56) References Cited

U.S. PATENT DOCUMENTS 3,618,376 A * 11/1971 Shull et al. ............... 73/862.045
4,763,531 A *  8/1988 Dietrich et al. .......... 73/862.044
5,490,427 A     2/1996 Yee et al.
(Continued)

FOREIGN PATENT DOCUMENTS

| JP | 60-177232 A | 9/1985 |
| JP | 63-075633 A | 4/1988 |
| JP | 1-119731 A | 5/1989 |
| JP | 1-262431 A | 10/1989 |
| JP | 6-094548 A | 4/1994 |

(Continued)

OTHER PUBLICATIONS

International Preliminary Report on Patentability dated Jan. 28, 2014 for Application No. PCT/JP2011/067714.

*Primary Examiner* — Lisa Caputo
*Assistant Examiner* — Jamel Williams
(74) *Attorney, Agent, or Firm* — Ladas & Parry LLP

(57) ABSTRACT

With the Z-axis given as a central axis, on an XY-plane, arranged are a rigid force receiving ring, a flexible detection ring inside thereof, and a cylindrical fixed assistant body further inside thereof. Two fixing points on the detection ring are fixed to a supporting substrate, and two exertion points are connected to the force receiving ring via connection members. When force and moment are exerted on the force receiving ring, with the supporting substrate fixed, the detection ring undergoes elastic deformation. Capacitance elements or others are used to measure distances between measurement points and the fixed assistant body and distances between the measurement points and the supporting substrate. Elastic deformation of the detection ring is recognized for mode and magnitude, thereby detecting a direction and magnitude of force or moment which is exerted.

26 Claims, 31 Drawing Sheets

(56) References Cited

U.S. PATENT DOCUMENTS 5,969,268 A   10/1999  Sommerfeld et al.
6,038,933 A *  3/2000  Meyer .................... 73/862.045
6,915,709 B2   7/2005  Okada
7,219,561 B2 *  5/2007  Okada .................... 73/862.043

FOREIGN PATENT DOCUMENTS

| JP | 2001-500979 A | 1/2001 |
| JP | 2004-354049 A | 12/2004 |
| JP | 2007-078570 A | 3/2007 |
| JP | 2010-008343 A | 1/2010 |

* cited by examiner

|     | d1 | d2 | d3 | d4 | d5 | d6 | d7 | d8 |
|-----|----|----|----|----|----|----|----|----|
| +Fx | −  | +  | +  | −  | 0  | 0  | 0  | 0  |
| +Fy | +  | +  | −  | −  | 0  | 0  | 0  | 0  |
| +Fz | 0  | 0  | 0  | 0  | +  | +  | +  | +  |
| +Mx | 0  | 0  | 0  | 0  | +  | +  | −  | −  |
| +My | 0  | 0  | 0  | 0  | −  | +  | +  | −  |
| +Mz | +  | −  | +  | −  | 0  | 0  | 0  | 0  |

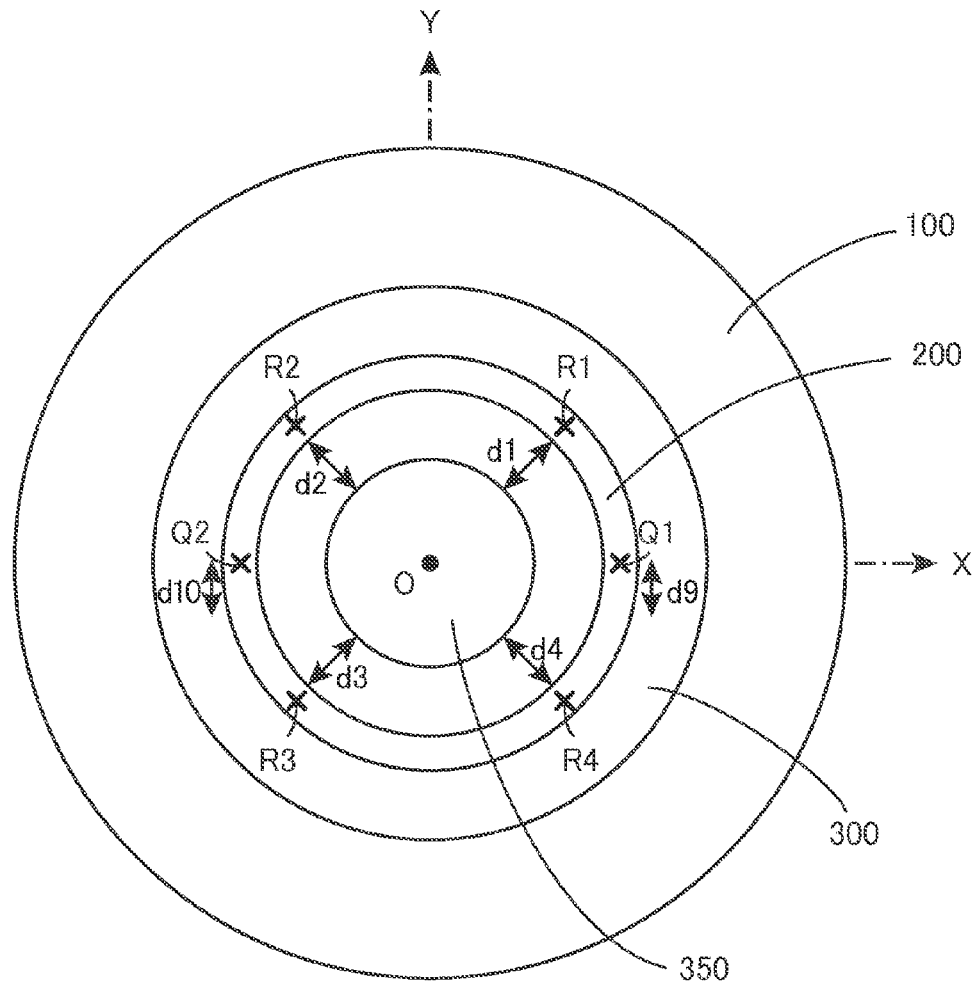

|  | C1<br>(E11&E21) | C2<br>(E12&E22) | C3<br>(E13&E23) | C4<br>(E14&E24) | C5<br>(E15&E25) | C6<br>(E16&E26) | C7<br>(E17&E27) | C8<br>(E18&E28) |
|---|---|---|---|---|---|---|---|---|
| +Fx | + | − | − | + | 0 | 0 | 0 | 0 |
| +Fy | − | − | + | + | 0 | 0 | 0 | 0 |
| +Fz | 0 | 0 | 0 | 0 | − | − | − | − |
| +Mx | 0 | 0 | 0 | 0 | − | − | + | + |
| +My | 0 | 0 | 0 | 0 | + | − | − | + |
| +Mz | − | + | − | + | 0 | 0 | 0 | 0 |

|  | C1 (E11&E21) | C2 (E12&E22) | C3 (E13&E23) | C4 (E14&E24) | C9 (E19&E29) | C10 (E20&E30) |
|---|---|---|---|---|---|---|
| +Fx | + | − | − | + | 0 | 0 |
| +Fy | − | − | + | + | 0 | 0 |
| +Fz | 0 | 0 | 0 | 0 | − | − |
| +Mx | 0 | 0 | 0 | 0 | 0 | 0 |
| +My | 0 | 0 | 0 | 0 | + | − |
| +Mz | − | + | − | + | 0 | 0 |

|  | G1 | G2 | G3 | G4 | G5 | G6 | G7 | G8 |
|---|---|---|---|---|---|---|---|---|
| +Fx | + | − | − | + | 0 | 0 | 0 | 0 |
| +Fy | − | − | + | + | 0 | 0 | 0 | 0 |
| +Fz | 0 | 0 | 0 | 0 | + | + | + | + |
| +Mx | 0 | 0 | 0 | 0 | − | − | + | + |
| +My | 0 | 0 | 0 | 0 | − | + | + | − |
| +Mz | − | + | − | + | 0 | 0 | 0 | 0 |

| | G1 | G2 | G3 | G4 | G5 | G6 | G7 | G8 |
|---|---|---|---|---|---|---|---|---|
| +Fx | 8.362 | -8.358 | -8.363 | 8.360 | 1.289 | -1.286 | -1.289 | 1.288 |
| +Fy | -7.973 | -7.971 | 7.972 | 7.969 | -1.247 | -1.245 | 1.249 | 1.247 |
| +Fz | -0.031 | -0.032 | -0.031 | -0.032 | 0.893 | 0.894 | 0.893 | 0.894 |
| +Mx | -0.001 | -0.006 | 0.002 | 0.007 | -3.322 | -3.321 | 3.323 | 3.323 |
| +My | -0.015 | 0.014 | 0.017 | -0.016 | -4.294 | 4.294 | 4.292 | -4.295 |
| +Mz | -6.887 | 6.882 | -6.888 | 6.882 | -1.258 | 1.253 | -1.257 | 1.257 |

STRESS (MPa)

FIG. 39

| | CAPACITIVE ELEMENT GROUP (C10) | | | | | CAPACITIVE ELEMENT GROUP (C20) | | | | |
|---|---|---|---|---|---|---|---|---|---|---|
| | C11 | C12 | C13 | C14 | C15 | C21 | C22 | C23 | C24 | C25 |
| +Fx | − | − | − | − | − | o | o | o | o | o |
| +Fy | o | o | o | o | o | − | − | − | − | − |
| +Fz | o | o | + | − | o | o | o | + | − | o |
| +Mx | o | o | o | o | o | o | o | + | − | o |
| +My | o | o | − | + | o | o | o | o | o | o |
| +Mz | + | − | o | o | o | + | − | o | o | o |

| | CAPACITIVE ELEMENT GROUP (C30) | | | | | CAPACITIVE ELEMENT GROUP (C40) | | | | |
|---|---|---|---|---|---|---|---|---|---|---|
| | C31 | C32 | C33 | C34 | C35 | C41 | C42 | C43 | C44 | C45 |
| +Fx | + | + | + | + | + | o | o | o | o | o |
| +Fy | o | o | o | o | o | + | + | + | + | + |
| +Fz | o | o | + | − | o | o | o | + | − | o |
| +Mx | o | o | o | o | o | o | o | − | + | o |
| +My | o | o | + | − | o | o | o | o | o | o |
| +Mz | − | + | o | o | o | − | + | o | o | o |

FIG. 42

| | |
|---|---|
| Fx | Fx = −(C11+C12+C13+C14+C15)<br>　　　+(C31+C32+C33+C34+C35)<br><br>OR<br><br>= −(C11+C12+C13+C14) + (C31+C32+C33+C34)<br><br>OR<br><br>= −C15+C35 |
| Fy | Fy = −(C21+C22+C23+C24+C25)<br>　　　+(C41+C42+C43+C44+C45)<br><br>OR<br><br>= −(C21+C22+C23+C24) + (C41+C42+C43+C44)<br><br>OR<br><br>= −C25+C45 |
| Fz | Fz = (C13+C23+C33+C43) − (C14+C24+C34+C44) |
| Mx | Mx = (C23+C44) − (C24+C43) |
| My | My = (C14+C33) − (C13+C34) |
| Mz | Mz = (C11+C21+C32+C42) − (C12+C22+C31+C41) |

FORCE SENSOR

RELATED APPLICATION INFORMATION

This application is a 371 of International Application PCT/JP2011/067714 filed 27 Jul.2011 Entitled "Force Sensor", which was published on 31 Jan. 2013, with International Publication Number WO2013/014803 A1, the content of which is incorporated herein by reference.

TECHNICAL FIELD

The present invention relates to a force sensor and in particular to a thin-type force sensor which is suitable for detecting force in the direction of each coordinate axis and moment around each coordinate axis in a three-dimensional orthogonal coordinate system.

BACKGROUND ART

Various types of force sensors have been used to control motions of robots and industrial machines. Also, a downsized force sensor has been incorporated as a man-machine interface of an input device for electronics. In order to reduce dimensions and cost, a force sensor to be used in the above-described applications is required to be simple in structure as much as possible and also to independently detect force for each coordinate axis in a three dimensional space.

At present, generally-used multi-axis force sensors are categorized into such a type that a specific directional component of force exerted on a mechanical structure is detected as displacement occurring at a specific site and such a type that the force is detected as a mechanical strain occurring at a specific site. A force sensor using a capacitive element is a representative sensor of the former displacement detection types. This force sensor has a capacitive element constituted by a pair of electrodes and detects displacement occurring at one of the electrodes by the force exerted on the basis of a capacitance value of the capacitive element. A multi-axis force sensor using a capacitive element has been disclosed, for example, in Japanese Unexamined Patent Publication No. 2004-325367 (U.S. Pat. No. 7,219,561) and Japanese Unexamined Patent Publication No. 2004-354049 (U.S. Pat. No. 6,915,709).

On the other hand, a strain gauge-type force sensor is a representative sensor of the latter type which detects a mechanical strain. This strain gauge-type force sensor detects a mechanical strain resulting from the force exerted as a change in electric resistance of strain gauges and others. The strain gauge-type multi-axis force sensor has been disclosed, for example, in Japanese Unexamined Patent Publication No. 8-122178 (U.S. Pat. No. 5,490,427).

However, in any of the multi-axis force sensors disclosed in the above-described Patent Documents, a mechanical structure is inevitably made thick. Therefore, it is difficult to make thin the sensor in its entirety.

On the other hand, in the fields of robots, industrial machines, input devices for electronics and others, it is desired to develop a thinner-type force sensor. Thus, an object of the present invention is to provide a force sensor which is simple in structure and can be made thinner.

DISCLOSURE OF INVENTION (1) The first feature of the present invention resides in a force sensor which detects force or moment with regard to at least one axis, among force in a direction of each coordinate axis and moment around each coordinate axis, in an XYZ three-dimensional orthogonal coordinate system, the force sensor comprising:

a force receiving ring which is arranged on an XY-plane so that a Z-axis is given as a central axis and receives exertions of force or moment to be detected;

a detection ring which is arranged on the XY-plane so that the Z-axis is given as a central axis and also arranged so as to be inside or outside the force receiving ring, at least a part of the detection ring undergoing elastic deformation by exertions of force or moment to be detected;

a supporting substrate which has an upper surface parallel to the XY-plane and is arranged at certain intervals below the force receiving ring and the detection ring;

a connection member which connects the detection ring to the force receiving ring at a predetermined exertion point;

a fixing member which fixes the detection ring to the supporting substrate at a predetermined fixing point;

a detection element which electrically detects elastic deformation of the detection ring; and a detection circuit which detects a detection value of force in a predetermined coordinate axis direction or moment around a predetermined coordinate axis which is exerted on the force receiving ring, with the supporting substrate being fixed, on the basis of detection result of the detection element; wherein a projection image of the exertion point on the XY-plane and a projection image of the fixing point on the XY-plane are formed at mutually different positions.

(2) The second feature of the present invention resides in a force sensor having the first feature described above, wherein n number of plural exertion points and n number of plural fixing points are alternately arranged on an annular channel along a contour of the detection ring, and the detection element electrically detects elastic deformation of the detection ring in vicinity of a measurement point defined between an exertion point and a fixing point adjacently arranged.

(3) The third feature of the present invention resides in a force sensor having the second feature described above, wherein two exertion points and two fixing points are arranged on the annular channel along the contour of the detection ring in an order of a first exertion point, a first fixing point, a second exertion point and a second fixing point, and individually defining a first measurement point arranged between the first exertion point and the first fixing point on the annular channel, a second measurement point arranged between the first fixing point and the second exertion point on the annular channel, a third measurement point arranged between the second exertion point and the second fixing point on the annular channel, and a fourth measurement point arranged between the second fixing point and the first exertion point on the annular channel, the detection element electrically detects elastic deformation of the detection ring in vicinities of the first to the fourth measurement points.

(4) The fourth feature of the present invention resides in a force sensor having the third feature described above, wherein the first exertion point, the first fixing point, the second exertion point, and the second fixing point are arranged respectively at a positive domain of an X-axis, a positive domain of a Y-axis, a negative domain of the X-axis and a negative domain of the Y-axis, vicinity of the first exertion point on the detection ring is connected to the force receiving ring via a first connection member extending along the positive domain of the X-axis, and vicinity of the second exertion point on the detection ring is connected to the force receiving ring via a second connection member extending along the negative domain of the X-axis, and the detection element electrically detects elastic deformation of the detection ring in vicinities of the first measurement point, the second measurement point, the third measurement point and the fourth measurement point arranged respectively at a first quadrant, a second quadrant, a third quadrant and a fourth quadrant of the XY-plane.

(5) The fifth feature of the present invention resides in a force sensor having the fourth feature described above, wherein defining a V-axis which passes through an origin O in the XYZ three-dimensional orthogonal coordinate system, with a positive domain positioned at the first quadrant of the XY-plane and with a negative domain positioned at the third quadrant of the XY-plane and forms 45 degrees with respect to the X-axis, and a W-axis which passes through the origin O in the XYZ three-dimensional orthogonal coordinate system, with a positive domain positioned at the second quadrant of the XY-plane and with a negative domain positioned at the fourth quadrant of the XY-plane and is orthogonal to the V-axis, the first measurement point, the second measurement point, the third measurement point and the fourth measurement point are arranged respectively at the positive domain of the V-axis, the positive domain of the W-axis, the negative domain of the V-axis and the negative domain of the W-axis.

(6) The sixth feature of the present invention resides in a force sensor having the first feature described above, wherein n number of plural exertion points and n number of plural fixing points are alternately arranged on an annular channel along a contour of the detection ring, vicinities of n number of the exertion points on the detection ring constitute diaphragms thinner in thickness than other parts, n number of plural connection members are connected respectively to the diaphragms, and the detection element electrically detects elastic deformation of the diaphragms.

(7) The seventh feature of the present invention resides in a force sensor having the sixth feature described above, wherein four exertion points and four fixing points are arranged on the annular channel along the contour of the detection ring in an order of the first exertion point, the first fixing point, the second exertion point, the second fixing point, the third exertion point, the third fixing point, the fourth exertion point and the fourth fixing point, vicinity of the first exertion point on the detection ring constitutes a first diaphragm, vicinity of the second exertion point on the detection ring constitutes a second diaphragm, vicinity of the third exertion point on the detection ring constitutes the third diaphragm, vicinity of the fourth exertion point on the detection ring constitutes the fourth diaphragm, and the detection element electrically detects elastic deformation of the first to the fourth diaphragms.

(8) The eighth feature of the present invention resides in a force sensor having the seventh feature described above, wherein the first exertion point, the second exertion point, the third exertion point and the fourth exertion point are arranged respectively at a positive domain of an X-axis, a positive domain of a Y-axis, a negative domain of the X-axis and a negative domain of the Y-axis, and the first diaphragm, the second diaphragm, the third diaphragm and the fourth diaphragm are positioned respectively at the positive domain of the X-axis, the positive domain of the Y-axis, the negative domain of the X-axis and the negative domain of the Y-axis, defining a V-axis which passes through an origin O in the XYZ three-dimensional orthogonal coordinate system, with a positive domain positioned at a first quadrant of the XY-plane and with a negative domain positioned at a third quadrant of the XY-plane, and forms 45 degrees with respect to the X-axis, and a W-axis which passes through the origin O in the XYZ three-dimensional orthogonal coordinate system, with a positive domain positioned at a second quadrant of the XY-plane and with a negative domain positioned at a fourth quadrant of the XY-plane and is orthogonal to the V-axis, the first fixing point, the second fixing point, the third fixing point and the fourth fixing point are arranged respectively at the positive domain of the V-axis, the positive domain of the W-axis, the negative domain of the V-axis and the negative domain of the W-axis, and the first diaphragm is connected to the force receiving ring via a first connection member extending along the positive domain of the X-axis, the second diaphragm is connected to the force receiving ring via a second connection member extending along the positive domain of the Y-axis, the third diaphragm is connected to the force receiving ring via a third connection member extending along the negative domain of the X-axis, and the fourth diaphragm is connected to the force receiving ring via a fourth connection member extending along the negative domain of the Y-axis.

(9) The ninth feature of the present invention resides in a force sensor having one of the first to eighth features described above, wherein a lower surface of the detection ring is connected to the upper surface of the supporting substrate via the fixing member.

(10) The tenth feature of the present invention resides in a force sensor having one of the first to eighth features described above, wherein both rings are arranged so that the force receiving ring is outside and the detection ring is inside, a fixed assistant body whose lower surface is fixed onto the upper surface of the supporting substrate is provided further inside the detection ring, and an inner circumferential surface of the detection ring is connected to an outer circumferential surface of the fixed assistant body via the fixing member.

(11) The eleventh feature of the present invention resides in a force sensor having one of the first to tenth features described above, comprising;

a force receiving substrate which is provided with an upper surface parallel to the XY-plane and arranged at certain intervals above the force receiving ring and the detection ring, wherein a lower surface of the force receiving substrate is partially connected to an upper surface of the force receiving ring, and a predetermined clearance is formed between the lower surface of the force receiving substrate and an upper surface of the detection ring.

(12) The twelfth feature of the present invention resides in a force sensor having the eleventh feature described above, wherein an inclusive tubular body which includes the force receiving ring and the detection ring is connected to an outer circumference of the lower surface of the force receiving substrate, and a clearance is formed between a lower end of the inclusive tubular body and an outer circumference of the supporting substrate, and the clearance is set dimensionally in such a manner that the lower end of the inclusive tubular body is brought into contact with the outer circumference of the supporting substrate, thereby restricting displacement of the force receiving substrate, when force or moment exceeding a predetermined tolerance level is exerted on the force receiving substrate.

(13) The thirteenth feature of the present invention resides in a force sensor having one of the first to twelfth features described above, wherein a vertically penetrating through-hole is formed at a predetermined site on the force receiving ring, and a groove larger in diameter than the through-hole is formed at a position of the through-hole on an upper surface of the force receiving ring, a displacement control screw which is inserted through the through-hole whose leading end is fixed to the supporting substrate and whose head is accommodated into the groove is additionally provided, and a clearance is formed between the displacement control screw and inner surfaces of the through-hole and the groove, and the clearance is set dimensionally in such a manner that the displacement control screw is brought into contact with the inner surface of the through-hole or the inner surface of the groove, thereby restricting displacement of the force receiving ring, when force or moment exceeding a predetermined tolerance level is exerted on the force receiving ring.

(14) The fourteenth feature of the present invention resides in a force sensor having one of the first to thirteenth features described above, wherein the force receiving ring is composed of a rigid body which does not substantially undergo deformation as long as exerting force or moment is within a predetermined tolerance level.

(15) The fifteenth feature of the present invention resides in a force sensor having one of the first to fourteenth features described above, wherein both the force receiving ring and the detection ring are circular rings arranged on the XY-plane so that the Z-axis is given as a central axis.

(16) The sixteenth feature of the present invention resides in a force sensor having one of the first to fifteenth features described above, wherein a detection circuit substrate which packages electronics constituting the detection circuit is provided on the upper surface of the supporting substrate.

(17) The seventeenth feature of the present invention resides in a force sensor having one of the first to sixteenth features described above, wherein the detection element electrically detects displacement of the detection ring at a predetermined measurement point.

(18) The eighteenth feature of the present invention resides in a force sensor having the seventeenth feature described above, wherein the detection element electrically detects a distance between a measurement target surface in vicinity of the measurement point on the detection ring and a counter reference surface facing the measurement target surface of the force receiving ring.

(19) The nineteenth feature of the present invention resides in a force sensor having the seventeenth feature described above, wherein both rings are arranged so that the force receiving ring is outside and the detection ring is inside, a fixed assistant body whose lower surface is fixed onto the upper surface of the supporting substrate is provided further inside the detection ring, and the detection element electrically detects a distance between a measurement target surface in vicinity of the measurement point on an inner circumferential surface of the detection ring and a counter reference surface positioned on an outer circumference of the fixed assistant body and facing the measurement target surface.

(20) The twentieth feature of the present invention resides in a force sensor having the seventeenth feature described above, wherein the detection element electrically detects a distance between a measurement target surface positioned in vicinity of the measurement point on a lower surface of the detection ring and a counter reference surface positioned on the upper surface of the supporting substrate and facing the measurement target surface.

(21) The twenty-first feature of the present invention resides in a force sensor having one of the eighteen to twentieth features described above, wherein the detection element is constituted by a capacitive element having a displacement electrode provided on the measurement target surface and a fixed electrode provided on the counter reference surface.

(22) The twenty-second feature of the present invention resides in a force sensor having the twenty-first feature described above, wherein the detection ring is composed of a flexible conductive material, and a surface of the detection ring is used as a common displacement electrode to constitute capacitive elements.

(23) The twenty-third feature of the present invention resides in a force sensor having one of the eighteenth to twentieth features described above, wherein at least the measurement target surface on the detection ring is composed of a conductive material, and the detection element is constituted by an eddy current displacement sensor provided on the counter reference surface.

(24) The twenty-fourth feature of the present invention resides in a force sensor having one of the eighteenth to twentieth features described above, wherein at least the measurement target surface on the detection ring is composed of a magnet, and the detection element is constituted by a Hall element provided on the counter reference surface.

(25) The twenty-fifth feature of the present invention resides in a force sensor having one of the eighteenth to twentieth features described above, wherein the detection element is constituted by a light beam irradiator which is fixed on the counter reference surface to irradiate a light beam obliquely with respect to a measurement target surface, a light beam receiver which is fixed on the counter reference surface to receive the light beam reflected on the measurement target surface, and a measurement circuit which outputs a measured value of distance on the basis of a position at which the light beam is received by the light beam receiver.

(26) The twenty-sixth feature of the present invention resides in a force sensor having one of the first to sixteenth features described above, wherein the detection element electrically detects a mechanical strain in vicinity of a predetermined measurement point of the detection ring.

(27) The twenty-seventh feature of the present invention resides in a force sensor having the twenty-sixth feature described above, wherein the detection element is constituted by a strain gauge attached onto a surface of the detection ring in vicinity of the measurement point so that a direction along an annular channel along a contour of the detection ring is given as a detection direction.

(28) The twenty-eighth feature of the present invention resides in a force sensor having the fifth feature described above, wherein both the force receiving ring and the detection ring are circular rings arranged on the YY-plane so that the Z-axis is given as a central axis, said rings are arranged so that the force receiving ring is outside and the detection ring is inside, a cylindrical fixed assistant body whose lower surface is fixed on the upper surface of the supporting substrate, with the Z-axis being given as a central axis, is provided further inside the detection ring, the detection element comprises:

a first capacitive element including a first displacement electrode arranged in vicinity of the first measurement point on an inner circumferential surface of the detection ring and a first fixed electrode arranged at a position facing the first displacement electrode on an outer circumferential surface of the fixed assistant body, a second capacitive element including a second displacement electrode arranged in vicinity of the second measurement point on the inner circumferential surface of the detection ring and a second fixed electrode arranged at a position facing the second displacement electrode on the outer circumferential surface of the fixed assistant body, a third capacitive element including a third displacement electrode arranged in vicinity of the third measurement point on the inner circumferential surface of the detection ring and a third fixed electrode arranged at a position facing the third displacement electrode on the outer circumferential surface of the fixed assistant body, a fourth capacitive element including a fourth displacement electrode arranged in vicinity of the fourth measurement point on the inner circumferential surface of the detection ring and a fourth fixed electrode arranged at a position facing the fourth displacement electrode on the outer circumferential surface of the fixed assistant body, a fifth capacitive element including a fifth displacement electrode arranged in vicinity of the first measurement point on a lower surface of the detection ring and a fifth fixed electrode arranged at a position facing the fifth displacement electrode on the upper surface of the supporting substrate, a sixth capacitive element including a sixth displacement electrode arranged in vicinity of the second measurement point on the lower surface of the detection ring and a sixth fixed electrode arranged at a position facing the sixth displacement electrode on the upper surface of the supporting substrate, a seventh capacitive element including a seventh displacement electrode arranged in vicinity of the third measurement point on the lower surface of the detection ring and a seventh fixed electrode arranged at a position facing the seventh displacement electrode on the upper surface of the supporting substrate, and an eighth capacitive element including an eighth displacement electrode arranged in vicinity of the fourth measurement point on the lower surface of the detection ring and an eighth fixed electrode arranged at a position facing the eighth displacement electrode on the upper surface of the supporting substrate, a projection image of one of a pair of electrodes constituting said capacitive elements projected on a surface on which the other of said pair of electrodes is formed is included in the other electrode, and when a capacitance value of the first capacitive element is given as $C1$, a capacitance value of the second capacitive element is given as $C2$, a capacitance value of the third capacitive element is given as $C3$, a capacitance value of the fourth capacitive element is given as $C4$, a capacitance value of the fifth capacitive element is given as $C5$, a capacitance value of the sixth capacitive element is given as $C6$, a capacitance value of the seventh capacitive element is given as $C7$, and a capacitance value of the eighth capacitive element is given as $C8$, the detection circuit outputs detection values of force Fx in a direction of the X-axis, force Fy in a direction of the Y-axis, force Fz in a direction of the Z-axis, moment Mx around the X-axis, moment My around the Y-axis and moment Mz around the Z-axis on the basis of the following arithmetic expressions:

$$Fx=(C1+C4)-(C2+C3)$$

$$Fy=(C3+C4)-(C1+C2)$$

$$Fz=-(C5+C6+C7+C8)$$

$$Mx=(C7+C8)-(C5+C6)$$

$$My=(C5+C8)-(C6+C7)$$

$$Mz=(C2+C4)-(C1+C3).$$

(29) The twenty-ninth feature of the present invention resides in a force sensor having the fifth feature described above, wherein both the force receiving ring and the detection ring are circular rings arranged on the XY-plane so that the Z-axis is given as a central axis, said rings are arranged so that the force receiving ring is outside and the detection ring is inside, a cylindrical fixed assistant body whose lower surface is fixed on the upper surface of the supporting substrate, with the Z-axis being given as a central axis, is provided further inside the detection ring, with the first exertion point given as a fifth measurement point and the second exertion point given as a sixth measurement point, the detection element comprises:

a first capacitive element including a first displacement electrode arranged in vicinity of the first measurement point on an inner circumferential surface of the detection ring and a first fixed electrode arranged at a position facing the first displacement electrode on an outer circumferential surface of the fixed assistant body, a second capacitive element including a second displacement electrode arranged in vicinity of the second measurement point on the inner circumferential surface of the detection ring and a second fixed electrode arranged at a position facing the second displacement electrode on the outer circumferential surface of the fixed assistant body, a third capacitive element including a third displacement electrode arranged in vicinity of the third measurement point on the inner circumferential surface of the detection ring and a third fixed electrode arranged at a position facing the third displacement electrode on the outer circumferential surface of the fixed assistant body, a fourth capacitive element including a fourth displacement electrode arranged in vicinity of the fourth measurement point on the inner circumferential surface of the detection ring and a fourth fixed electrode arranged at a position facing the fourth displacement electrode on the outer circumferential surface of the fixed assistant body, a fifth capacitive element including a fifth displacement electrode arranged in vicinity of the fifth measurement point on a lower surface of the detection ring and a fifth fixed electrode arranged at a position facing the fifth displacement electrode on the upper surface of the supporting substrate, and a sixth capacitive element including a sixth displacement electrode arranged in vicinity of the sixth measurement point on the lower surface of the detection ring and a sixth fixed electrode arranged at a position facing the sixth displacement electrode on the upper surface of the supporting substrate, a projection image of one of a pair of electrodes constituting said capacitive elements projected on a surface on which the other of said pair of electrodes is formed is included in the other electrode, and when a capacitance value of the first capacitive element is given as C1, a capacitance value of the second capacitive element is given as C2, a capacitance value of the third capacitive element is given as C3, a capacitance value of the fourth capacitive element is given as C4, a capacitance value of the fifth capacitive element is given as C9 and a capacitance value of the sixth capacitive element is given as C10, the detection circuit outputs detection values of force Fx in a direction of the X-axis, force Fy in a direction of the Y-axis, force Fz in a direction of the Z-axis, moment My around the Y-axis and moment Mz around the Z-axis on the basis of the following arithmetic expressions:

$$Fx=(C1+C4)-(C2+C3)$$

$$Fy=(C3+C4)-(C1+C2)$$

$$Fz=-(C9+C10)$$

$$My=C9-C10$$

$$Mz=(C2+C4)-(C1+C3).$$

(30) The thirtieth feature of the present invention resides in a force sensor having the twenty-eighth or twenty-ninth feature described above, wherein the detection ring is composed of a flexible conductive material and a surface of the detection ring is used as a common displacement electrode to constitute each of the capacitive elements.

(31) The thirty-first feature of the present invention resides in a force sensor having the fifth feature described above, wherein both the force receiving ring and the detection ring are circular rings arranged on the XY-plane so that the Z-axis is given as a central axis, said rings are arranged so that the force receiving ring is outside and the detection ring is inside, the detection element includes a plurality of strain gauges attached onto surfaces in vicinity of each of the first to the fourth measurement points of the detection ring so that a direction along an annular channel along a contour of the detection ring is a detection direction, when one of an inner circumferential surface and an outer circumferential surface of the detection ring is defined as a laterally arranged surface and one of an upper surface and a lower surface of the detection ring is defined as a longitudinally arranged surface, each of the plurality of strain gauges is constituted by any one of strain gauges having the following eight attributes:

a strain gauge having a first attribute which is attached in vicinity of the first measurement point on the laterally arranged surface, a strain gauge having a second attribute which is attached in vicinity of the second measurement point on the laterally arranged surface, a strain gauge having a third attribute which is attached in vicinity of the third measurement point on the laterally arranged surface, a strain gauge having a fourth attribute which is attached in vicinity of the fourth measurement point on the laterally arranged surface, a strain gauge having a fifth attribute which is attached in vicinity of the first measurement point on the longitudinally arranged surface, a strain gauge having a sixth attribute which is attached in vicinity of the second measurement point on the longitudinally arranged surface, a strain gauge having a seventh attribute which is attached in vicinity of the third measurement point on the longitudinally arranged surface, and a strain gauge having an eighth attribute which is attached in vicinity of the fourth measurement point on the longitudinally arranged surface, and a detection circuit outputs:

a detection value of force Fx in a direction of the X-axis by a Wheatstone bridge circuit in which a strain gauge having the first attribute and a strain gauge having the fourth attribute are given as first opposite sides, and a strain gauge having the second attribute and a strain gauge having the third attribute are given as second opposite sides, a detection value of force Fy in a direction of the Y-axis by a Wheatstone bridge circuit in which a strain gauge having the first attribute and a strain gauge having the second attribute are given as first opposite sides, and a strain gauge having the third attribute and a strain gauge having the fourth attribute are given as second opposite sides, a detection value of moment Mx around the X-axis by a Wheatstone bridge circuit in which a strain gauge having the fifth attribute and a strain gauge having the sixth attribute are given as first opposite sides, and a strain gauge having the seventh attribute and a strain gauge having the eighth attribute are given as second opposite sides, a detection value of moment My around the Y-axis by a Wheatstone bridge circuit in which a strain gauge having the fifth attribute and a strain gauge having the eighth attribute are given as first opposite sides, and a strain gauge having the sixth attribute and a strain gauge having the seventh attribute are given as second opposite sides, and a detection value of moment Mz around the Z-axis by a Wheatstone bridge circuit in which a strain gauge having the first attribute and a strain gauge having the third attribute are given as first opposite sides, and a strain gauge having the second attribute and a strain gauge having the fourth attribute are given as second opposite sides.

(32) The thirty-second feature of the present invention resides in a force sensor having the fifth feature described above, wherein both the force receiving ring and the detection ring are circular rings arranged on the XY-plane so that the Z-axis is given as a central axis, said rings are arranged so that the force receiving ring is outside and the detection ring is inside, the detection elements include a plurality of strain gauges attached onto surface in vicinity of each of the first to the fourth measurement points of the detection ring so that a direction along an annular channel along a contour of the detection ring is a detection direction, when one of an inner circumferential surface and an outer circumferential surface of the detection ring is defined as a laterally arranged surface, and one of an upper surface and a lower surface of the detection ring is defined as a first longitudinally arranged surface and the other of them is defined as a second longitudinally arranged surface, each of the plurality of strain gauges is constituted by any one of strain gauges having the following 12 different attributes:

a strain gauge having a first attribute which is attached in vicinity of the first measurement point on the laterally arranged surface, a strain gauge having a second attribute which is attached in vicinity of the second measurement point on the laterally arranged surface, a strain gauge having a third attribute which is attached in vicinity of the third measurement point on the laterally arranged surface, a strain gauge having a fourth attribute which is attached in vicinity of the fourth measurement point on the laterally arranged surface, a strain gauge having a fifth attribute which is attached in vicinity of the first measurement point on the first longitudinally arranged surface of the detection ring, a strain gauge having a sixth attribute which is attached in vicinity of the second measurement point on the first longitudinally arranged surface of the detection ring, a strain gauge having a seventh attribute which is attached in vicinity of the third measurement point on the first longitudinally arranged surface of the detection ring, a strain gauge having an eighth attribute which is attached in vicinity of the fourth measurement point on the first longitudinally arranged surface of the detection ring, a strain gauge having a ninth attribute which is attached in vicinity of the first measurement point on the second longitudinally arranged surface of the detection ring, a strain gauge having a tenth attribute which is attached in vicinity of the second measurement point on the second longitudinally arranged surface of the detection ring, a strain gauge having an eleventh attribute which is attached in vicinity of the third measurement point on the second longitudinally arranged surface of the detection ring, and a strain gauge having a twelfth attribute which is attached in vicinity of the fourth measurement point on the second longitudinally arranged surface of the detection ring, and the detection circuit outputs:

a detection value of force Fx in a direction of the X-axis by a Wheatstone bridge circuit in which a strain gauge having the first attribute and a strain gauge having the fourth attribute are given as first opposite sides, and a strain gauge having the second attribute and a strain gauge having the third attribute are given as second opposite sides, a detection value of force Fy in a direction of the Y-axis by a Wheatstone bridge circuit in which a strain gauge having the first attribute and a strain gauge having the second attribute are given as first opposite sides, and a strain gauge having the third attribute and a strain gauge having the fourth attribute are given as second opposite sides, a detection value of force Fz in a direction of the Z-axis by a Wheatstone bridge circuit in which a serial connection side of a strain gauge having the fifth attribute with a strain gauge having the sixth attribute and a serial connection side of a strain gauge having the seventh attribute with a strain gauge having the eighth attribute are given as first opposite sides, and a serial connection side of a strain gauge having the ninth attribute with a strain gauge having the tenth attribute and a serial connection side of a strain gauge having the eleventh attribute with a strain gauge having the twelfth attribute are given as second opposite sides, a detection value of moment Mx around the X-axis by a Wheatstone bridge circuit in which a strain gauge having the fifth attribute and a strain gauge having the sixth attribute are given as first opposite sides, and a strain gauge having the seventh attribute and a strain gauge having the eighth attribute are given as second opposite sides, a detection value of moment My around the Y-axis by a Wheatstone bridge circuit in which a strain gauge having the fifth attribute and a strain gauge having the eighth attribute are given as first opposite sides, and a strain gauge having the sixth attribute and a strain gauge having the seventh attribute are given as second opposite sides, and a detection value of moment Mz around the Z-axis by a Wheatstone bridge circuit in which a strain gauge having the first attribute and a strain gauge having the third attribute are given as first opposite sides, and a strain gauge having the second attribute and a strain gauge having the fourth attribute are given as second opposite sides.

(33) The thirty-third feature of the present invention resides in a force sensor having the eighth feature described above, wherein both the force receiving ring and the detection ring are circular rings arranged on the YY-plane so that the Z-axis is given as a central axis, said rings are arranged so that the force receiving ring is outside and the detection ring is inside, a cylindrical fixed assistant body whose lower surface is fixed on the upper surface of the supporting substrate, with the Z-axis being given as a central axis, is provided further inside the detection ring, the detection element comprises:

a first capacitive element group including a plurality of capacitive elements constituted by a first displacement electrode group including a plurality of displacement electrodes arranged at a first diaphragm on an inner circumferential surface of the detection ring and a first fixed electrode group including a plurality of fixed electrodes arranged at positions facing the respective displacement electrodes of the first displacement electrode group on an outer circumferential surface of the fixed assistant body, a second capacitive element group including a plurality of capacitive elements constituted by a second displacement electrode group including a plurality of displacement electrodes arranged at a second diaphragm on the inner circumferential surface of the detection ring and a second fixed electrode group including a plurality of fixed electrodes arranged at positions facing the respective displacement electrodes of the second displacement electrode group on the outer circumferential surface of the fixed assistant body, a third capacitive element group including a plurality of capacitive elements constituted by a third displacement electrode group including a plurality of displacement electrodes arranged at a third diaphragm on the inner circumferential surface of the detection ring and a third fixed electrode group including a plurality of fixed electrodes arranged at positions facing the respective displacement electrodes of the third displacement electrode group on the outer circumferential surface of the fixed assistant body, and a fourth capacitive element group including a plurality of capacitive elements constituted by a fourth displacement electrode group including a plurality of displacement electrodes arranged at a fourth diaphragm on the inner circumferential surface of the detection ring and a fourth fixed electrode group including a plurality of fixed electrodes arranged at positions facing the respective displacement electrodes of the fourth displacement electrode group on the outer circumferential surface of the fixed assistant body, a projection image of one of a pair of electrodes constituting said capacitive elements projected on a surface on which the other of said pair of electrodes is formed is included in the other electrode, and the detection circuit outputs a detection value on the basis of a capacitance value of each of the capacitive elements.

(34) The thirty-fourth feature of the present invention resides in a force sensor having the thirty-third feature described above, wherein the first capacitive element group includes an on-axis capacitive element of the first group arranged on the X-axis, a first capacitive element of the first group arranged in a positive direction of the Y-axis adjacent to the on-axis capacitive element of the first group, a second capacitive element of the first group arranged in a negative direction of the Y-axis adjacent to the on-axis capacitive element of the first group, a third capacitive element of the first group arranged in a positive direction of the Z-axis adjacent to the on-axis capacitive element of the first group, and a fourth capacitive element of the first group arranged in a negative direction of the Z-axis adjacent to the on-axis capacitive element of the first group, the second capacitive element group includes an on-axis capacitive element of the second group arranged on the Y-axis, a first capacitive element of the second group arranged in a positive direction of the X-axis adjacent to the on-axis capacitive element of the second group, a second capacitive element of the second group arranged in a negative direction of the X-axis adjacent to the on-axis capacitive element of the second group, a third capacitive element of the second group arranged in the positive direction of the Z-axis adjacent to the on-axis capacitive element of the second group, and a fourth capacitive element of the second group arranged in the negative direction of the Z-axis adjacent to the on-axis capacitive element of the second group, the third capacitive element group includes an on-axis capacitive element of the third group arranged on the X-axis, a first capacitive element of the third group arranged in the positive direction of the Y-axis adjacent to the on-axis capacitive element of the third group, a second capacitive element of the third group arranged in the negative direction of the Y-axis adjacent to the on-axis capacitive element of the third group, a third capacitive element of the third group arranged in the positive direction of the Z-axis adjacent to the on-axis capacitive element of the third group, and a fourth capacitive element of the third group arranged in the negative direction of the Z-axis adjacent to the on-axis capacitive element of the third group, and the fourth capacitive element group includes an on-axis capacitive element of the fourth group arranged on the Y-axis, a first capacitive element of the fourth group arranged in the positive direction of the X-axis adjacent to the on-axis capacitive element of the fourth group, a second capacitive element of the fourth group arranged in the negative direction of the X-axis adjacent to the on-axis capacitive element of the fourth group, a third capacitive element of the fourth group arranged in the positive direction of the Z-axis adjacent to the on-axis capacitive element of the fourth group, and a fourth capacitive element of the fourth group arranged in the negative direction of the Z-axis adjacent to the on-axis capacitive element of the fourth group, and when a capacitance value of the first capacitive element of the first group is given as $C11$, a capacitance value of the second capacitive element of the first group is given as $C12$, a capacitance value of the third capacitive element of the first group is given as $C13$, a capacitance value of the fourth capacitive element of the first group is given as $C14$ and a capacitance value of the on-axis capacitive element of the first group is given as $C15$, when a capacitance value of the first capacitive element of the second group is given as $C21$, a capacitance value of the second capacitive element of the second group is given as $C22$, a capacitance value of the third capacitive element of the second group is given as $C23$, a capacitance value of the fourth capacitive element of the second group is given as $C24$, and a capacitance value of the on-axis capacitive element of the second group is given as $C25$, when a capacitance value of the first capacitive element of the third group is given as $C31$, a capacitance value of the second capacitive element of the third group is given as $C32$, a capacitance value of the third capacitive element of the third group is given as $C33$, a capacitance value of the fourth capacitive element of the third group is given as $C34$, and a capacitance value of the on-axis capacitive element of the third group is given as $C35$, and when a capacitance value of the first capacitive element of the fourth group is given as $C41$, a capacitance value of the second capacitive element of the fourth group is given as $C42$, a capacitance value of the third capacitive element of the fourth group is given as $C43$, a capacitance value of the fourth capacitive element of the fourth group is given as $C44$, and a capacitance value of the on-axis capacitive element of the fourth group is given as $C45$, the detection circuit outputs detection values of force Fx in a direction of the X-axis, force Fy in a direction of the Y-axis, force Fz in a direction of the Z-axis, moment Mx around the X-axis, moment. My around the Y-axis, and moment Mz around the Z-axis, on the basis of the following arithmetic expressions:

$$Fx = -(C11 + C12 + C13 + C14 + C15) +$$
$$(C31 + C32 + C33 + C34 + C35) \text{ or}$$
$$= -(C11 + C12 + C13 + C14) +$$
$$(C31 + C32 + C33 + C34) \text{ or}$$
$$= -C15 + C35$$

$$Fy = -(C21 + C22 + C23 + C24 + C25) +$$
$$(C41 + C42 + C43 + C44 + C45) \text{ or}$$
$$= -(C21 + C22 + C23 + C24) +$$
$$(C41 + C42 + C43 + C44) \text{ or}$$
$$= -C25 + C45$$

$$Fz = (C13 + C23 + C33 + C43) - (C14 + C24 + C34 + C44)$$
$$Mx = (C23 + C44) - (C24 + C43)$$
$$My = (C14 + C33) - (C13 + C34)$$
$$Mz = (C11 + C21 + C32 + C42) - (C12 + C22 + C31 + C41).$$

(35) The thirty-fifth feature of the present invention resides in a force sensor having the thirty-third or thirty-fourth feature described above, wherein at least the diaphragms of the detection ring are composed of flexible conductive material, and a surface of a diaphragm is used as a common displacement electrode to constitute each of capacitive elements.

BRIEF DESCRIPTION OF THE DRAWINGS

FIG. 12 is a top view showing a modification example of the distance measurement sites in the basic structure shown in FIG. 8.

FIG. 13 is a table showing changes in distances d1 to d4, d9, d10 when force in the direction of each coordinate axis and moment around each coordinate axis are exerted on the basic structure shown in FIG. 12.

FIG. 19 is a table showing changes in capacitance values of capacitive elements C1 to C4, C9, C10 when force in the direction of each coordinate axis and moment around each coordinate axis are exerted on the force sensor of the modification example shown in FIG. 12.

FIG. 20 shows arithmetic expressions for determining force in the direction of each coordinate axis and moment around each coordinate axis which are exerted on the force sensor of the modification example shown in FIG. 12.

FIG. 39 is a table showing changes in capacitance values of capacitive elements C11 to C45 when force in the direction of each coordinate axis and moment around each coordinate axis are exerted on the force sensor shown in FIG. 37.

FIG. 42 shows arithmetic expressions for determining force in the direction of each coordinate axis and moment around each coordinate axis which is exerted on the force sensor shown in FIG. 37.

BEST MODES FOR CARRYING OUT THE INVENTION

Hereinafter, the present invention will be described based on illustrated embodiments.

<<<Section 1. Basic Structure and Principle of Force Sensor>>>

First, a description will be given about a constitution of a basic structure of a force sensor according to the present invention and a principle of detecting force and moment by utilizing the basic structure. A force sensor according to the present invention has functions to detect force or moment at least on one axis among force in the direction of each coordinate axis and moment around each coordinate axis in an XYZ three-dimensional orthogonal coordinate system. Therefore, hereinafter, a description will be given of a constitution of the basic structure of the force sensor which is arranged in the XYZ three-dimensional orthogonal coordinate system.

Figure 1:
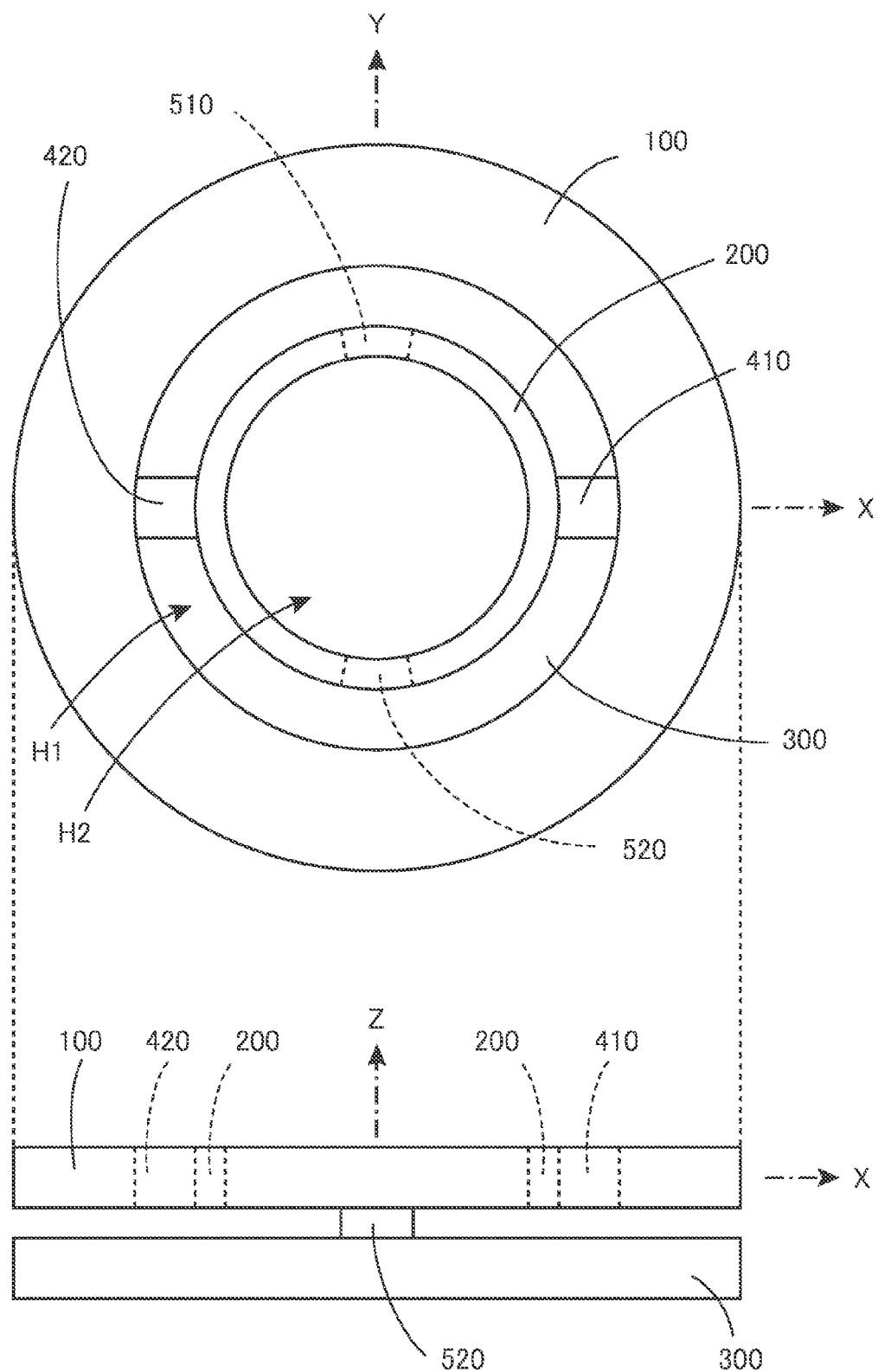
FIG. 1 is a top view (the upper part of the figure) and a side view (the lower part of the figure) showing a basic structure of a force sensor according to a basic embodiment of the present invention.

FIG. 1 is a top view (the upper part of the figure) and a side view (the lower part of the figure) for showing the basic structure of the force sensor according to a basic embodiment of the present invention. In the top view, the X-axis is placed on the right side in the figure, the Y-axis is placed upward in the figure, and the Z-axis is placed in the front-side direction perpendicular to the sheet surface of the figure. On the other hand, in the side view, the X-axis is placed on the right side, the Z-axis is placed upward in the figure, and the Y-axis is placed in a depth direction perpendicular to the sheet surface of the figure. As shown in the figure, the basic structure is constituted by a force receiving ring 100, a detection ring 200, a supporting substrate 300, connection members 410, 420 and fixing members 510, 520.

The force receiving ring 100 is a circular plate-shaped (washer-shaped) ring arranged on the XY-plane so that the Z-axis is given as a central axis, and both the outer circumferential surface and the inner circumferential surface thereof are constituted so as to form a cylindrical surface. The force receiving ring 100 has functions to receive exertions of force or moment to be detected. More particularly, it has functions to transmit the force or moment to be detected to the detection ring 200.

On the other hand, the detection ring 200 is a circular plate-shaped (washer-shaped) ring arranged on the XY-plane, as with the force receiving ring 100, so that the Z-axis is given as the central axis. Both the outer circumferential surface and the inner circumferential surface are constituted so as to form a cylindrical surface. In the example shown here, the detection ring 200 is arranged inside the force receiving ring 100. That is, the force receiving ring 100 is an outer ring arranged on the XY-plane, while the detection ring 200 is an inner ring arranged on the XY-plane. Here, the detection ring 200 is characterized in that elastic deformation is caused at least partially due to exertions of the force or moment to be detected.

The connection members 410, 420 are members for connecting the force receiving ring 100 with the detection ring 200. In the example shown in the figure, the connection member 410 connects the inner circumferential surface of the force receiving ring 100 with the outer circumferential surface of the detection ring 200 at a position along a positive domain of the X-axis. The connection member 420 connects the inner circumferential surface of the force receiving ring 100 with the outer circumferential surface of the detection ring 200 at a position along a negative domain of the X-axis. Therefore, as shown in the figure, a clearance H1 is secured between the force receiving ring 100 and the detection ring 200, and a clearance H2 is secured inside the detection ring 200, as shown in the figure.

As is apparent from the side view, the force receiving ring 100 and the detection ring 200 are equal in thickness (dimension in the direction of the Z-axis). In the side view, the detection ring 200 is completely hidden inside the force receiving ring 100. Although both of the rings are not necessarily required to be equal in thickness, it is preferable to make both the rings equal in thickness in view of realizing a thin-type sensor (sensor that is dimensionally reduced in the direction of the Z-axis as much as possible).

A supporting substrate 300 is a disk-shaped substrate, the diameter of which is equal to an outer diameter of the force receiving ring 100, having an upper surface in parallel with the XY-plane and being arranged at certain intervals below the force receiving ring 100 and the detection ring 200. The fixing members 510, 520 are members for fixing the detection ring 200 to the supporting substrate 300. In the side view, the fixing member 510 is hidden behind the fixing member 520 and does not appear. The fixing members 510, 520 have functions to connect the lower surface of the detection ring 200 with the upper surface of the supporting substrate 300. As depicted by broken lines in the top view, fixing member 510, 520 are arranged along the Y-axis.

Figure 2:
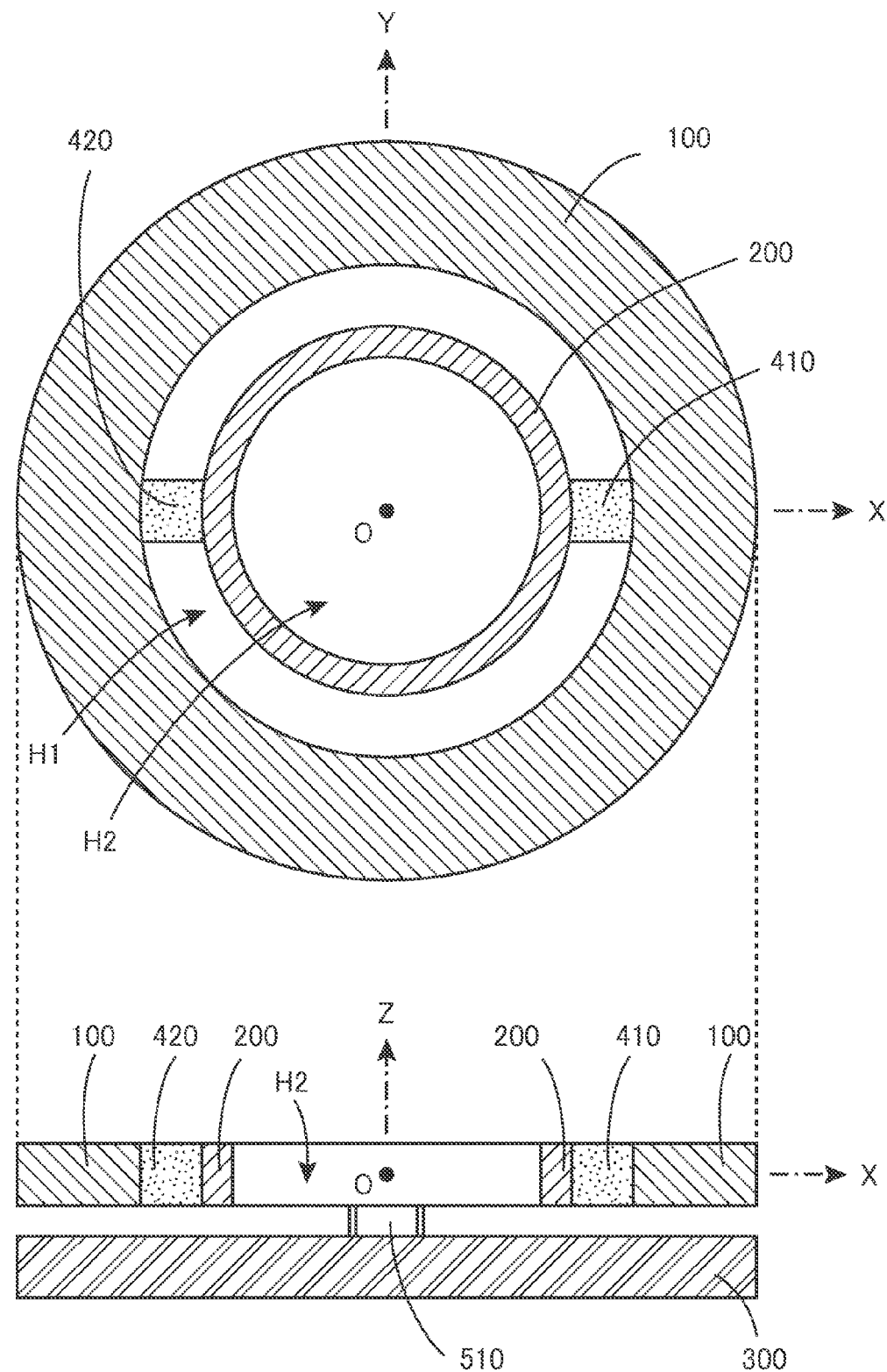
FIG. 2 is a cross sectional view (the upper part of the figure) of the basic structure shown in FIG. 1 which is cut along an XY-plane and a longitudinal sectional view (the lower part of the figure) of the basic structure which is cut along an XZ-plane thereof.

FIG. 2 is a cross sectional view (the upper part of the figure) in which the basic structure shown in FIG. 1 is cut along the XY-plane and a longitudinal sectional view (the lower part of the figure) in which it is cut along the XZ-plane. An origin O of the XYZ three-dimensional orthogonal coordinate system is shown at the center of the cross sectional view which is cut along the XY-plane. Here, FIG. 2 clearly shows a state that the detection ring 200 is connected to the force receiving ring 100 via connection members 410, 420 arranged at two sites on both sides.

Figure 3:
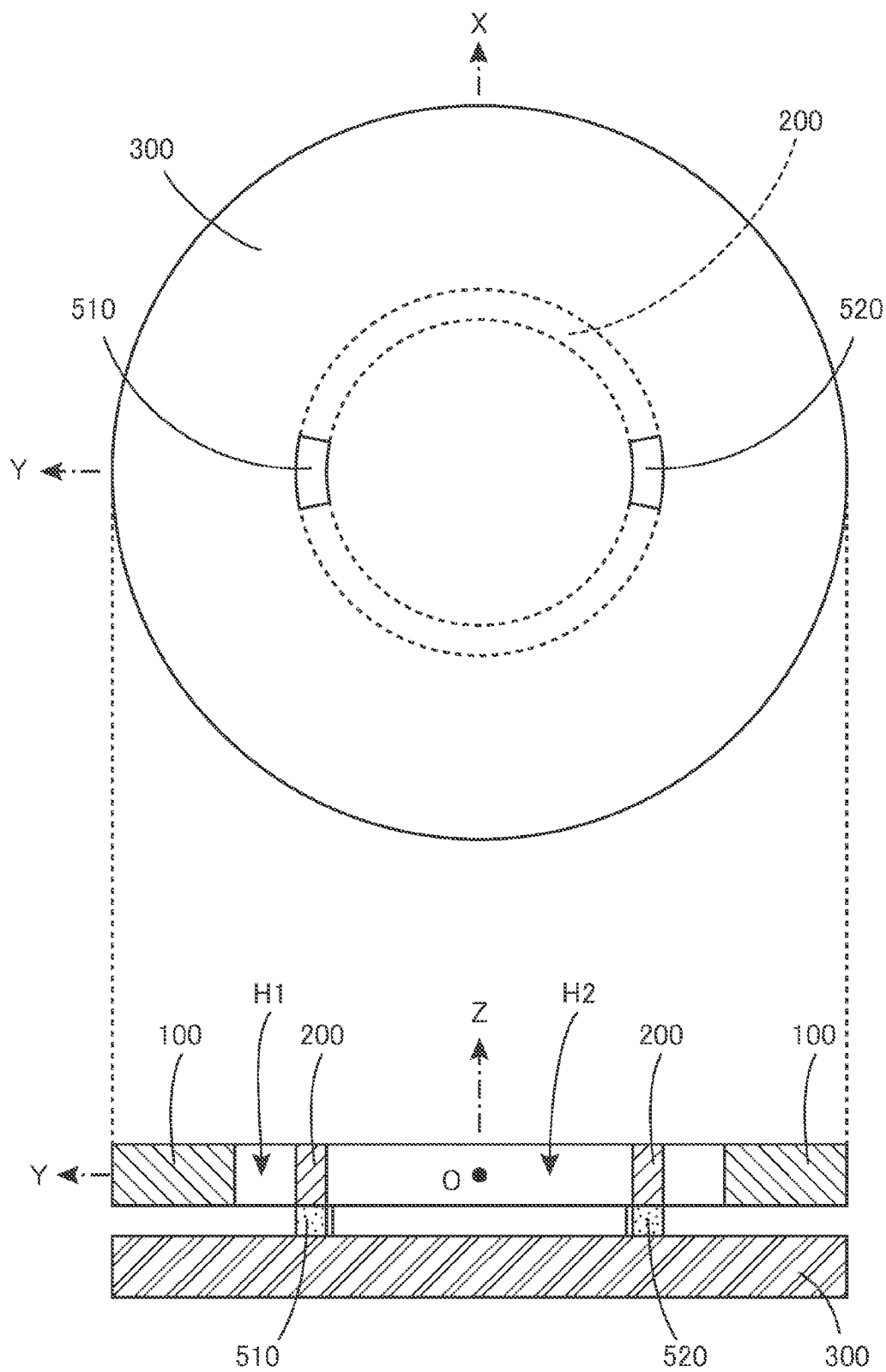
FIG. 3 is a top view (the upper part of the figure) of a supporting substrate 300 and fixing members 510, 520 of the basic structure shown in FIG. 1 and a longitudinal sectional view (the lower part of the figure) in which the basic structure is cut along a YZ-plane.

FIG. 3 is a top view (the upper part of the figure) showing the supporting substrate 300 and the fixing members 510, 520 of the basic structure shown in FIG. 1 and a longitudinal sectional view (the lower part of the figure) in which the basic structure is cut along the YZ-plane. The top view of FIG. 3 corresponds to a state that the top view of FIG. 1 is rotated counterclockwise by 90 degrees, with the Y-axis taken on the left side. Further, in the top view of FIG. 3, the position of the detection ring 200 is depicted by the broken lines. On the other hand, the longitudinal sectional view of FIG. 3 clearly shows a state that the detection ring 200 is fixed by the fixing members 510, 520 above the supporting substrate 300.

Then, a description will be given of a principle of detecting force and moment by utilizing the basic structure. First, consideration will be given to a situation found at the basic structure when force in the direction of each coordinate axis and moment around each coordinate axis are exerted on the force receiving ring 100, with the supporting substrate 300 being fixed.

As described above, in the example shown here, both the force receiving ring 100 and the detection ring 200 are circular rings arranged on the XY-plane in such a manner that the Z-axis is given as the central axis. However, the detection ring 200 is required to undergo at least partially elastic deformation resulting from exertions of force or moment to be detected. In other words, the detection ring 200 is required to be at least partially flexible. This is because the force sensor according to the present invention is to detect force or moment which is exerted on the basis of elastic deformation occurring on the detection ring 200.

On the other hand, as described above, the force receiving ring 100 is a constituent which has functions to transmit the force or the moment exerted on the detection ring 200. The force receiving ring 100 may be in principle constituted by an elastic body which undergoes elastic deformation or may be composed of a rigid body which does not undergo elastic deformation. However, in practice, it is preferable that the force receiving ring 100 is composed of a rigid body which does not undergo substantial deformation, as long as exerting force or moment is within a predetermined tolerance level. This is because the exerting force or moment is transmitted to the detection ring 200 efficiently as much as possible.

In the present invention, each part of the basic structure can be constituted by any given material. With commercial usage taken into account, it is preferable to constitute each part by using generally-used industrial materials such as metals (aluminum alloy and iron-based metal, for example) and plastics. A member composed of a generally-used industrial material is usually available as an elastic body or a rigid body, depending on a form thereof. For example, in the case of a metal, a metal block behaves like a rigid body, while a thin plate metal behaves like an elastic body. Therefore, the force receiving ring 100 and the detection ring 200 are able to perform any given functions by changing the respective forms, even when they are constituted by the same material.

For example, even where the force receiving ring 100 and the detection ring 200 are constituted by the same aluminum alloy, as shown in the cross sectional view of FIG. 2, the force receiving ring 100 is able to function as a rigid body which is practically free of elastic deformation by being made relatively great in width. The detection ring 200 is able to function as an elastic body which undergoes elastic deformation substantially as a whole by being made relatively small in width. That is, the detection ring 200 can be used as a ring which is flexible as a whole.

As a matter of course, when force and moment are applied to the force receiving ring 100, specifically, the force receiving ring 100 itself undergoes some elastic deformation. The force receiving ring 100 undergoes elastic deformation and is negligible if the elastic deformation is only slight as compared with the elastic deformation of the detection ring 200. And, the force receiving ring 100 is to be considered as a practically rigid body. Therefore, hereinafter, a description will be given on the assumption that the force receiving ring 100 is a rigid body and elastic deformation resulting from force and moment occurs exclusively on the detection ring 200.

Figure 4:
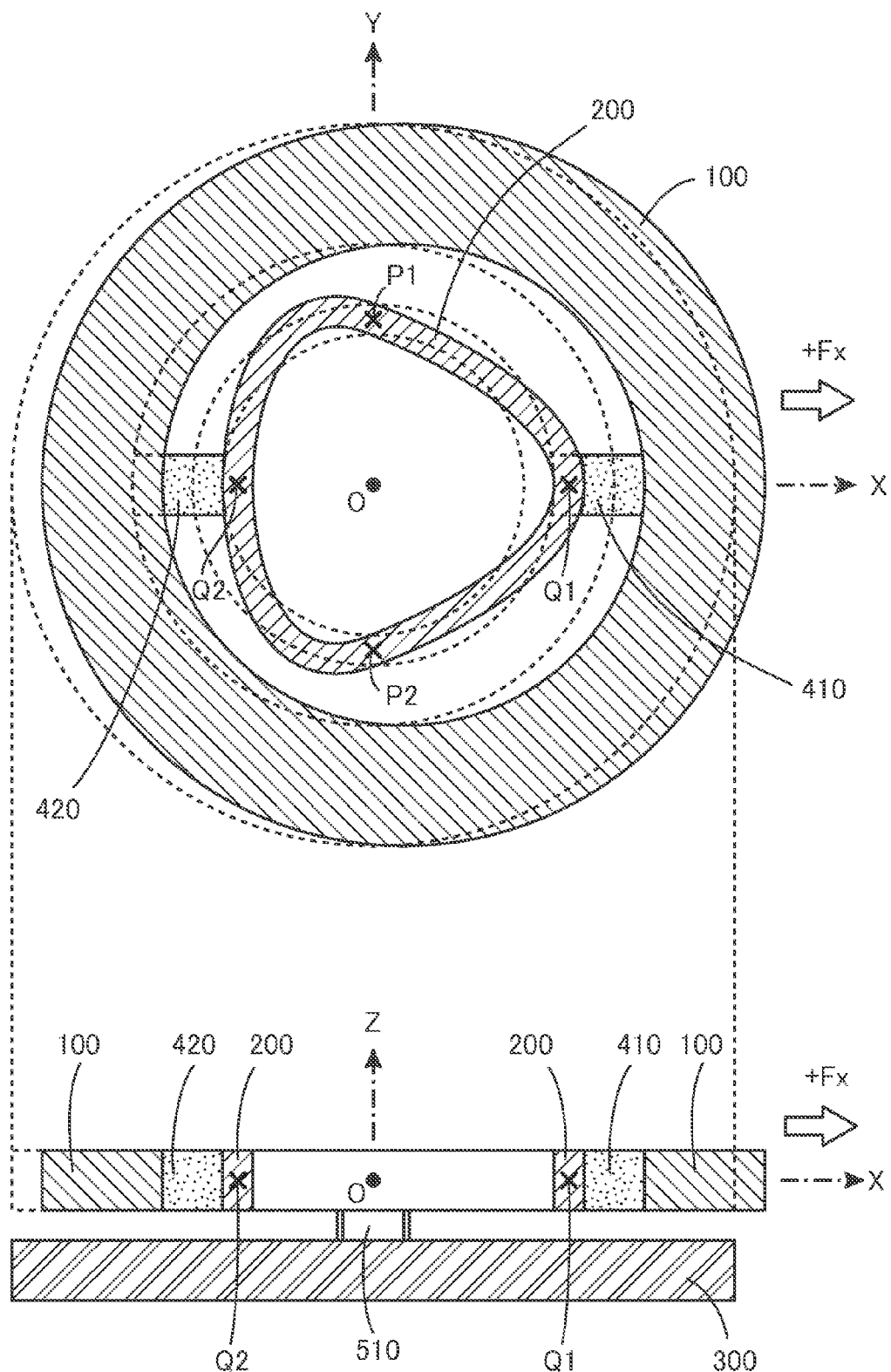
FIG. 4 is a cross sectional view (the upper part of the figure) on the XY-plane and a longitudinal sectional view (the lower part of the figure) on the XZ-plane, each of which shows a deformed state when force +Fx in the positive direction of the X-axis is exerted on a force receiving ring 100 of the basic structure shown in FIG. 1.

First, consideration will be given to a change of the basic structure when force in a direction of the X-axis is exerted on the force receiving ring 100, with the supporting substrate 300 being fixed. FIG. 4 is a cross sectional view (the upper part of the figure) on the XY-plane and a longitudinal sectional view (the lower part of the figure) on the XZ-plane, each of which shows a deformed state when force +Fx in the positive direction of the X-axis is exerted on the force receiving ring 100 of the basic structure shown in FIG. 1. The supporting substrate 300 is fixed and not movable, while the force receiving ring 100 moves to the right hand side in the figure by the force +Fx in the positive direction of the X-axis. As a result, the detection ring 200 undergoes deformation as shown in the figure. In addition, the broken lines in the figure show the positions of these rings before movement or deformation.

Here, for the sake of convenience of description of the deformation mode, consideration will be given to two fixing points P1, P2 and two exertion points Q1, Q2. The fixing points P1, P2 are points defined on the Y-axis and correspond to positions of the fixing members 510, 520 shown in FIG. 1. That is, the detection ring 200 is fixed to the supporting substrate 300 by the fixing members 510, 520 at the fixing points P1, P2. On the other hand, the exertion points Q1, Q2 are points which are defined on the X-axis, and the detection ring 200 is connected to the force receiving ring 100 by the connection members 410, 420 at the exertion points Q1, Q2.

As described above, in the present invention, the exertion points are positions to which the connection members are connected, and the fixing points are positions to which the fixing members are connected. Then, it is important that the exertion points and the fixing points are arranged at different positions. In the example shown in FIG. 4, the fixing points P1, P2 and the exertion points Q1, Q2 are arranged at different positions on the XY-plane. This is because when the exertion points and the fixing points occupy the same positions, the detection ring 200 undergoes no elastic deformation. In addition, in the above example, the fixing points P1, P2 and the exertion points Q1, Q2 are all defined on the XY-plane. However, the exertion points and the fixing points are not necessarily defined on the XY-plane. Irrespective of whether the exertion points and the fixing points are on the XY-plane or not, only if an orthographic projection image of the exertion points on the XY-plane and an orthographic projection image of the fixing points on the XY-plane are formed at different positions, elastic deformation necessary for the present invention is allowed to occur on the detection ring 200.

When the force +Fx in the positive direction of the X-axis is exerted on the force receiving ring 100, as shown in FIG. 4, the force on the right-hand side in the figure is applied to the exertion points Q1, Q2 of the detection ring 200. However, since the fixing points P1, P2 of the detection ring 200 are fixed, the detection ring 200 which is flexible is deformed from a reference circular state into a deformed state as shown in the figure (figures which show a deformed state in the present application are depicted to some extent in an exaggerated manner for emphasizing the deformed state and they do not necessarily show the deformation mode precisely). To be more specific, as shown in the figure, between the point P1 and the point Q1 as well as between the point P2 and the point Q1, a tensile force is exerted on both ends of a quadrant of the detection ring 200, by which the quadrant shrinks inwardly. Between the point P1 and the point Q2 as well as between the point P2 and the point Q2, a pressing force is exerted on the both ends of the quadrant of the detection ring 200, by which the quadrant swells outwardly.

Where force −Fx in the negative direction of the X-axis is exerted on the force receiving ring 100, a phenomenon occurs in which the left and right sides are reversed to that shown in FIG. 4. Further, where force +Fy in the positive direction of the Y-axis and force −Fy in the negative direction of the Y-axis are exerted on the force receiving ring 100, a phenomenon occurs in which a deformed state at the upper part of FIG. 4 is rotated by 90 degrees.

Figure 5:
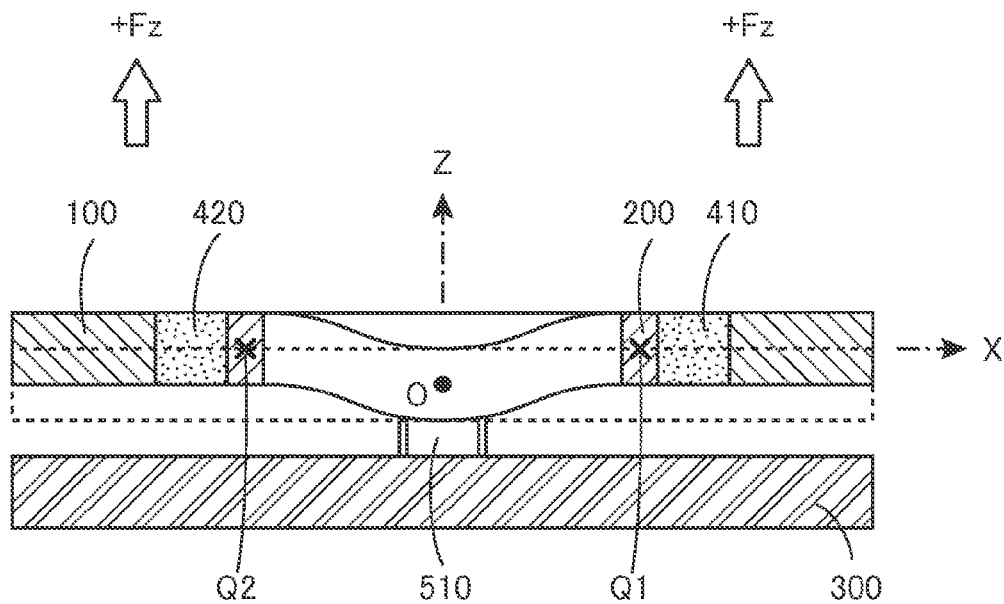
FIG. 5 is a longitudinal sectional view on the XZ-plane showing a deformed state when force +Fz in the positive direction of the Z-axis is exerted on the force receiving ring 100 of the basic structure shown in FIG. 1.

Next, consideration will be given to a change of the basic structure when force in a direction of the Z-axis is exerted on the force receiving ring 100, with the supporting substrate 300 being fixed. FIG. 5 is a longitudinal sectional view on the XZ-plane which shows a deformed state when force +Fz in the positive direction of the Z-axis is exerted on the force receiving ring 100 of the basic structure shown in FIG. 1. Although the supporting substrate 300 is fixed and therefore not movable, the force receiving ring 100 moves upward in the figure due to the force +Fz in the positive direction of the Z-axis. As a result, the detection ring 200 undergoes deformation as shown in the figure. Here, the broken line in the figure depicts a position of each ring before movement or deformation.

In this case as well, the deformation mode is fundamentally based on the fact that positions of the two fixing points P1, P2 (positions fixed by the fixing members 510, 520) are not movable and positions of the two exertion points Q1, Q2 move upward. The detection ring 200 gradually undergoes deformation from the positions of the fixing points P1, P2 to those of the exertion points Q1, Q2. Further, where the force −Fz in the negative direction of the Z-axis is exerted on the force receiving ring 100, the force receiving ring 100 moves downward in the figure. As a result, the detection ring 200 shows a deformation mode which is upside down as compared with the deformation mode shown in FIG. 5.

Figure 6:
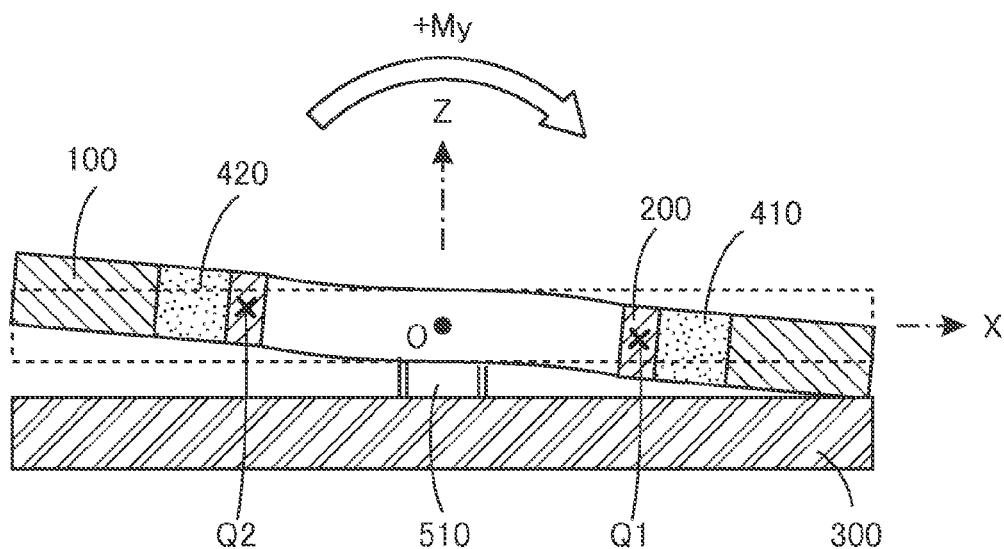
FIG. 6 is a longitudinal sectional view on the XZ-plane showing a deformed state when moment +My which is positive rotation around the Y-axis is exerted on the force receiving ring 100 of the basic structure shown in FIG. 1.

Next, consideration will be given to a change of the basic structure, when moment around the Y-axis is exerted on the force receiving ring 100, with the supporting substrate 300 being fixed. FIG. 6 is a longitudinal sectional view on the XZ-plane showing a deformed state when moment +My which is positive rotation around the Y-axis is exerted on the force receiving ring 100 of the basic structure shown in FIG. 1. By the way, in the present application, a symbol of moment exerting around a predetermined coordinate axis is determined so that a rotation direction in which a right-hand screw rotates for allowing the screw to advance in a positive direction of the coordinate axis is given as a positive direction. For example, the rotation direction of moment +My shown in FIG. 6 is a rotation direction in which the right-hand screw is allowed to advance in the positive direction of the Y-axis.

In this case as well, although the supporting substrate 300 is fixed and therefore not movable, the force receiving ring 100 receives the moment +My which is positive rotation around the Y-axis and rotates clockwise around the origin O in the figure. As a result, the exertion point Q1 moves downward, while the exertion point Q2 moves upward. The detection ring 200 gradually undergoes deformation from the positions of the fixing points P1, P2 (positions fixed by the fixing members 510, 520) to the positions of the exertion points Q1, Q2. Where the moment −My which is negative rotation around the Y-axis is exerted on the force receiving ring 100, a phenomenon occurs in which the left and right sides are reversed to that shown in FIG. 6. Further, where the moment +Mx which is positive rotation around the X-axis and moment −Mx which is negative rotation around the X-axis are exerted on the force receiving ring 100, a phenomenon occurs in which the deformed state shown in the top view is rotated by 90 degrees.

Figure 7:
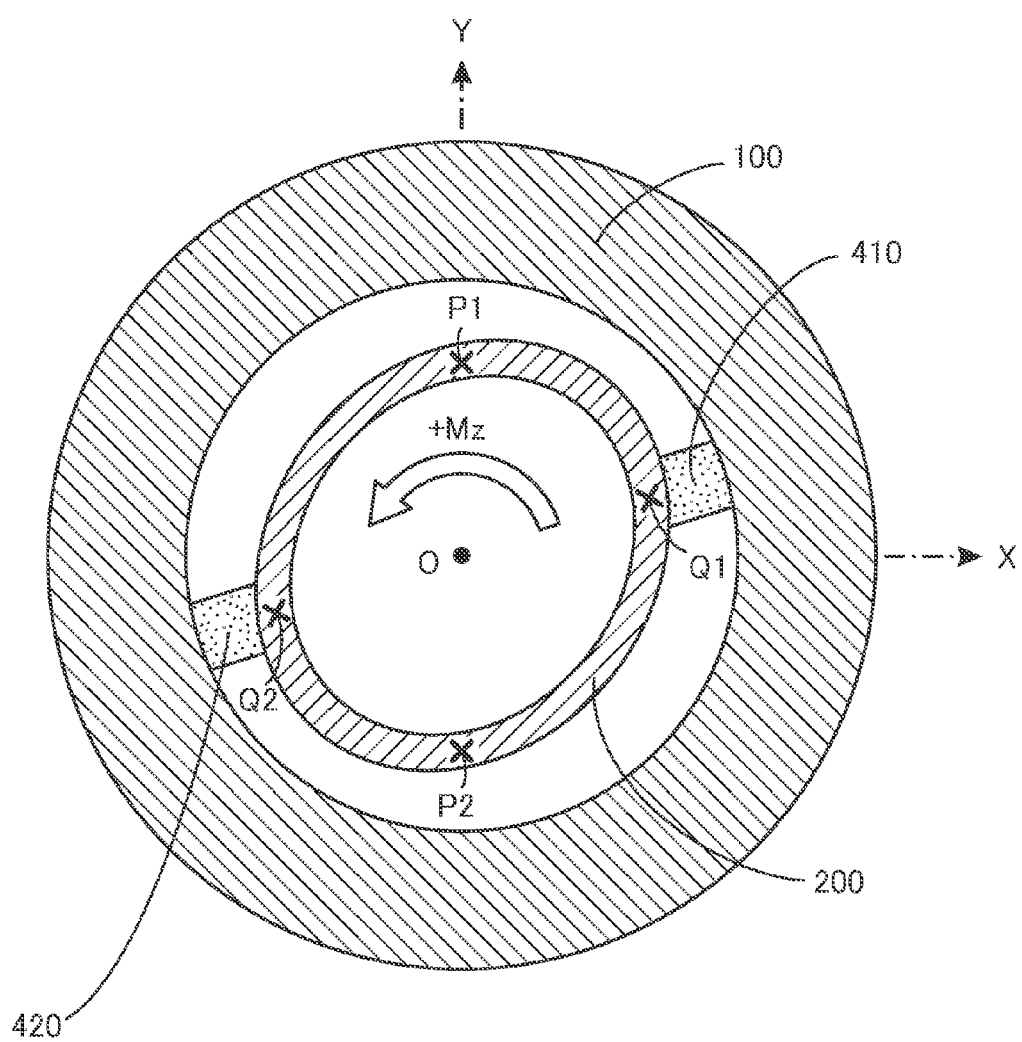
FIG. 7 is a cross sectional view on the XY-plane which shows a deformed state when moment +Mz which is positive rotation around the Z-axis is exerted on the force receiving ring 100 of the basic structure shown in FIG. 1.

Finally, consideration will be given to a change of the basic structure when moment around the Z-axis is exerted on the force receiving ring 100, with the supporting substrate 300 being fixed. FIG. 7 is a cross sectional view on the XY-plane showing a deformed state when moment +Mz which is positive rotation around the Z-axis exerted on the force receiving ring 100 of the basic structure shown in FIG. 1. In this case as well, although the supporting substrate 300 is fixed and therefore not movable, the force receiving ring 100 receives the moment +Mz which is positive rotation around the Z-axis and rotates counterclockwise around the origin O in the figure.

As a result, counterclockwise force as shown in the figure is applied to the exertion points Q1, Q2 on the detection ring 200. However, since the positions of the fixing points P1, P2 on the detection ring 200 are fixed, the detection ring 200 which is flexible is to undergo deformation from a reference circular state into a deformed state, as shown in the figure. To be more specific, as shown in the figure, between the point P2 and the point Q1 as well as between the point P1 and the point Q2, a tensile force is exerted on both ends of a quadrant of the detection ring 200, by which the quadrant shrinks inwardly. Between the point P1 and the point Q1 as well as between the point P2 and the point Q2, a pressing force is exerted on the both ends of the quadrant of the detection ring 200, by which the quadrant swells outwardly and undergoes deformation into an oval shape as a whole. On the other hand, where moment −Mz which is negative rotation around the Z-axis is exerted on the force receiving ring 100, the force receiving ring 100 rotates clockwise around the origin O in the figure. A deformed state occurs in which the state shown in FIG. 7 is reversed.

A description has been so far given of the deformation modes occurring on the detection ring 200 where force in the direction of each coordinate axis and moment around each coordinate axis are exerted on the force receiving ring 100, with the supporting substrate 300 of the basic structure shown in FIG. 1 being fixed. The deformation modes are different from each other and also different in extent of deformation depending on a magnitude of the force and moment which are exerted. Therefore, an elastic deformation of the detection ring 200 is detected to collect information on the mode and extent thereof, thus making it possible to detect the force in the direction of each coordinate axis and the moment around each coordinate axis individually and independently. This is a basic principle of the force sensor according to the present invention.

In order to conduct detection based on the above-described basic principle, the force sensor according to the present invention is provided, in addition to the basic structure shown in FIG. 1, with detection elements for electrically detecting elastic deformation of the detection ring 200 and detection circuits for outputting detection values of force in a direction of a predetermined coordinate axis or moment around a predetermined coordinate axis which is exerted on the force receiving ring 100, with the supporting substrate 300 being fixed, on the basis of detection results of the detection elements. A detailed description will be given of examples of specific constitutions of the detection elements and the detection circuits in Section 3 and subsequent sections.

As will be described later, the detection elements and the detection circuits can be incorporated into the basic structure shown in FIG. 1, by which the size of the force sensor according to the present invention can be made substantially equal to that of the basic structure. As apparent from the side view shown at the lower part of FIG. 1, the basic structure is structurally suitable for being made thin. That is, an entire thickness of the basic structure (dimension in the direction of the Z-axis) is a sum of the thickness of the force receiving ring 100 (thickness of the detection ring 200), that of the fixing members 510, 520 and that of the supporting substrate 300. Here, the detection ring 200 may be set to be sufficiently thick in arranging detection elements to be described later. The fixing members 510, 520 may be set to be sufficiently thick so as not to inhibit downward deformation of the detection ring 200. And, the supporting substrate 300 may be set to be sufficiently thick so as to support other constituents.

Therefore, the force sensor according to the present invention has functions to detect individually and independently force in the direction of each coordinate axis and moment around each coordinate axis in an XYZ three-dimensional orthogonal coordinate system. Further, this force sensor can be made simpler in structure and thinner in thickness than a conventional force sensor.

The basic structure shown in FIG. 1 is an example in which the force receiving ring 100 is arranged outside and the detection ring 200 is arranged inside. However, a positional relationship between the rings can be exchanged. That is, a constitution in which the force receiving ring 100 is arranged inside and the detection ring 200 is arranged outside can be adopted. However, when the detection ring 200 in a deformed state comes into contact with an external object, disturbance is added to a deformation mode. This may result in a failure of obtaining a correct detection value. Therefore, in practice, it is preferable that the force receiving ring 100 is arranged outside and the detection ring 200 is arranged inside, as shown in the above example, thereby preventing the detection ring 200 from coming into contact with the external object.

<<<Section 2. Detection of Displacement>>>

As described above, in the force sensor according to the present invention, a mode and a magnitude of elastic deformation occurring on the detection ring 200 are detected, thereby determining a direction and a magnitude of exerted force or moment. Now, as a method for detecting a mode and a magnitude of elastic deformation, a method for detecting displacement at specific sites on the detection ring 200 (here, referred to as measurement points) will be described. In the embodiment shown here, as a detection element, used is an element having functions to electrically detect displacement of the detection ring 200 at predetermined measurement points.

Figure 8:
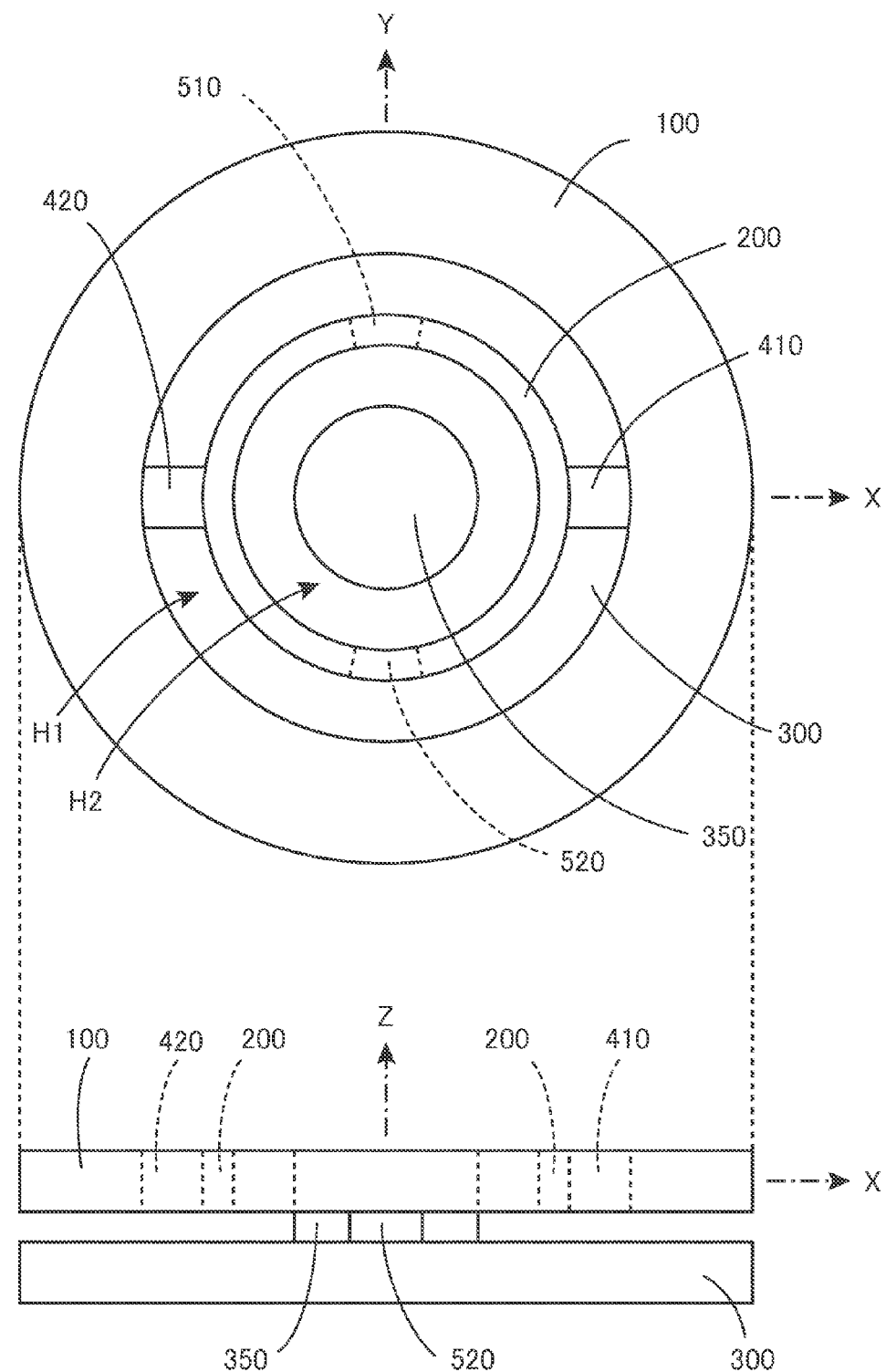
FIG. 8 is a top view (the upper part of the figure) and a side view (the lower part of the figure), each of which shows an embodiment in which the fixed assistant body 350 for detecting displacement is added to the basic structure shown in FIG. 1.

FIG. 8 is a top view (the upper part of the figure) and a side view (the lower part of the figure), each of which shows an embodiment in which a fixed assistant body 350 for detecting displacement is added to the basic structure shown in FIG. 1. As shown in the figure, the detection ring 200 is arranged inside the force receiving ring 100 and the fixed assistant body 350 is arranged further inside in the basic structure. The fixed assistant body 350 is a cylindrical object having the Z-axis as a central axis, the lower surface of which is fixed on the upper surface of the supporting substrate 300. An outer circumferential surface of the fixed assistant body 350 faces an inner circumferential surface of the detection ring 200, with a clearance H2 held therebetween.

Figure 9:
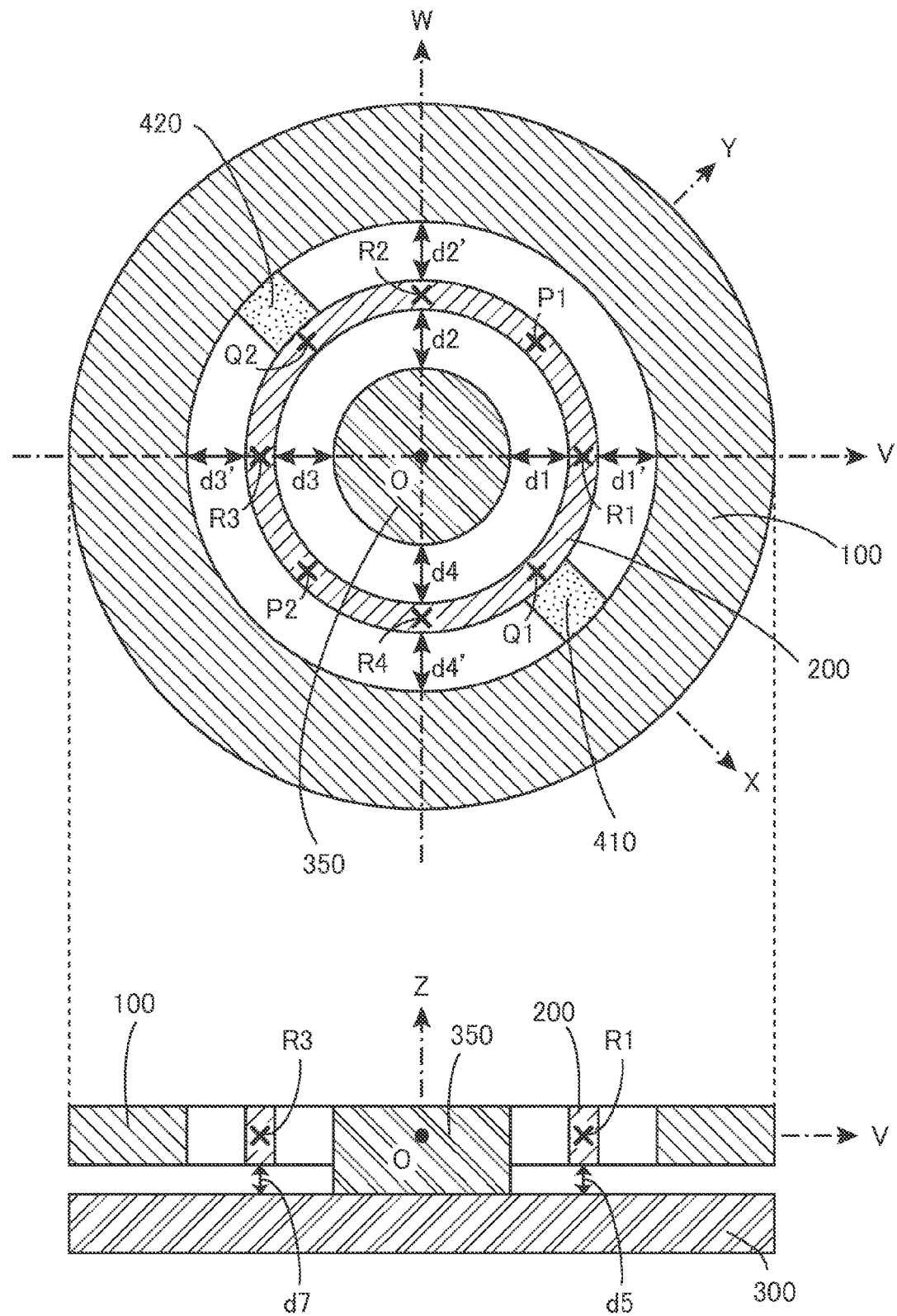
FIG. 9 is a cross sectional view (the upper part of the figure) in which the basic structure shown in FIG. 8 is cut along the XY-plane and a longitudinal sectional view (the lower part of the figure) in which the basic structure is cut along a VZ-plane.

FIG. 9 is a cross sectional view (the upper part of the figure) in which the basic structure shown in FIG. 8 is cut along the XY-plane and a longitudinal sectional view (the lower part of the figure) in which the basic structure is cut along the VZ-plane. Here, the V-axis is an axis which passes through the origin O of the XYZ three-dimensional orthogonal coordinate system and forms 45 degrees with respect to the X-axis, wherein its positive domain positions at a first quadrant of the XY-plane and its negative domain positions at a third quadrant of the XY-plane. Further, the W-axis is an axis which passes through the origin O of the XYZ three-dimensional orthogonal coordinate system and is orthogonal to the V-axis, wherein its positive domain positions at a second quadrant of the XY-plane and its negative domain positions at a fourth quadrant of the XY-plane. The cross sectional view at the upper part of FIG. 9 is depicted so that the positive direction of the V-axis is taken on the right-hand side and the positive direction of the W-axis is taken upward. This figure corresponds to a figure in which the fixed assistant body 350 is added to the basic structure shown at the upper part of FIG. 2 and rotated clockwise by 45 degrees. Further, the longitudinal sectional view at the lower part of FIG. 9 is a longitudinal sectional view in which the basic structure is cut along the VZ-plane and, therefore, the right-hand side is the positive direction of the V-axis.

As described in Section 1, two fixing points P1, P2 are arranged on the Y-axis and two exertion points Q1, Q2 are arranged on the X-axis on the detection ring 200. Here, four measurement points R1 to R4 are also defined. As shown in the figure, a first measurement point R1, a second measurement point R2, a third measurement point R3 and a fourth measurement point R4 are respectively arranged at the positive domain of the V-axis, the positive domain of the W-axis, the negative domain of the V-axis and the negative domain of the W-axis. As a result, when an intermediate circle positioned at a midpoint between an outer-circumference contour circle and an inner-circumference contour circle of the detection ring 200 is defined in the cross sectional view at the upper part of FIG. 9, individual points, Q1, R1, P1, R2, Q2, R3, P2, R4 are to be arranged at an equal interval on the intermediate circle in accordance with the above-described order. The reason for defining the four measurement points R1 to R4 at the above-described positions is that displacement resulting from elastic deformation of the detection ring 200 becomes most prominent at these positions.

Displacement in a radial direction of these four measurement points R1 to R4 may be detected by measuring distances d1, d2, d3, d4 indicated by the arrows shown in the cross sectional view at the upper part of FIG. 9. Each of the distances d1, d2, d3, d4 is a distance between a measurement target surface positioned in the vicinity of each of the measurement points R1, R2, R3, R4 on the inner circumferential surface of the detection ring 200 and a counter reference surface positioned on an outer circumference of the fixed assistant body 350 and facing the measurement target surface. An increase in the distance indicates that the vicinity of the measurement point swells in a radial direction. A decrease in the distance indicates that the vicinity of the measurement point shrinks in a radial direction. Therefore, a detection element capable of electrically detecting the distances is made ready, by which it is possible to measure an extent of deformation in a radial direction of the vicinity of each measurement point.

Alternatively, it is possible to adopt a method for measuring distances d1', d2', d3', d4' indicated by the arrows shown in the cross sectional view at the upper part of FIG. 9. Each of the distances d1', d2', d3', d4' is a distance between a measurement target surface positioned in the vicinity of each of the measurement points R1, R2, R3, R4 on the outer circumferential surface of the detection ring 200 and a counter reference surface positioned on an inner circumference of the force receiving ring 100 and facing the measurement target surface. However, the force receiving ring 100 in itself also undergoes displacement. Therefore, a measured value of each distance indicates a difference in displacement between the force receiving ring 100 and the detection ring 200. As a result, some correction processing is needed in order to determine displacement at each measurement point. In practice, it is preferable to measure the distances d1, d2, d3, d4.

It is not necessary to provide the fixed assistant body 350 if measurement of the distances d1', d2', d3', d4' are made. A distance between the force receiving ring 100 and the detection ring 200 may be measured by using a detection element to electrically detect a distance between a measurement target surface positioned in the vicinity of each of the measurement points R1, R2, R3, R4 on the detection ring 200 and a counter reference surface facing the measurement target surface of the force receiving ring 100. Thus, there is eliminated a necessity for providing the fixed assistant body 350. Further, if measurement of the distances d1', d2', d3', d4' are made, it is applicable that the force receiving ring 100 is arranged inside and the detection ring 200 is arranged outside.

On the other hand, displacement in a vertical direction (the direction of the Z-axis) of the four measurement points R1 to R4 may be detected by measuring distances d5-d8 indicated by the arrows shown in the longitudinal sectional view at the lower part of FIG. 9 (Although the distances d6, d8 are not illustrated, the distance d6 is a distance immediately under the measurement point R2 positioned behind the fixed assistant body 350, and the distance d8 is a distance immediately under the measurement point R4 positioned in front of the fixed assistant body 350). Each of the distances d5, d6, d7, d8 is a distance between a measurement target surface positioned in the vicinity of each of the measurement points R1, R2, R3, R4 on the lower surface of the detection ring 200 and a counter reference surface positioned on the upper surface of the supporting substrate 300 and facing the measurement target surface. An increase in the distance indicates that the vicinity of each measurement point undergoes upward displacement, while a decrease in the distance indicates that the vicinity of each measurement point undergoes downward displacement. Therefore, a detection element capable of electrically detecting the distances is made ready, by which it is possible to measure an extent of vertical deformation in the vicinity of each measurement point.

As described above, displacement in a radial direction and displacement in a vertical direction of the four measurement points R1 to R4 can be measured, by which it is possible to understand an overall deformation mode of the detection ring 200 and an extent of the deformation. It is, thus, possible to detect six-axis-components of force in the direction of each coordinate axis and moment around each coordinate axis in an XYZ three-dimensional orthogonal coordinate system.

Figures 10, 11:
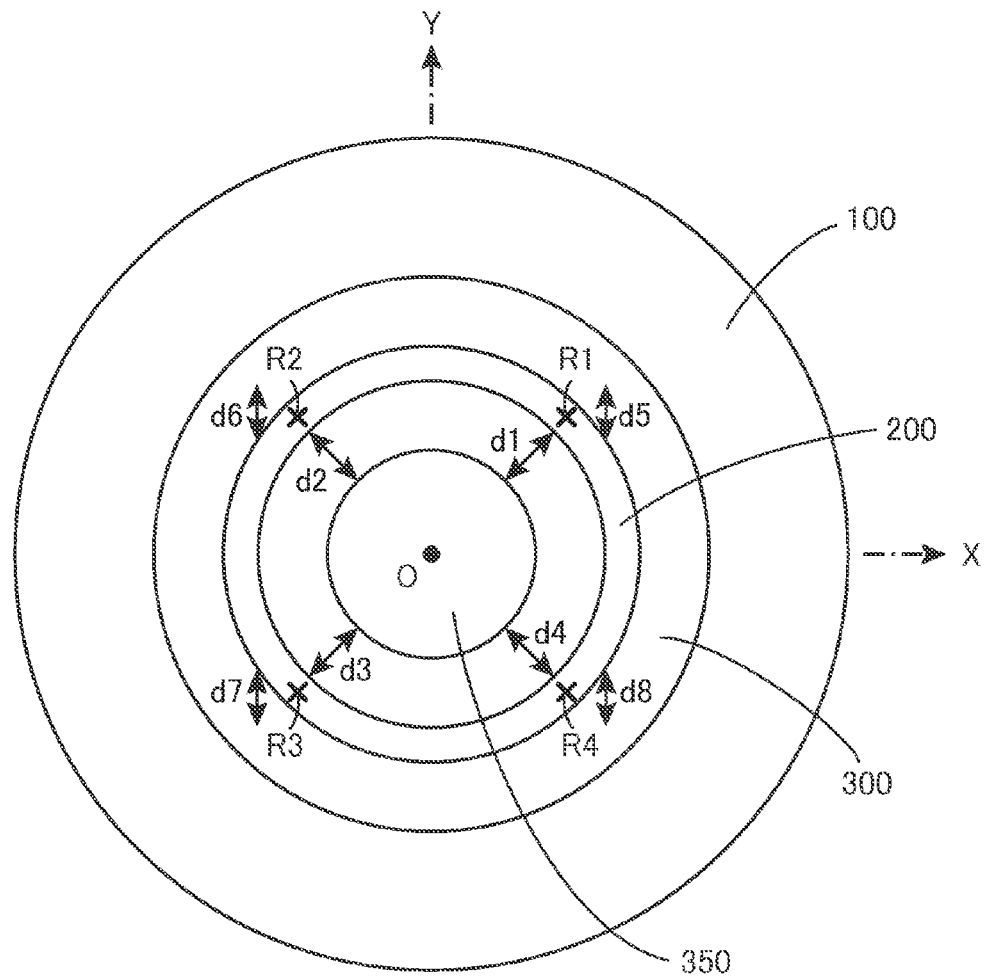
FIG. 10 is a top view showing distance measurement sites in the basic structure shown in FIG. 8.
FIG. 11 is a table which shows changes in distances d1 to d8 when force in the direction of each coordinate axis and moment around each coordinate axis are exerted on the basic structure shown in FIG. 10.

FIG. 10 is a top view showing distance measurement sites necessary for detecting the six-axis-components. That is, in this example, as described above, with respect to the first measurement point R1, the distance d1 (radial displacement) and the distance d5 (vertical displacement) are to be measured, with respect to the second measurement point R2, the distance d2 (radial displacement) and the distance d6 (vertical displacement) are to be measured, with respect to the third measurement point. R3, the distance d3 (radial displacement) and the distance d7 (vertical displacement) are to be measured, and with respect to the fourth measurement point R4, the distance d4 (radical displacement) and the distance d8 (vertical displacement) are to be measured.

FIG. 11 is a table which shows changes in distances d1 to d8 when force in the direction of each coordinate axis and moment around each coordinate axis are exerted on the force receiving ring 100, with the supporting substrate 300 being fixed, at the basic structure shown in FIG. 10. In the table, [+] indicates an increase in distance, [−] indicates a decrease in distance, and [0] indicates no variation in distance. The above results will be easily understood when consideration is given to the specific deformation mode of the detection ring 200 described in Section 1.

For example, when force +Fx in the positive direction of the X-axis is exerted on the force receiving ring 100, as shown in FIG. 4, the detection ring 200 undergoes such deformation that a quadrant between the point P1 and the point Q1 and a quadrant between the point P2 and the point Q1 shrink inwardly, and a quadrant between the point P1 and the point Q2 and a quadrant between the point P2 and the point Q2 swell outwardly. Therefore, the distances d1, d4 decrease, while the distances d2, d3 increase. At this time, since the detection ring 200 undergoes no vertical deformation, the distances d5 to d8 do not change. The row +Fx in the table of FIG. 11 shows the above-described results. For the same reason, the results are obtained shown in the row +Fy in the table of FIG. 11 upon exertion of force +Fy in the positive direction of the Y-axis.

Further, when force +Fz in the positive direction of the Z-axis is exerted on the force receiving ring 100, the detection ring 200 undergoes such deformation as shown in FIG. 5, by which the distances d5 to d8 increase. At this time, since the detection ring 200 undergoes no radial deformation, the distances d1 to d4 do not change. The row +Fz in the table of FIG. 11 shows the above-described results.

Then, when moment +My which is positive rotation around the Y-axis is exerted on the force receiving ring 100, the detection ring 200 undergoes such deformation as shown in FIG. 6, that is, the right half in the figure undergoes downward displacement, and the left half in the figure undergoes upward displacement. Thus, the distances d5, d8 decrease and the distances d6, d7 increase. At this time, since the detection ring 200 undergoes no radial deformation, the distances d1 to d4 do not change. The row +My in the table of FIG. 11 shows the above-described results. For the same reason, the results are obtained shown in the row +Mx in the table of FIG. 11 upon exertion of moment +Mx which is positive rotation around the X-axis.

Finally, when moment +Mz which is positive rotation around the Z-axis is exerted on the force receiving ring 100, the detection ring 200 undergoes such deformation as shown in FIG. 7. That is, the detection ring 200 undergoes deformation in such a manner that a quadrant between the point P1 and the point Q1 and a quadrant between the point P2 and the point Q2 swell outwardly, while a quadrant between the point P1 and the point Q2 and a quadrant between the point P2 and the point Q1 shrink inwardly. Therefore, the distances d1, d3 increase and the distances d2, d4 decrease. At this time, since the detection ring 200 undergoes no vertical deformation, the distances d5 to d8 do not change. The row +Mz in the table of FIG. 11 shows the above-described results.

Although the table of FIG. 11 shows the results obtained upon exertion of force in a positive direction and moment with positive rotation, upon exertion of force in a negative direction and moment with negative rotation, the results are obtained in which [+] and [−] are reversed. As a result, patterns of change in distances d1 to d8 differ depending on individual cases on which six-axis-components are exerted, respectively. Further, the larger the force and moment which are exerted are, the larger the variance in distance is. Therefore, the detection circuits are used to make a predetermined operation on the basis of measured values of the distances d1 to d8, thus making it possible to output independently detection values of the six-axis-components. Specific arithmetic expressions will be described in detail by referring to the embodiment of Section 3.

Where there is no need for obtaining detection values of all the six-axis-components, it is not always necessary to measure the distances in eight different ways. For example, FIG. 12 is a top showing a modification example of distance measurement sites in the basic structure shown in FIG. 8. In the example shown in FIG. 10, the distances d1 to d8 are measured in eight different ways. However, in the example shown in FIG. 12, it is sufficient to measure the distances d1 to d4, d9, d10 in six different ways.

Here, the distances d1 to d4 are the same as those of the above-described example. That is, the distance d1 indicates displacement in a radial direction for the first measurement point R1, the distance d2 indicates displacement in a radial direction for the second measurement point R2, the distance d3 indicates displacement in a radial direction for the third measurement point R3, and the distance d4 indicates displacement in a radial direction for the fourth measurement point R4. On the other hand, no measurement is made for displacement in a vertical direction for the four measurement points R1 to R4. In other words, no measurement is made for the distances d5 to d8 in the above-described example. Instead, the exertion point Q1 is given as a fifth measurement point to measure the displacement thereof in a vertical direction. The second exertion point Q2 is given as a sixth measurement point to measure the displacement thereof in a vertical direction.

That is, the distance d9 shown in FIG. 12 is a distance between a measurement target surface positioned in the vicinity of the first exertion point Q1 (the fifth measurement point) on the lower surface of the detection ring 200 and a counter reference surface positioned on the upper surface of the supporting substrate 300 and facing the measurement target surface. The distance d10 shown in FIG. 12 is a distance between a measurement target surface positioned in the vicinity of the second exertion point Q2 (the sixth measurement point) on the lower surface of the detection ring 200 and a counter reference surface positioned on the upper surface of the supporting substrate 300 and facing the measurement target surface.

FIG. 13 is a table which shows changes in distances d1 to d4, d9, d10 when force in the direction of each coordinate axis and moment around each coordinate axis are exerted on the force receiving ring 100, with the supporting substrate 300 being fixed, in the basic structure shown in FIG. 12. In this case as well, [+] indicates an increase in distance, [−] indicates a decrease in distance, and [0] indicates no variation in distance. As described above, the above-described results are to be obtained for the distances d1 to d4.

On the other hand, a fact that the above-described results are obtained for the distances d9, d10 will be easily understood, when consideration is given to the specific deformation mode of the detection ring 200 described in Section 1. That is, even upon exertion of force +Fx in the positive direction of the X-axis or force +Fy in the positive direction of the Y-axis, the exertion points Q1, Q2 do not vary in a vertical direction. Therefore, the rows +Fx and +Fy are [0] for the distances d9 and d10. However, upon exertion of force +Fz in the positive direction of the Z-axis, the exertion points Q1, Q2 undergo upward displacement, by which the row +Fz gives [+] for the distances d9 and d10.

Further, upon exertion of moment +Mx which is positive rotation around the X-axis, the exertion points Q1, Q2 positioning on the X-axis are points on the rotation axis and, therefore, do not vary in a vertical direction. Thereby, the row +Mx gives [0] for the distances d9, d10. However, upon exertion of moment +My which is positive rotation around the Y-axis, the exertion point Q1 undergoes downward displacement, while the exertion point Q2 undergoes upward displacement. Therefore, the row +My gives [−] for the distance d9 and gives [+] for the distance d10. Finally, upon exertion of moment +Mz which is positive rotation around the Z-axis, the exertion points Q1, Q2 do not vary in a vertical direction. Therefore, the row +Mz gives [0] for the distances d9, d10. Upon exertion of force in a negative direction and moment with negative rotation, the results are obtained in the table of FIG. 13 in which [+] and [−] are reversed.

Consequently, patterns of change in distances d1 to d4, d9, d10 differ depending on individual cases on which the six-axis-components are exerted. Further, the larger the force and moment which are exerted become, the larger the variance in distance is. However, the row +Mx in the table of FIG. 13 gives [0] for all the distances. This indicates that measurement of the distances d1 to d4, d9, d10 do not provide information on moment Mx around the X-axis. However, information is obtained on five-axis-components excluding the information on the moment Mx. Therefore, detection circuits are used to carry out a predetermined operation on the basis of measured values of the distances d1 to d4, d9, d10, thereby making it possible to output independently detection values of the five-axis-components excluding the moment Mx. Specific arithmetic expressions will be described in detail by referring to the embodiments of Section 3.

Accordingly, the force sensor according to the present invention is able to detect independently six-axis-components, Fx, Fy, Fz, Mx, My, Mz. However, where there is no need for having detection values of all the six-axis-components, detection elements can be omitted, whenever necessary, to reduce costs.

Further, FIG. 9 shows an example where two exertion points Q1, Q2 and two fixing points P1, P2 are arranged. In the force sensor according to the present invention, the number of the exertion points and the number of the fixing points are not necessarily limited to two. That is, in a fundamental embodiment to be described here, it is acceptable that the n number of plural exertion points and the n number of plural fixing points are alternately arranged on an annular channel along a contour of the detection ring 200, and elastic deformation of the detection ring in the vicinity of each of the measurement points defined at positions between the exertion points and the fixing points arranged adjacent to each other is electrically detected by detection elements.

Therefore, it is acceptable that n is set to be equal to 3, for example, and three exertion points and three fixing points are alternately arranged. In this case, the detection ring 200 is to be connected to the force receiving ring 100 via connection members at the positions of three exertion points and fixed to the supporting substrate 300 via fixing members at the positions of three fixing points.

However, in practice, the example shown in FIG. 9 is efficient. That is, two exertion points and two fixing points are arranged in the order of the first exertion point Q1, the first fixing point P1, the second exertion point Q2 and the second fixing point P2 on the annular channel along the contour of the detection ring 200. Then, a first measurement point R1 is defined between the first exertion point Q1 and the first fixing point P1 on the annular channel, and a second measurement point R2 is defined between the first fixing point P1 and the second exertion point Q2, a third measurement point R3 is defined between the second exertion point Q2 and the second fixing point P2, and a fourth measurement point R4 is defined between the second fixing point P2 and the first exertion point Q1. And, detection elements are used to electrically detect elastic deformation of the detection ring 200 in the vicinities of the first to the fourth measurement points R1 to R4.

In particular, in the example shown in FIG. 9, the basic structure is structured to be in plane symmetry about the XZ-plane and also in plane symmetry about the YZ-plane. Therefore, an extent of displacement indicated by [+] or [−] in the tables shown in FIG. 11 and FIG. 13 becomes symmetrical, by which a relatively simple detection circuit can be used to obtain a detection value of force in the direction of each axis and moment around each axis.

Therefore, as shown in the example of FIG. 9, in practice, the following is preferable. That is, the first exertion point Q1, the first fixing point P1, the second exertion point Q2 and the second fixing point P2 are respectively arranged at the positive domain of the X-axis, the positive domain of the Y-axis, the negative domain of the X-axis and the negative domain of the Y-axis, the vicinity of the first exertion point Q1 on the detection ring 200 is connected to the force receiving ring 100 by the first connection member 410 extending along the positive domain of X-axis, the vicinity of the second exertion point Q2 on the detection ring 200 is connected to the force receiving ring 100 by the second connection member 420 extending along the negative domain of the X-axis, and the detection elements electrically detect elastic deformation of the detection ring 200 in the vicinities of the first measurement point R1, the second measurement point R2, the third measurement point R3 and the fourth measurement point R4 arranged respectively at the first quadrant, the second quadrant, the third quadrant and the fourth quadrant on the XY-plane.

Each of the measurement points R1 to R4 is not necessarily defined on the V-axis or the W-axis. However, as described above, displacement resulting from elastic deformation of the detection ring 200 becomes most prominent on the V-axis or the W-axis. Therefore, in view of increasing detection sensitivity, as shown in the example of FIG. 9, it is preferable that the first measurement point R1, the second measurement point R2, the third measurement point R3 and the fourth measurement point R4 are defined respectively in the positive domain of the V-axis, the positive domain of the W-axis, the negative domain of the V-axis and the negative domain of the W-axis.

<<<Section 3. Embodiment Using Capacitive Element>>>

Here, the detection element will be described by referring to an embodiment using a capacitive element. As described above, a capacitive element type multi-axis force sensor detects a specific directional component of force exerted on the mechanical structure as displacement occurring at a specific part. That is, a principle is adopted in which a capacitive element is constituted by a pair of electrodes and displacement occurring on one of the electrodes due to the force which is exerted is detected on the basis of a capacitance value of the capacitive element.

Figure 14:
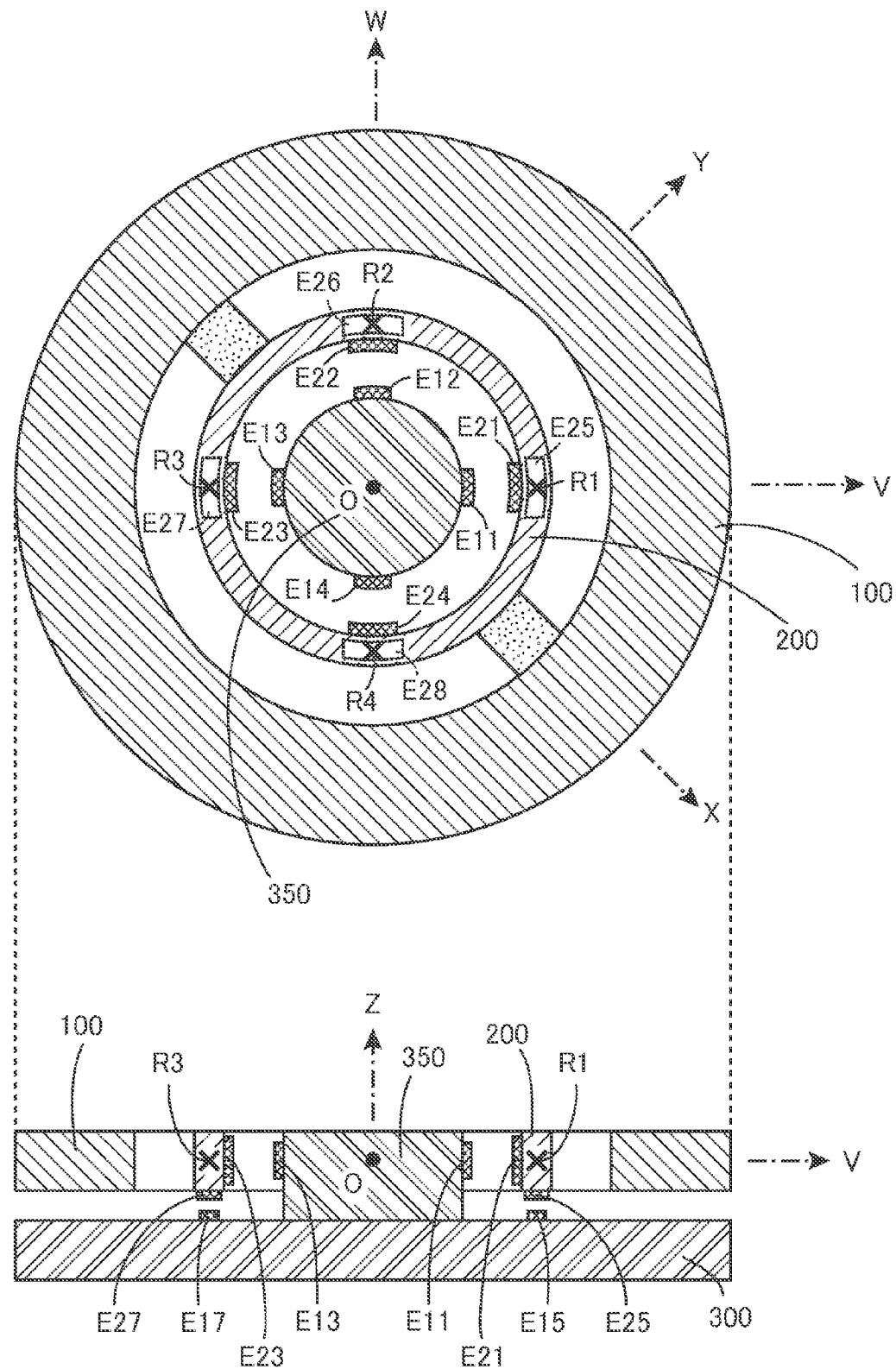
FIG. 14 is a cross sectional view (the upper part of the figure) in which a force sensor according to an embodiment using capacitive elements is cut along the XY-plane and a longitudinal sectional view (the lower part of the figure) in which the force sensor is cut along the VZ-plane.

Therefore, here, a description will be given of an embodiment using capacitive elements which detect eight different distances d1 to d8 at the basic structure shown in FIG. 10. FIG. 14 is a cross sectional view (the upper part of the figure) in which the force sensor according to the embodiment is cut along the XY-plane and a longitudinal sectional view (the lower part of the figure) in which the force sensor is cut along the VZ-plane. The force sensor shown in FIG. 14 is constituted by adding sixteen electrodes E11 to E18, E21 to E28, and a predetermined detection circuit to the basic structure shown in FIG. 9. Eight sets of capacitive elements constituted by the sixteen electrodes function as detection elements for measuring the above-described eight different distances d1 to d8.

As shown in the cross sectional view at the upper part of FIG. 14, the displacement electrodes E21 to E24 are provided respectively in the vicinities of the four measurement points R1 to R4 (measurement target surfaces) on the inner circumferential surface of the detection ring 200. Further, the displacement electrodes E25 to E28 (shown by the broken lines in the figure) are provided respectively in the vicinities of four measurement points R1 to R4 (measurement target surfaces) on the lower surface of the detection ring 200. These eight displacement electrodes E21 to E28 are such electrodes that develop displacement resulting from deformation of the detection ring 200.

On the other hand, the eight fixed electrodes E11 to E18 are provided at the positions (counter reference surfaces) facing the eight displacement electrodes E21 to E28, respectively. The eight fixed electrodes E11 to E18 are such electrodes that are directly or indirectly fixed to the supporting substrate 300 and always keep constant positions, irrespective of deformation of the detection ring 200. To be more specific, the fixed electrodes E11 to E14 are provided at the positions facing the displacement electrodes E21 to E24 on an outer circumferential surface of a fixed assistant body 350 in a cylindrical shape. The electrodes are indirectly fixed onto the supporting substrate 300 via the fixed assistant body 350. Further, the fixed electrodes E15 to E18 are directly fixed at the positions facing the displacement electrodes E25 to E28 on the upper surface of the supporting substrate 300. Although only the displacement electrodes E15, E17 appear in the longitudinal sectional view at the lower part of FIG. 14, the displacement electrode E16 is positioned behind the fixed assistant body 350 and the displacement electrode E 18 is positioned in front of the fixed assistant body 350.

Consequently, in the above-described embodiment, eight sets of capacitive elements are constituted by eight sets of displacement electrodes E21 to E28 provided on measurement target surfaces positioned in the vicinities of the measurement points R1 to R4 on the inner circumferential surface and the lower surface of the detection ring 200 and eight sets of fixed electrodes E11 to E18 provided on counter reference surfaces defined at the positions facing individual measurement target surfaces on the outer circumferential surface of the fixed assistant body 350 and the upper surface of the supporting substrate 300. These eight sets of the capacitive elements function as detection elements of the present invention and electrically detect elastic deformation of the detection ring 200.

Here, for the sake of convenience of description, the capacitive elements constituted by the fixed electrodes E11 to E18 and the displacement electrodes E21 to E28 facing thereto are individually referred to as capacitive elements C1 to C8. Capacitance values thereof are expressed as C1 to C8 by using the same symbols. In general, a capacitance value of a capacitive element decreases with an increase in distance of a pair of counter electrodes constituting the capacitive element, and the value increases with a decrease in distance. Therefore, electrical measurement of capacitance values of the capacitive elements C1 to C8 make it possible to determine the distances d1 to d8 shown in FIG. 10 and also to detect force or moment which is exerted on the basis of the table shown in FIG. 11.

However, a capacitance value of the capacitive element varies depending on an effective counter area of a pair of counter electrodes. A capacitance value increases with an increase in effective counter area and decreases with a decrease in effective counter area. Therefore, in order to accurately measure the distances d1 to d8 on the basis of the above-described principle, it is necessary that any displacement of the detection ring 200 does not result in change in effective counter area of each capacitive element. Therefore, a projection image in which one of the electrodes constituting each of the capacitive elements C1 to C8 is projected on a surface on which the other electrode is formed is included in the other electrode.

Figures 15, 16, 17:
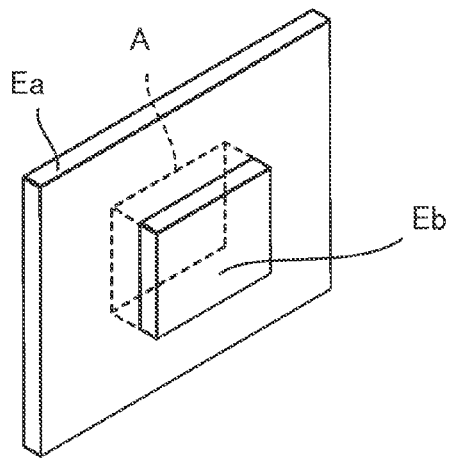
FIG. 15 is a perspective view showing a dimensional relationship of a counter electrode of each of the capacitive elements used in the force sensor shown in FIG. 14.
FIG. 16 is a table showing changes in capacitance values of capacitive elements C1 to C8 when force in the direction of each coordinate axis and moment around each coordinate axis are exerted on the force sensor shown in FIG. 14.
FIG. 17 shows arithmetic expressions for determining force in the direction of each coordinate axis and moment around each coordinate axis which are exerted on the force sensor shown in FIG. 14.

FIG. 15 is a perspective view showing a dimensional relationship of counter electrodes of each of the capacitive elements C1 to C8 used in the force sensor shown in FIG. 14. The figure shows a state that an electrode Ea and an electrode Eb are arranged so as to face each other. In this example, both of the electrodes Ea, Eb are rectangular plate-shaped electrodes. The electrode Ea is made dimensionally larger than the electrode Eb in longitudinal and horizontal dimensions. Further, both of the electrodes Ea, Eb are arranged at such positions that the respective center points face each other. Therefore, a projection image A (orthographic projection image) in which the electrode Eb is projected on a surface of the electrode Ea is included within the electrode Ea. In brief, the electrode Ea is substantially larger than the electrode Eb.

If a relationship of one pair of counter electrodes constituting each of the capacitive elements C1 to C8 used in the force sensor shown in FIG. 14 corresponds to a relationship shown in FIG. 15, displacement developed on the detection ring 200 does not change an effective counter area of each of the capacitive elements, as long as the displacement is within a predetermined tolerance level. That is, in the example shown in FIG. 15, an internal area of the projection image A shown by the broken line is an effective counter area of the capacitive element. Even where both of the electrodes Ea, Eb undergo displacement in a direction parallel to the electrode surface, the effective counter area remains constant as long as the projection image A is included in the electrode Ea.

In the force sensor shown in FIG. 14, for one pair of the counter electrodes which constitute each of the capacitive elements C1 to C8, each of the displacement electrodes E21 to E28 is set to be substantially larger than each of the fixed electrodes E11 to E18. It is, however, acceptable that each of the fixed electrodes E11 to E18 is set to be substantially larger than each of the displacement electrodes E21 to E28. Further, in the force sensor shown in FIG. 14, a relationship of one pair of the counter electrodes is that in which in a normal state where force or moment to be detected is not exerted in any way, a projection image in which one of the electrodes is projected on a surface on which the other electrode is formed (for example a projection image projected in a direction parallel to a line connecting both the center points of the electrodes) is included in the other electrode.

A dimensional difference between both of the electrodes is a parameter which determines a tolerance level of displacement of the detection ring 200 (a range in which the effective counter area is kept constant). Therefore, in order to set detection values in a wide dynamic range, it is necessary that a dimensional difference between both the electrodes is made large and a blank region outside the projection image A in FIG. 15 is set to be wide. Where displacement of the detection ring 200 is within the tolerance level, an effective counter area of each of the capacitive elements C1 to C8 is kept constant. Therefore, variance in capacitance values C1 to C8 exclusively indicates variance in distances d1 to d8.

FIG. 16 is a table showing changes in capacitance values of the capacitive elements C1 to C8 upon exertion of force in the direction of each coordinate axis and moment around each coordinate axis on the force sensor shown in FIG. 14. In this table, [+] indicates an increase in capacitance value, [−] indicates a decrease in capacitance value, and [0] indicates no variation in capacitance value. Symbols in parentheses in cells C1 to C8 in the table indicate one pair of counter electrodes which constitute each of the capacitive elements. For example, (E11&E21) in the cell of C1 indicates that the capacitive element C1 is constituted by a pair of counter electrodes E11, E21.

The table shown in FIG. 16 can be obtained by exchanging [+] and [−] in each cell in the table of FIG. 11. The table shown in FIG. 11 indicates an increase and decrease in distances d1 to d8, while the table shown in FIG. 16 indicates an increase and decrease in capacitance values C1 to C8. A capacitance value decreases with an increase in distance between electrodes of one pair of counter electrodes constituting a capacitive element, and a capacitance value increases with a decrease in distance between the electrodes. Therefore, it will be easily understood that the table shown in FIG. 16 can be obtained from the table shown in FIG. 11.

As apparent from the table shown in FIG. 16, patterns of change in capacitance values C1 to C8 differ from each other, depending on individual cases on which six-axis-components are exerted. Further, the larger the force and moment exerted, the larger the variance in capacitance value becomes. Thus, the detection circuits are used to conduct a predetermined operation on the basis of measured values of the capacitance values C1 to C8, thus making it possible to output independently detection values of the six-axis-components.

FIG. 17 is a view which shows specific arithmetic expressions for determining force in the direction of each coordinate axis, Fx, Fy, Fz, and moment around each coordinate axis, Mx, My, Mz, which are exerted on the force sensor shown in FIG. 14. Reasons for obtaining individual detection values by the arithmetic expressions will be easily understood by referring to the table shown in FIG. 16. For example, reference of the row +Fx in the table of FIG. 16 reveals that a detection value of +Fx is obtained from a difference between a sum of C1 and C4 indicated by [+] and a sum of C2 and C3 indicated by [−]. This is also true for other detection values.

Further, where force in the negative direction, −Fx, −Fy, −Fz, and moment which is negative rotation, −Mx, −My, −Mz, are exerted, [+] and [−] in the table of FIG. 16 are reversed. Thus, the arithmetic expressions shown in FIG. 17 are used as they are, by which it is possible to obtain individual detection values as negative values. Since the arithmetic expressions for the six-axis-components shown in FIG. 17 are free of any interference of other axis components, it is possible to obtain independently individual detection values of the six-axis-components. For example, C1, C2 decrease and C3, C4 increase upon exertion of +Fy. In the arithmetic expression for Fx, the decreasing and increasing components are cancelled with each other, thereby excluding any possibility that a component of Fy is included in a detection value of Fx.

As shown in FIG. 17, the arithmetic expressions other than force Fz are those in which a difference is obtained between sums of two sets of capacitance values. Even when the basic structure swells or shrinks due to change in temperature environment to result in errors in which distances between counter electrodes vary, the errors can cancel each other out. Thus it is possible to obtain accurate detection results free of disturbance components. Where the difference detection is desired to be conducted for Fz as well, the following procedures may be conducted. That is, a displacement electrode is additionally provided on the upper surface of the detection ring 200, an auxiliary substrate fixed to the supporting substrate 300 is provided thereabove, a fixed electrode is provided on the lower surface of the auxiliary substrate, capacitive elements are added for measuring a distance between the upper surface of the detection ring 200 and the auxiliary substrate, and a difference is obtained between capacitance values of these capacitive elements and capacitance values of the capacitive elements C5 to C8.

Figure 18:
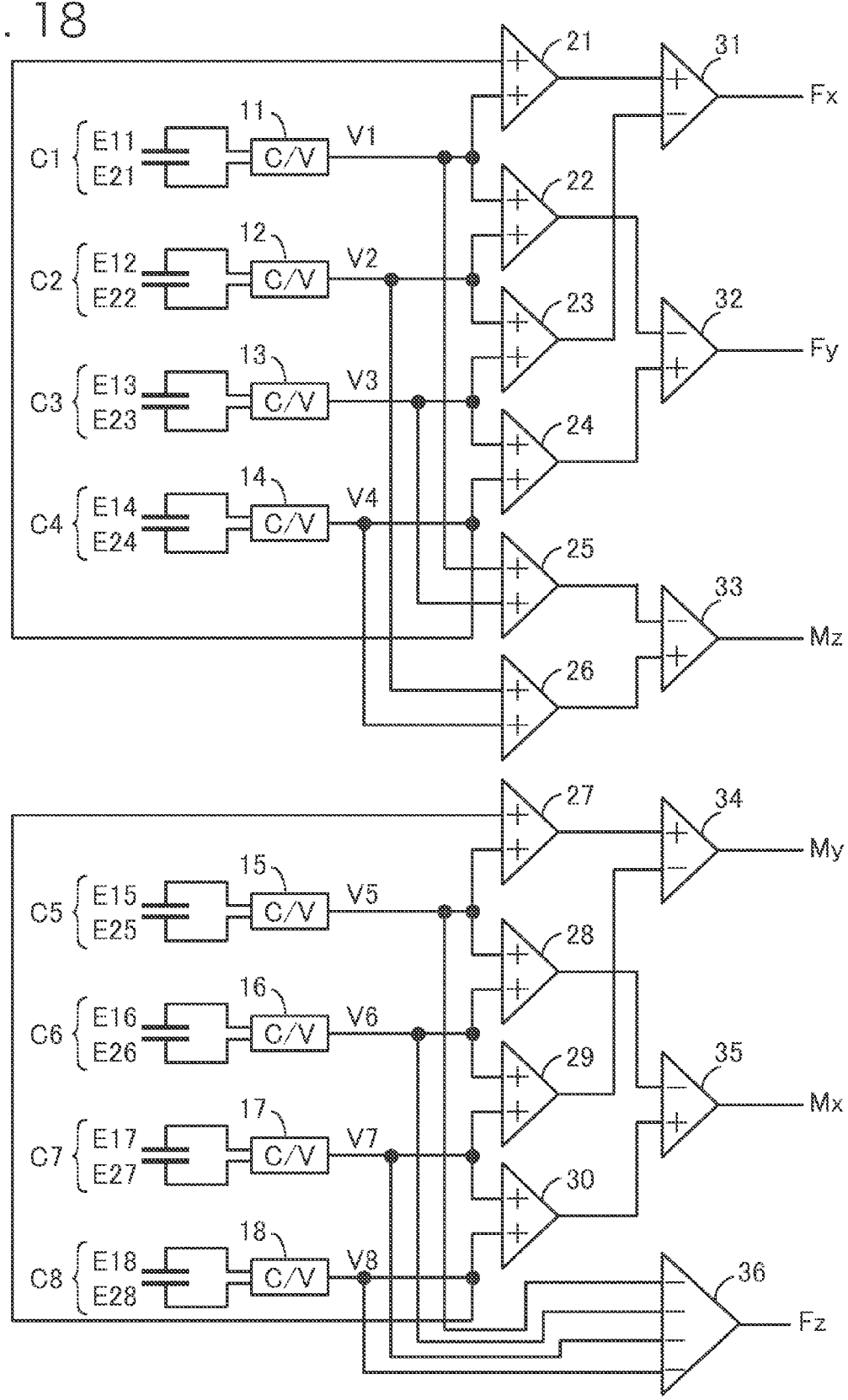
FIG. 18 is a circuit diagram showing detection circuits used in the force sensor shown in FIG. 14.

FIG. 18 is a circuit diagram showing a detection circuit used in the force sensor shown in FIG. 14. This detection circuit is a circuit which outputs detection values of forces Fx, Fy, Fz and moments Mx, My, Mz as voltage values on the basis of the arithmetic expressions shown in FIG. 17. First, capacitance values C1 to C8 of eight sets of capacitive elements C1 to C8 are converted by C/V converters 11 to 18 respectively into voltage values V1 to V8. Next, computing elements 21 to 30 are used to determine a sum of voltage values of two sets respectively, and computing elements 31 to 35 are also used to determine a difference. Thereby, they are output respectively as detection values of Fx, Fy, Mz, My, Mx. Further, a computing element 36 is used to determine a sum of voltage values of four sets, by which a value whose symbol is reversed is output as a detection value of Fz.

As a matter of course, the detection circuit shown in FIG. 18 is one example. Any circuit may be used, as long as detection results can be output in principle on the basis of the arithmetic expressions shown in FIG. 17. For example, when one pair of capacitive elements are connected in parallel, a capacitance value of the pair of capacitive elements after connection is given as a sum of capacitance values of individual capacitive elements. Therefore, in the circuit diagram shown in FIG. 18, for example, where the capacitive elements C1 and C4 are connected in parallel, a capacitance value of the pair of capacitive elements after connection is given as C1+C4. It is, thus, possible to omit the computing element 21. In a similar manner, it is also possible to omit the computing elements 22 to 30, 36.

Further, FIG. 18 is a view showing a detection circuit using an analog computing element. As a matter of course, operations shown in FIG. 17 can be made by digital operation. For example, an A/D converter is connected to a latter part of the C/V converters 11 to 18, by which the capacitance values C1 to C8 can be taken individually as digital values. Therefore, a digital circuit such as a micro computer is used to make such operations as shown in FIG. 17, by which each of the detection values can be output as a digital value.

Here, features of the force sensor using the capacitive elements shown in FIG. 14 will be summarized as follows. The force sensor is characterized in that the basic structure is constituted with two circular rings in which both the force receiving ring 100 and the detection ring 200 are arranged on the XY-plane so that the Z-axis is the central axis, both of the rings being arranged so that the force receiving ring 100 is outside and the detection ring 200 is inside, and the cylindrical fixed assistant body 350 whose lower surface is fixed onto the upper surface of the supporting substrate 300 and the Z-axis being given as the central axis is provided further inside the detection ring 200.

Then, the following eight sets of capacitive elements are provided as the detection elements:

(1) a first capacitive element C1 including a first displacement electrode E21 arranged in the vicinity of the first measurement point R1 on an inner circumferential surface of the detection ring 200 and a first fixed electrode E11 arranged at a position facing the first displacement electrode E21 on an outer circumferential surface of the fixed assistant body 350, (2) a second capacitive element C2 including a second displacement electrode E22 arranged in the vicinity of the second measurement point R2 on the inner circumferential surface of the detection ring 200 and a second fixed electrode E12 arranged at a position facing the second displacement electrode E22 on the outer circumferential surface of the fixed assistant body 350, (3) a third capacitive element C3 including a third displacement electrode E23 arranged in the vicinity of the third measurement point R3 on the inner circumferential surface of the detection ring 200 and a third fixed electrode E13 arranged at a position facing the third displacement electrode E23 on the outer circumferential surface of the fixed assistant body 350, (4) a fourth capacitive element C4 including a fourth displacement electrode E24 arranged in the vicinity of the fourth measurement point R4 on the inner circumferential surface of the detection ring 200 and a fourth fixed electrode E14 arranged at a position facing the fourth displacement electrode E24 on the outer circumferential surface of the fixed assistant body 350, (5) a fifth capacitive element C5 including a fifth displacement electrode E25 arranged in the vicinity of the first measurement point R1 on a lower surface of the detection ring 200 and a fifth fixed electrode E15 arranged at a position facing the fifth displacement electrode E25 on the upper surface of the supporting substrate 300, (6) a sixth capacitive element C6 including a sixth displacement electrode E26 arranged in the vicinity of the second measurement point R2 on the lower surface of the detection ring 200 and a sixth fixed electrode E16 arranged at a position facing the sixth displacement electrode E26 on the upper surface of the supporting substrate 300, (7) a seventh capacitive element C7 including a seventh displacement electrode E27 arranged in the vicinity of the third measurement point R3 on the lower surface of the detection ring 200 and a seventh fixed electrode E17 arranged at a position facing the seventh displacement electrode E27 on the upper surface of the supporting substrate 300, and (8) an eighth capacitive element C8 including an eighth displacement electrode E28 arranged in the vicinity of the fourth measurement point R4 on the lower surface of the detection ring 200 and an eighth fixed electrode E18 arranged at a position facing the eighth displacement electrode E28 on the upper surface of the supporting substrate 300.

Here, a projection image in which one of the electrodes constituting each of the capacitive elements C1 to C8 is projected on a surface on which the other electrode is formed is to be included in the other electrode. An effective counter area of each of the capacitive elements is kept constant, as long as displacement of the detection ring 200 is within a predetermined tolerance level.

On the other hand, the detection circuits of the force sensor have functions to output detection values of force Fx in the direction of the X-axis, force Fy in the direction of the Y-axis, force Fz in the direction of the Z-axis, moment Mx around the X-axis, moment My around the Y-axis, moment Mz around the Z-axis on the basis of the following arithmetic expressions which are obtained when capacitance values of the individual capacitive elements C1 to C8 are indicated as C1 to C8 by using the same symbols:

$$Fx=(C1+C4)-(C2+C3)$$

$$Fy=(C3+C4)-(C1+C2)$$

$$Fz=-(C5+C6+C7+C8)$$

$$Mx=(C7+C8)-(C5+C6)$$

$$My=(C5+C8)-(C6+C7)$$

$$Mz=(C2+C4)-(C1+C3).$$

A description has been above given of the detection principle of the force sensor shown in FIG. 14 and the detection circuits used in the sensor. The force sensor shown in FIG. 14 is to measure eight different distances d1 to d8 shown in FIG. 10 by using capacitive elements. Next, a brief description will be given of a force sensor which measures the six different distances d1 to d4, d9, d10 shown in FIG. 12 by using capacitive elements. In this case, as similar to the force sensor shown in FIG. 14, the capacitive elements C1 to C4 (fixed electrodes E11 to E14 and displacement electrodes E21 to E24) are provided for measuring the distances d1 to d4. However, since no measurement is made for the distances d5 to d8, it is not necessary to provide the capacitive elements C5 to C8 (fixed electrodes E15 to E18 and displacement electrodes E25 to E28) used in the force sensor shown in FIG. 14.

Instead, capacitive elements C9, C10 are provided for measuring the distances d9, d10 shown in FIG. 12. Here, the capacitive element C9 is a capacitive element which is constituted by a displacement electrode E29 arranged in the vicinity of the exertion point Q1 (functions as the fifth measurement point) on the lower surface of the detection ring 200 and a fixed electrode E19 arranged at a position facing the displacement electrode E29 on the upper surface of the supporting substrate 300. The capacitive element C10 is a capacitive element which is constituted by a displacement electrode E30 arranged in the vicinity of the exertion point Q2 (having functions as the sixth measurement point) on the lower surface of the detection ring 200 and a fixed electrode E20 arranged at a position facing the displacement electrode E30 on the upper surface of the supporting substrate 300. In this case as well, the following device is provided, that is, such a relationship is maintained that a projection image in which one of the electrodes constituting each of the capacitive elements C9, C10 is projected on a surface on which the other electrode is formed is included in the other electrode and an effective counter area is kept constant.

FIG. 19 is a table which shows changes in capacitance values of the capacitive elements C1 to C4, C9, C10 when force in the direction of each coordinate axis and moment around each coordinate axis are exerted on the force sensor. In this table as well, [+] indicates an increase in capacitance value, [−] indicates a decrease in capacitance value, and [0] indicates no variance in capacitance value. Symbols in the parentheses added in each cell C1 to C4, C9, C10 in the table indicate one pair of counter electrodes constituting each of the capacitive elements. As described above, the distance and the capacitance value are reversed in terms of increase and decrease. Thus, the table shown in FIG. 19 can be obtained by exchanging [+] and [−] of individual cells in the table shown in FIG. 13.

As shown in the table of FIG. 19, patterns of change in capacitance values C1 to C4, C9, C10 differ depending on individual cases on which the six-axis-components are exerted. Further, the larger the force and moment which are exerted become, the larger variance in capacitance value is. Thus, the detection circuits are used to conduct a predetermined operation on the basis of measured values of the capacitance values C1 to C4, C9, C10, thus making it possible to output independently a detection value of each axis component. However, with respect to moment Mx, as mentioned in Section 2, the results are obtained that all capacitance values are [0] (no variation). Thus, this force sensor is unable to detect the moment Mx.

FIG. 20 is a view showing specific arithmetic expressions for determining forces Fx, Fy, Fz and moments My, Mz which are exerted on the force sensor. Reasons why individual detection values can be obtained by the arithmetic expressions will be easily understood by referring to the table shown in FIG. 19. In order to output detection values of the five-axis-components on the basis of these arithmetic expressions, detection circuits similar to that of FIG. 18 may be provided. As a matter of course, one pair of capacitive elements may be connected in parallel, by which some of the computing elements can be omitted. Further, each of the capacitance values C1 to C4, C9, C10 is taken as a digital value by using an A/D converter, by which each of the detection values can be output as a digital value as a result of digital operation.

Consequently, the force sensor is structured in such a manner that the capacitive elements C5 to C8 of the force sensor shown in FIG. 14 are omitted and, instead, a fifth capacitive element C9 and a sixth capacitive element C10 are provided, with the first exertion point Q1 given as the fifth measurement point and the second exertion point Q2 given as the sixth measurement point. Here, the fifth capacitive element C9 is constituted by a fifth displacement electrode E29 arranged in the vicinity of the fifth measurement point. Q1 on the lower surface of the detection ring 200 and a fifth fixed electrode E19 arranged at a position facing the fifth displacement electrode E29 on the upper surface of the supporting substrate 300. The sixth capacitive element C10 is constituted by a sixth displacement electrode E30 arranged in the vicinity of the sixth measurement point Q2 on the lower surface of the detection ring 200 and a sixth fixed electrode E20 arranged at a position facing the sixth displacement electrode E30 on the upper surface of the supporting substrate 300.

Further, a projection image in which one of the electrodes which constitutes each of the capacitive elements C1 to C4, C9, C10 is projected on a surface on which the other electrode is formed is included in the other electrode. As long as displacement of the detection ring 200 is within a predetermined tolerance level, an effective counter area of each of the capacitive elements is kept constant.

Then, the detection circuits of the force sensor have functions to output detection values of force Fx in a direction of the X-axis, force Fy in a direction of the Y-axis, force Fz in a direction of the Z-axis, moment My around the Y-axis and moment Mz around the Z-axis on the basis of the following arithmetic expressions which are obtained when a capacitance value of each of the capacitive elements C1 to C4, C9, C10 is given as C1 to C4, C9, C10 by using the same symbols, $$Fx=(C1+C4)-(C2+C3)$$

$$Fy=(C3+C4)-(C1+C2)$$

$$Fz=-(C9+C10)$$

$$My=C9-C10$$

$$Mz=(C2+C4)-(C1+C3).$$

Figure 21:
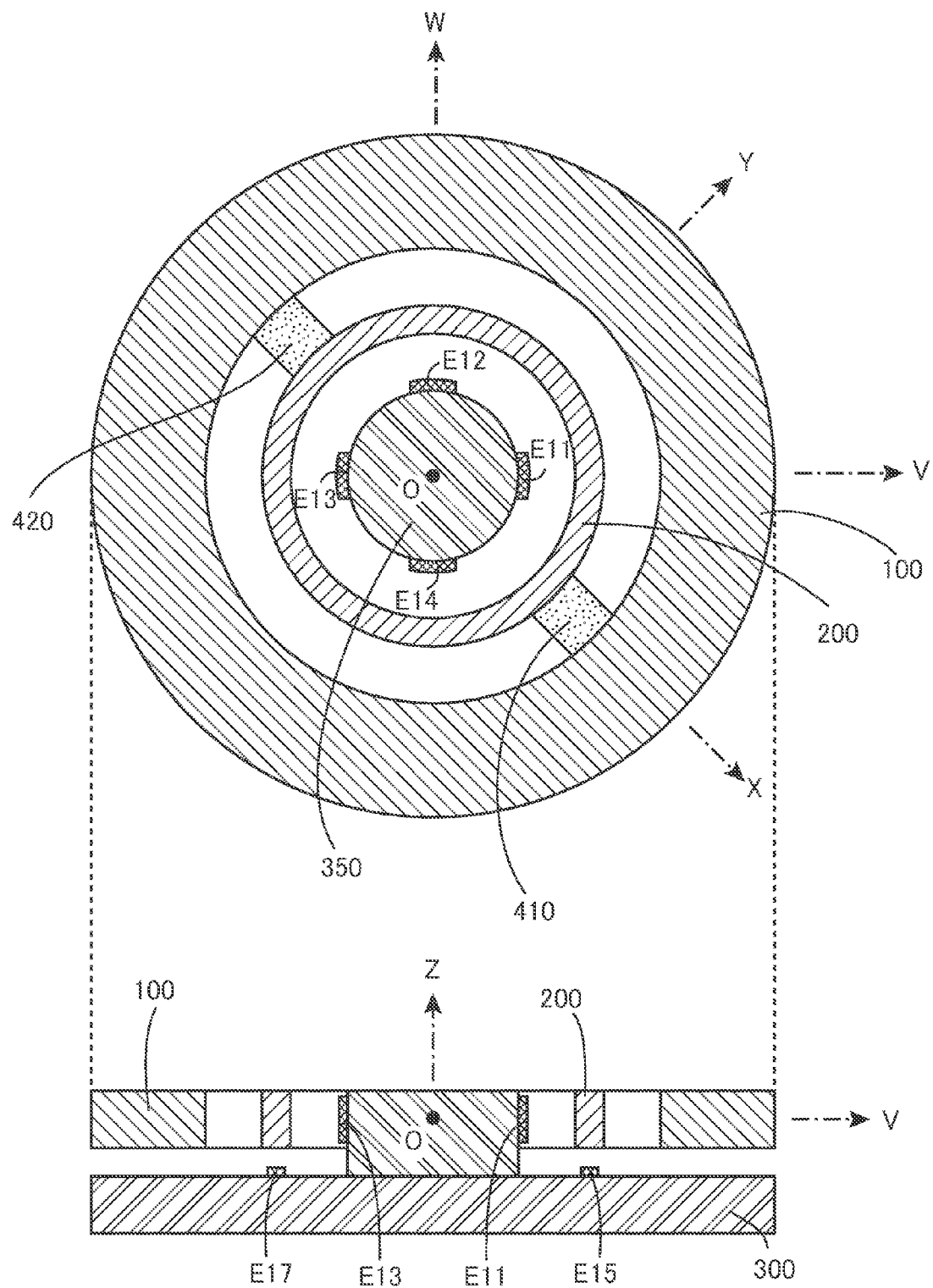
FIG. 21 is a cross sectional view (the upper part of the figure) in which a force sensor according to a modification example which uses a detection ring 200 itself constituted by an electrically conductive material as a plurality of displacement electrodes is cut along the XY-plane and a longitudinal sectional view (the lower part of the figure) in which the force sensor is cut along the VZ-plane.

Finally, a description will be given of a practical device which can be applied to a force sensor using capacitive elements. FIG. 21 is a cross sectional view (the upper part of the figure) in which a force sensor according to a modification example in which the practical device is given to the force sensor shown in FIG. 14 is cut along the XY-plane and a longitudinal sectional view (the lower part of the figure) in which the force sensor is cut along the VZ-plane. The modification example is characterized in that the detection ring 200 is composed of a flexible conductive material (for example, a metal such as an aluminum alloy) and the capacitive elements C1 to C8 are constituted by giving the surface of the detection ring 200 as a common displacement electrode E0. If at least a surface layer of the detection ring 200 is constituted by a conductive material, the entire surface is exerted as one common displacement electrode E0. Thus, the surface can be used as an electrode which functions as eight displacement electrodes E21 to E28 of the force sensor shown in FIG. 14.

As apparent from FIG. 21, no separate displacement electrode is formed on the surface of the detection ring 200. However, for example, on the outer circumferential surface of the detection ring 200, a part of the region facing the fixed electrode E11 functions as the displacement electrode E21 shown in FIG. 14, by which the capacitive element C1 is formed. Similarly, on the lower surface of the detection ring 200, a part of the region facing the fixed electrode E15 functions as the displacement electrode E25 shown in FIG. 14, by which the capacitive element C5 is formed.

As a matter of course, when a common displacement electrode E0 (the surface of the detection ring 200) is used in place of the eight displacement electrodes E21 to E28, the displacement electrodes E21 to E28 shown in the circuit diagram of FIG. 18 are mutually short-circuited. This does not, however, adversely affect the operation of the detection circuit in any way. That is, C/V converters 11 to 18 are able to convert individually and independently the capacitance values C1 to C8 between each of grounded nodes thereof and each of the fixed electrodes E11 to E18 to voltage values V1 to V8, with all the displacement electrodes E21 to E28 being grounded. Therefore, no problem is posed, where the displacement electrodes E21 to E28 to be grounded are replaced by the common displacement electrode EU.

Consequently, electrodes which are necessary from a practical standpoint in the modification example shown in FIG. 21 are four fixed electrodes E11 to E14 provided on the outer circumferential surface of the fixed assistant body 350 and four fixed substrates E15 to E18 provided on the upper surface of the supporting substrate 300. Thereby, the sensor is made quite simple in entire structure. Further, the common displacement electrode E0 is the entire surface of the detection ring 200, functioning as the electrode Ea shown in FIG. 15. Thus, the electrode E0 also meets the condition that a projection image in which one of the electrodes which constitutes each capacitive element is projected on a surface on which the other electrode is formed is included in the other electrode. On the other hand, the fixed electrodes E11 to E18 are required to be electrically insulated with each other. Thus, at least a part of the surface of the fixed assistant body 350 (a part at which the fixed electrodes E11 to E14 are located) and at least a part of the upper surface of the supporting substrate 300 (a part at which the fixed electrodes E15 to E18 are located) are required to be constituted by an insulation material. However, other members can be constituted by an electrically conductive material such as a metal.

<<<Section 4. Embodiment Using Strain Gauge>>>

The force sensors according to the present invention are commonly characterized in that elastic deformation of the detection ring 200 is detected for its mode and magnitude to determine a direction and magnitude of force and moment which are exerted. In Section 2, a description has been given of the method for detecting displacement of measurement points as a method for detecting the mode and magnitude of elastic deformation. In Section 3, the embodiment using capacitive elements has been described by referring to a specific method for detecting displacement. Here, in Section 4, a description will be given of a method for electrically detecting a mechanical strain in the vicinity of each of predetermined measurement points R1 to R4 on the detection ring 200 by using detection elements, as another method for detecting a mode and magnitude of elastic deformation. In particular, a description will be given of a specific embodiment which uses a strain gauge as a detection element for detecting strain.

Figures 22, 23:
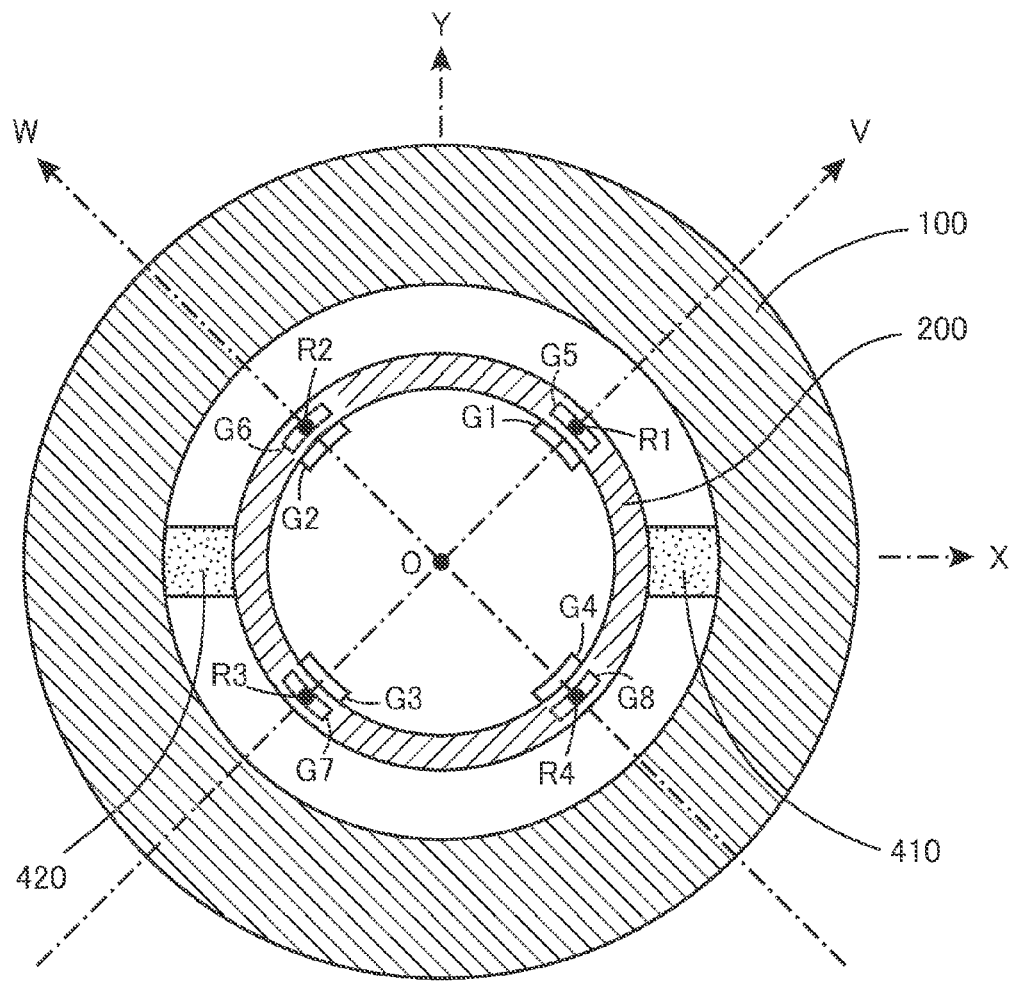
FIG. 22 is a cross sectional view in which a force sensor according to an embodiment using strain gauges is cut along the XY-plane (the respective strain gauges G1 to G8 shown in the figure are actually constituted by a plurality of strain gauges in parallel with each other).
FIG. 23 is a table showing changes in electric resistance of the strain gauges G1 to G8 when force in the direction of each coordinate axis and moment around each coordinate axis are exerted on the force sensor shown in FIG. 22.

FIG. 22 is a cross sectional view in which the force sensor according to the embodiment using a strain gauge is cut along the XY-plane. The basic structure of the force sensor is identical to the basic structure shown in FIG. 1 and also identical to the basic structure according to the embodiment using capacitive elements shown in FIG. 14. However, this embodiment of the force sensor differs from that shown in FIG. 14 in that the strain gauge is used as a detection element in place of the capacitive element to detect a mechanical strain in place of displacement of measurement points. Four measurement points R1 to R4 shown in FIG. 22 are identical to the four measurement points R1 to R4 shown in FIG. 14, and are points arranged on the V-axis or the W-axis.

In the above-described force sensor, a total of eight different strain gauges G1 to G8 are used to electrically measure strain in the vicinity of each of the four measurement points R1 to R4. That is, as shown in FIG. 22, the strain gauges G1 to G4 are attached respectively in the vicinities of the measurement points R1 to R4 on the inner circumferential surface of the detection ring 200, and the strain gauges G5 to G8 (depicted by the broken lines in the figure) are attached respectively in the vicinities of the measurement points R1 to R4 on the lower surface of the detection ring 200.

Here, each of the strain gauges G1 to G8 is attached in the vicinity of each of the measurement points R1 to R4 on the surface of the detection ring 200 in such a manner that a direction along an annular channel along a contour of the detection ring 200 is in a longitudinal direction (a direction in which stress is detected). Therefore, it is possible to detect a mechanical strain occurring on the surface on which each of the strain gauges G1 to G8 is attached with respect to a direction along the circumference of the detection ring 200 as a change in electric resistance with respect to the longitudinal direction of each of the strain gauges.

FIG. 23 is a table showing changes in electric resistance of the strain gauges G1 to G8 when force in the direction of each coordinate axis and moment around each coordinate axis are exerted on the force sensor shown in FIG. 22. In this table, [+] indicates an increase in electric resistance, [−] indicates a decrease in electric resistance, and [0] indicates a negligible variation in electric resistance. The above-described results are obtained by analysis of a specific deformation mode of the detection ring 200 described in Section 1.

For example, where force +Fx in the positive direction of the X-axis is exerted on the force receiving ring 100, the detection ring 200 undergoes such deformation as shown in FIG. 4. Therefore, when consideration is given to stress which is applied in the longitudinal direction with respect to each of the strain gauges G1 to G4 affixed onto the inner circumferential surface of the detection ring 200, the stress is applied to the strain gauges G1, G4 in an extending direction, thus resulting in an increase in electric resistance. And, the stress is applied to the strain gauges G2, G3 in a shrinking direction, thus resulting in a decrease in electric resistance. On the other hand, the strain gauges G5 to G8 affixed onto the lower surface of the detection ring 200 indicate a negligible change in electric resistance (specific values will be described later). The row +Fx in the table of FIG. 23 shows the above results. For the same reason, when the force +Fy in the positive direction of the Y-axis is exerted, the results are obtained shown in the row +Fy in the table of FIG. 23.

Further, when force +Fz in the positive direction of the Z-axis is exerted on the force receiving ring 100, the detection ring 200 undergoes such deformation as shown in FIG. 5. At this time, the strain gauges G1 to G4 affixed onto the inner circumferential surface of the detection ring 200 indicate a negligible change in electric resistance. However, stress is applied to the strain gauges G5 to G8 affixed onto the lower surface of the detection ring 200 in an extending direction, thus resulting in an increase in electric resistance. The row +Fz in the table of FIG. 23 shows the above results.

Then, when moment +My which is positive rotation around the Y-axis is exerted on the force receiving ring 100, the detection ring 200 undergoes such deformation as shown in FIG. 6, and the right half of the figure undergoes downward displacement, while the left half of the figure undergoes upward displacement. At this time, the strain gauges G1 to G4 affixed onto the inner circumferential surface of the detection ring 200 indicate a negligible change in electric resistance. However, of the strain gauges G5 to G8 affixed onto the lower surface of the detection ring 200, the strain gauges G5 and G8 are given stress in a shrinking direction, thus resulting in a decrease in electric resistance and the strain gauges G6 and G7 are given stress in an extending direction, thus resulting in an increase in electric resistance. These results are shown in the row +My in the table of FIG. 23. For the same reason, the results are obtained shown in the row +Mx in the table of FIG. 23, when moment +Mx which is positive rotation around the X-axis is exerted thereon.

Finally, when moment +Mz which is positive rotation around the Z-axis is exerted on the force receiving ring 100, the detection ring 200 undergoes such deformation as shown in FIG. 7. At this time, the strain gauges G5 to G8 affixed onto the lower surface of the detection ring 200 indicate a negligible change in electric resistance. Of the strain gauges G1 to G4 affixed onto the inner circumferential surface of the detection ring 200, the strain gauges G2 and G4 are given stress in an extending direction, thus resulting in an increase in electric resistance. The strain gauges G1 and G3 are given stress in a shrinking direction, thus resulting in a decrease in electric resistance. The row +Mz in the table of FIG. 23 shows the above results.

Although the table of FIG. 23 shows the results upon exertion of force in a positive direction and moment of positive rotation, the results are obtained in which [+] and H are reversed upon exertion of force in a negative direction and moment of negative rotation. Consequently, patterns of change in electric resistance of eight different strain gauges G1 to G8 differ depending on individual cases on which six-axis-components are exerted. Further, the larger the force and moment which are exerted become, the larger variance in electric resistance is. Thus, the detection circuits are used to conduct a predetermined operation on the basis of measured values of electric resistance, thus making it possible to output independently detection values of six-axis-components.

Figures 24, 25:
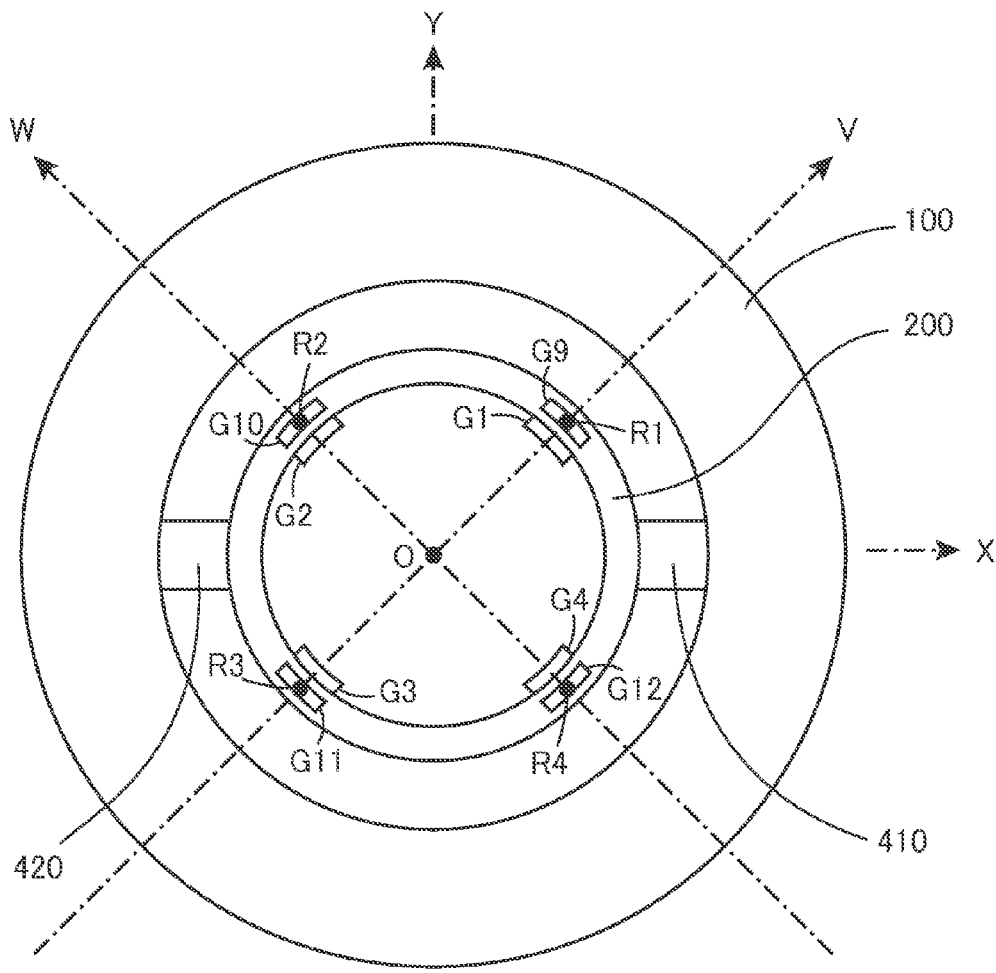
FIG. 24 is a table showing specific measured values of stress (unit: MPa) applied to the strain gauges G1 to G8 when force in the direction of each coordinate axis and moment around each coordinate axis are exerted on the force sensor shown in FIG. 22.
FIG. 25 is a top view of a force sensor according to a modification example in which strain gauges G9 to G12 are additionally added to the embodiment shown in FIG. 22.

FIG. 24 is a table which shows specific analysis results obtained by Finite Element Method in which analysis is performed for stress (unit: MPa) applied to each of the strain gauges G1 to G8 when force in the direction of each coordinate axis and moment around each coordinate axis are exerted on the force sensor shown in FIG. 22. The table shown in FIG. 23 is prepared on the basis of the table shown in FIG. 24. As described above, the cells [0] in the table of FIG. 23 do not show that variation in electric resistance is zero but show that the variation is smaller than the variation in other cells of the table and negligible as a measured value.

As a matter of course, it depends on accuracy required for a force sensor whether the measured values are negligible or not. A force sensor for which only low accuracy is required can be handled so that these measured values may be negligible. However, in a force sensor for which high accuracy is required, the measured values cannot be negligible. In reality, when a variation in value of electric resistance occurs in the cells [0] in the table of FIG. 23, interference with other axis components is generated to result in a failure of obtaining highly accurate detection values. In this case, it is preferable that a micro-computer or the like is used to conduct correction operation, whenever necessary.

Where it is possible to deal with the variation in electric resistance of the cells [0] in the table of FIG. 23 as being approximate to zero, detection values of force Fx, Fy and moment Mx, My, Mz exerting on the force sensor can be output by using detection circuits composed of a simple Wheatstone bridge. Further, in order that a detection value of force Fz is also obtained by using a simple Wheatstone bridge and all the six-axis-components are output from the detection circuits composed of the Wheatstone bridges, strain gauges G9 to G12 may be added to the upper surface of the detection ring 200.

FIG. 25 is a top view of a force sensor according to a modification example in which the strain gauges G9 to G12 are added to the embodiment shown in FIG. 22. Though the strain gauges G5 to G8 shown in FIG. 22 are provided on the lower surface of the detection ring 200, the strain gauges G9 to G12 shown in FIG. 25 are provided on the upper surface of the detection ring 200. To be more specific, the strain gauges G9 to G12 are gauge resistances identical to the strain gauges G5 to G8 in shape and dimension and are respectively arranged immediately above the strain gauges G5 to G8, respectively. Therefore, an increase and decrease in electric resistance of the strain gauges G9 to G12 are reversed in terms of an increase and decrease in electric resistance of the strain gauges G5 to G8 shown in the table of FIG. 23.

Figure 26:
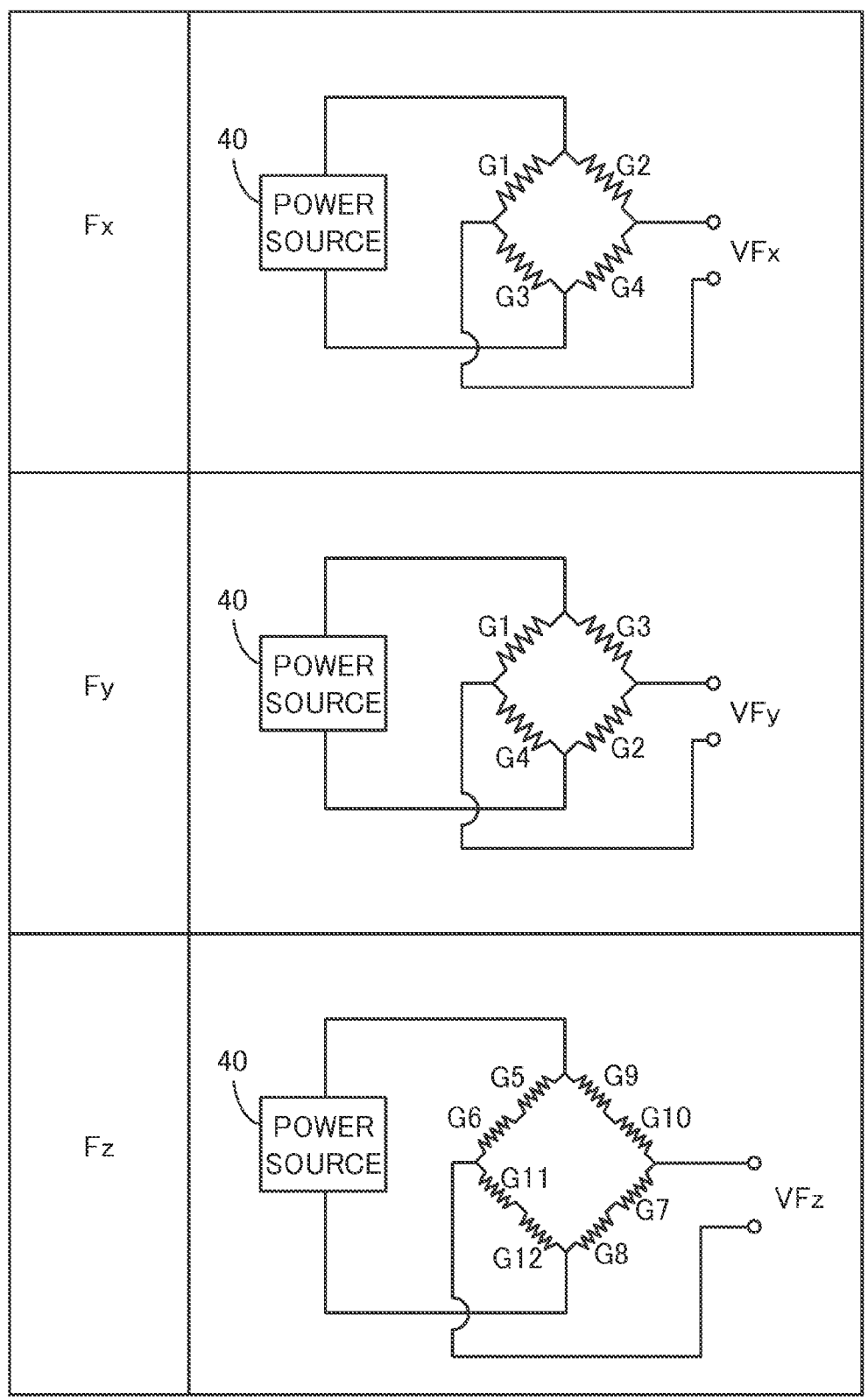
FIG. 26 shows circuit diagrams, each of which shows a detection circuit for detecting force in the direction of each coordinate axis in the force sensor of the modification example shown in FIG. 25.
Figure 27:
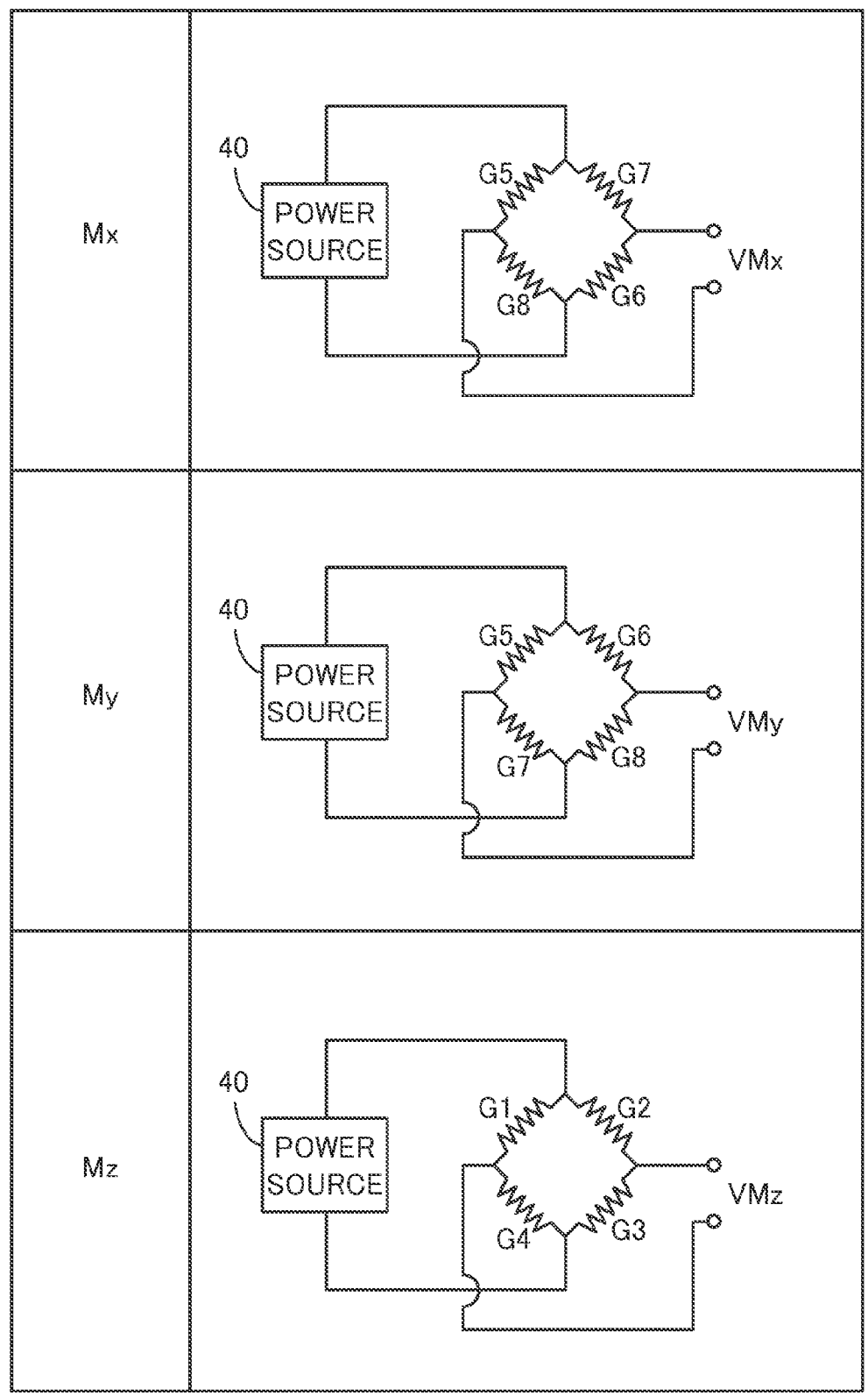
FIG. 27 shows circuit diagrams, each of which shows a detection circuit for detecting moment around each coordinate axis in the force sensor of the modification example shown in FIG. 25.

As described above, a total of twelve strain gauges G1 to G12 are used, by which all detection values of the six-axis-components can be output by detection circuits composed of Wheatstone bridges. FIG. 26 shows circuit diagrams, each of which shows a detection circuit for detecting force Fx, Fy, Fz in the direction of each coordinate axis in the force sensor of the modification example shown in FIG. 25. FIG. 27 shows circuit diagrams, each of which shows a detection circuit for detecting moment Mx, My, Mz around each coordinate axis in the force sensor according to the modification example shown in FIG. 25. Each of the detection circuits is a circuit composed of a Wheatstone bridge which works upon supply of power from a power source 40.

Reference of the row +Fx in the table of FIG. 23 reveals that G1, G4 are given as [+] and G2, G3 are given as [−]. It will be, thus, easily understood that an output voltage VFx resulting from the Wheatstone bridge shown at the upper part of FIG. 26 is given as a detection value of force Fx in the direction of the X-axis. For the same reason, an output voltage VFy resulting from the Wheatstone bridge shown at the middle part of FIG. 26 is given as a detection value of force Fy in the direction of the Y-axis. Further, reference of the row +Fz in the table of FIG. 23 reveals that G5 to G8 are given as [+], while G9 to G12 are given as H. Thus, it will be easily understood that an output voltage VFz resulting from the Wheatstone bridge shown at the lower part of FIG. 26 is given as a detection value of force Fz in the direction of the Z-axis.

On the other hand, reference of the row +Mx in the table of FIG. 23 reveals that G5, G6 are given as [−] and G7, G8 are given as [+]. It will be, therefore, easily understood that an output voltage VMx resulting from the Wheatstone bridge shown at the upper part of FIG. 27 is given as a detection value of moment Mx around the X-axis. For the same reason, an output voltage VMy resulting from the Wheatstone bridge shown at the middle part of FIG. 27 is given as a detection value of moment My around the Y-axis. Further, reference of the row +Mz in the table of FIG. 23 reveals that G1, G3 are given as [−] and G2, G4 are given as [+]. It will be, thus, easily understood that an output voltage VMz resulting from the Wheatstone bridge at the lower part of FIG. 27 is given as a detection value of moment Mz around the Z-axis.

As described above, detection values of six-axis-components, that is, the forces Fx, Fy, Fz and the moments Mx, My, Mz exerting on the force sensor, are output by the detection circuits, each of which is composed of a simple Wheatstone bridge. In order that symbols of output values are to be symbols in a correct axial direction and around a correct axis rotation, it is necessary that the polarity of the power source 40 connected to each Wheatstone bridge is set to an appropriate direction.

Where the detection circuits composed of Wheatstone bridges shown in FIG. 26 and FIG. 27 are assembled, it is necessary that each of the Wheatstone bridges is to constitute an electrically independent bridge. Thus, even a strain gauge indicated by the same symbol in the circuit diagram is required to be a different strain gauge which is electrically independent. For example, G1 indicated in the circuit at the upper part of FIG. 26, G1 indicated in the circuit at the middle part thereof and G1 indicated in the circuit at the lower part of FIG. 27 are all indicated by the same symbol. However, in reality, they are individually independent strain gauges.

Therefore, in reality, the strain gauge G1 shown in FIG. 22 or FIG. 25 indicates a bundle of plural strain gauges electrically independent (the number of strain gauges necessary for constituting an individually independent Wheatstone bridge). In other words, the above-described strain gauges G1 to G12 indicate twelve different kinds of strain gauges, each kind of which has a different arrangement attribute. An actual force sensor is constituted by arranging strain gauges having any one of the twelve different kinds of attribute by the number necessary for constituting the Wheatstone bridges shown in FIG. 26 and FIG. 27.

As a matter of course, where detection of five-axis-components Fx, Fy, Mx, My, Mz excluding force Fz is sufficient, the strain gauges G9 to G12 to be arranged on the upper surface of the detection ring 200 can be omitted and only the strain gauges G1 to G8 having eight different attributes can be used to constitute the force sensor.

In the example shown in FIG. 22, the strain gauges G1 to G4 are arranged on the inner surface of the detection ring 200. On the other hand, they may be arranged on the outer surface of the detection ring 200. Similarly, in the example shown in FIG. 22, the strain gauges G5 to G8 are arranged on the lower surface of the detection ring 200. On the other hand, they may be arranged on the upper surface of the detection ring 200. A direction in which stress is applied is reversed on the inner surface and the outer surface or on the upper surface and the lower surface. Therefore, [+] and [−] shown in the table of FIG. 23 are reversed. However, individual detection values are obtained the same as before by the above-described Wheatstone bridges.

Consequently, features of the force sensor having the functions to detect five-axis-components will be summarized as follows. First, the basic structure is constituted with two circular rings in which both the force receiving ring 100 and the detection ring 200 are arranged on the XY-plane so that the Z-axis is given as the central axis and arranged so that the force receiving ring 100 is outside and the detection ring 200 is inside.

Then, as the detection elements, used are a plurality of strain gauges G1 to G8 which are attached in the vicinities of the first to the fourth measurement points R1 to R4 on the surface of the detection ring 200 in such a manner that a direction along an annular channel along a contour of the detection ring 200 is given as a detection direction. Here, when one of the inner circumferential surface and the outer circumferential surface of the detection ring 200 is defined as a laterally arranged surface (the inner circumferential surface is the laterally arranged surface in the example of FIG. 22) and one of the upper surface and the lower surface of the detection ring 200 is defined as a longitudinally arranged surface (the lower surface is the longitudinally arranged surface in the example of FIG. 22), each of the detection elements is constituted by any one of strain gauges having the following eight respective attributes:

(1) the strain gauge G1 having a first attribute which is attached in the vicinity of a first measurement point R1 on the laterally arranged surface, (2) the strain gauge G2 having a second attribute which is attached in the vicinity of a second measurement point R2 on the laterally arranged surface, (3) the strain gauge G3 having a third attribute which is attached in the vicinity of a third measurement point R3 on the laterally arranged surface, (4) the strain gauge G4 having a fourth attribute which is attached in the vicinity of a fourth measurement point R4 on the laterally arranged surface, (5) the strain gauge G5 having a fifth attribute which is attached in the vicinity of the first measurement point R1 on the longitudinally arranged surface, (6) the strain gauge G6 having a sixth attribute which is attached in the vicinity of the second measurement point R2 on the longitudinally arranged surface, (7) the strain gauge G7 having a seventh attribute which is attached in the vicinity of the third measurement point R3 on the longitudinally arranged surface, and (8) the strain gauge G8 having an eighth attribute which is attached in the vicinity of the fourth measurement point R4 on the longitudinally arranged surface.

Then, as shown at the upper part of FIG. 26, the detection circuit outputs a detection value VFx of force Fx in the direction of the X-axis by a Wheatstone bridge circuit in which the strain gauge G1 having the first attribute and the strain gauge G4 having the fourth attribute are given as the first opposite sides and the strain gauge G2 having the second attribute and the strain gauge G3 having the third attribute are given as the second opposite sides. Then, as shown at the middle part of FIG. 26, the detection circuit outputs a detection value VFy of force Fy in the direction of the Y-axis by a Wheatstone bridge circuit in which the strain gauge G1 having the first attribute and the strain gauge G2 having the second attribute are given as the first opposite sides and the strain gauge G3 having the third attribute and the strain gauge G4 having the fourth attribute are given as the second opposite sides.

On the other hand, as shown at the upper part of FIG. 27, the detection circuit outputs a detection value VMx of moment Mx around the X-axis by a Wheatstone bridge circuit in which the strain gauge G5 having the fifth attribute and the strain gauge G6 having the sixth attribute are given as the first opposite sides and the strain gauge G7 having the seventh attribute and the strain gauge G8 having the eighth attribute are given as the second opposite sides. As shown at the middle part of FIG. 27, the detection circuit outputs a detection value VMy of moment My around the Y-axis by a Wheatstone bridge circuit in which the strain gauge G5 having the fifth attribute and the strain gauge G8 having the eighth attribute are given as the first opposite sides and the strain gauge G6 having the sixth attribute and the strain gauge G7 having the seventh attribute are given as the second opposite sides. As shown at the lower part of FIG. 27, the detection circuit outputs a detection value VMz of moment Mz around the Z-axis by a Wheatstone bridge circuit in which the strain gauge G1 having the first attribute and the strain gauge G3 having the third attribute are given as the first opposite sides and the strain gauge G2 of the second attribute and the strain gauge G4 having the fourth attribute are given as the second opposite sides.

If the force sensor for detecting six-axis-components including the force Fz is to be constituted, as shown in FIG. 25, the strain gauges G9 to G12 arranged on the upper surface of the detection ring 200 may be additionally affixed. In this case, even if strain gauges arranged on the upper surface of the detection ring 200 are named G5 to G8 instead of G9 to G12, and strain gauges arranged on the lower surface of the detection ring 200 are named G9 to G12 instead of G5 to G8, so that names of the strain gauges formed on the upper surface and that on the lower surface are changed, detection can be properly made same as before by using the Wheatstone bridge circuits shown in FIG. 26 and FIG. 27. Therefore, when one of the inner circumferential surface and the outer circumferential surface of the detection ring 200 is defined as a laterally arranged surface, and one of the upper surface and the lower surface of the detection ring 200 is defined as a first longitudinally arranged surface and the other of them is defined as a second longitudinally arranged surface, each of the detection elements is constituted by any one of the strain gauges having the following twenty different attributes:

(1) the strain gauge G1 having a first attribute which is attached in the vicinity of a first measurement point R1 on the laterally arranged surface, (2) the strain gauge G2 having a second attribute which is attached in the vicinity of a second measurement point R2 on the laterally arranged surface (3) the strain gauge G3 having a third attribute which is attached in the vicinity of a third measurement point R3 on the laterally arranged surface, (4) the strain gauge G4 having a fourth attribute which is attached in the vicinity of a fourth measurement point R4 on the laterally arranged surface, (5) the strain gauge G5 having a fifth attribute which is attached in the vicinity of the first measurement point R1 on the first longitudinally arranged surface of the detection ring 200, (6) the strain gauge G6 having a sixth attribute which is attached in the vicinity of the second measurement point R2 on the first longitudinally arranged surface of the detection ring 200, (7) the strain gauge G7 having a seventh attribute which is attached in the vicinity of the third measurement point R3 on the first longitudinally arranged surface of the detection ring 200, (8) the strain gauge G8 having an eighth attribute which is attached in the vicinity of the fourth measurement point R4 on the first longitudinally arranged surface of the detection ring 200, (9) the strain gauge G9 having a ninth attribute which is attached in the vicinity of the first measurement point R1 on the second longitudinally arranged surface of the detection ring 200,

(10) the strain gauge G10 having a tenth attribute which is attached in the vicinity of the second measurement point R2 on the second longitudinally arranged surface of the detection ring 200,

(11) the strain gauge G11 having an eleventh attribute which is attached in the vicinity of the third measurement point R3 on the second longitudinally arranged surface of the detection ring 200, and

(12) the strain gauge G12 having a twelfth attribute which is attached in the vicinity of the fourth measurement point R4 on the second longitudinally arranged surface of the detection ring 200.

Then, as shown at the upper part of FIG. 26, the detection circuit outputs a detection value VFx of force Fx in the direction of the X-axis by a Wheatstone bridge circuit in which the strain gauge G1 having the first attribute and the strain gauge G4 having the fourth attribute are given as the first opposite sides and the strain gauge G2 having the second attribute and the strain gauge G3 having the third attribute are given as the second opposite sides. As shown at the middle part of FIG. 26, the detection circuit outputs a detection value VFy of force Fy in the direction of the Y-axis by a Wheatstone bridge circuit in which the strain gauge G1 having the first attribute and the strain gauge G2 having the second attribute are given as the first opposite sides and the strain gauge G3 having the third attribute and the strain gauge G4 having the fourth attribute are given as the second opposite sides. As shown at the lower part of FIG. 26, the detection circuit outputs a detection value VFz of force Fz in the direction of the Z-axis by a Wheatstone bridge circuit in which a serial connection side of the strain gauge G5 having the fifth attribute with the strain gauge G6 having the sixth attribute and a serial connection side of the strain gauge G7 having the seventh attribute with the strain gauge G8 having the eighth attribute are given as the first opposite sides, and a serial connection side of the strain gauge G9 having the ninth attribute with the strain gauge G10 having the tenth attribute and a serial connection side of the strain gauge G11 having the eleventh attribute with the strain gauge G12 having the twelfth attribute are given as the second opposite sides.

Further, as shown at the upper part of FIG. 27, the detection circuit outputs a detection value VMx of moment Mx around the X-axis by a Wheatstone bridge circuit in which the strain gauge G5 having the fifth attribute and the strain gauge G6 having the sixth attribute are given as the first opposite sides, and the strain gauge G7 having the seventh attribute and the strain gauge G8 having the eighth attribute are given as the second opposite sides. As shown at the middle part of FIG. 27, the detection circuit outputs a detection value VMy of moment My around the Y-axis by a Wheatstone bridge circuit in which the strain gauge G5 having the fifth attribute and the strain gauge G8 having the eighth attribute are given as the first opposite sides, and the strain gauge G6 having the sixth attribute and the strain gauge G7 having the seventh attribute are given as the second opposite sides. As shown at the lower part of FIG. 27, the detection circuit outputs a detection value VMz of moment Mz around the Z-axis by a Wheatstone bridge circuit in which the strain gauge G1 having the first attribute and the strain gauge G3 having the third attribute are given as the first opposite sides, and the strain gauge G2 having the second attribute and the strain gauge G4 having the fourth attribute are given as the second opposite side.

<<<Section 5. Devices Suitable for Packaging>>>

Here, a description will be given of several devices suitable for packaging of the above-described force sensors in robots, industrial machines and others.

<5-1. Force Receiving Substrate>

Figure 28:
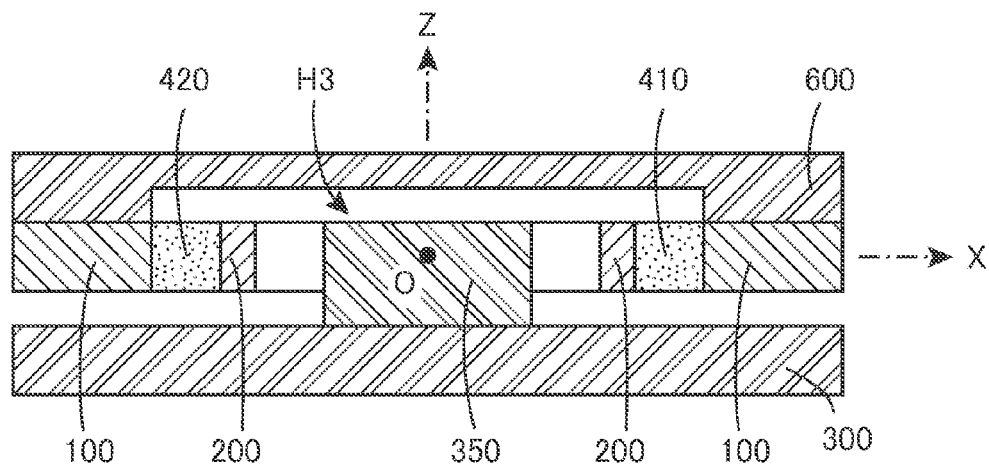
FIG. 28 is a longitudinal sectional view on the XZ-plane showing a state in which a force receiving substrate 600 is added to the basic structure shown in FIG. 1.

FIG. 28 is a longitudinal sectional view on the XZ-plane which shows a state in which a force receiving substrate 600 is added to the basic structure shown in FIG. 1. In reality, detection elements such as capacitive elements and strain gauges or the like are to be added to the basic structure. Here, for the sake of convenience of description, only the basic structure will be shown.

As shown in the figure, the force receiving substrate 600 is a substrate arranged at certain intervals above the force receiving ring 100 and the detection ring 200 and provided with an upper surface in parallel with the XY-plane. Here, a part of the lower surface of the force receiving substrate 600 (the vicinity of the outer circumference in the example shown in the figure) is connected with the upper surface of the force receiving ring 100. Further, a predetermined clearance H3 is formed between the lower surface of the force receiving substrate 600 and the upper surface of the detection ring 200. This is due to an inner part of the lower surface of the force receiving substrate 600 being smaller in thickness than an outer part thereof. The above-described clearance H3 is provided thereby eliminating such a possibility that displacement of the detection ring 200 is prevented by the force receiving substrate 600.

The above-described embodiments are those of detecting force and moment which are exerted on the force receiving ring 100, with the supporting substrate 300 being fixed. However, in the example shown in FIG. 28, force and moment exerted on the force receiving substrate 600 are detected with the supporting substrate 300 being fixed. In other words, force and moment received by the force receiving substrate 600 are transmitted to the force receiving ring 100.

As described above, the force sensor providing the force receiving substrate 600 can be easily packaged, when it is applied to a relay portion such as a robot arm. For example, a hand portion of a robot is jointed on the upper surface of the force receiving substrate 600 and an arm portion of the robot is jointed on the lower surface of the supporting substrate 300, by which the force receiving sensor can be packaged into a wrist of the robot. Thus, it is possible to detect the force and moment which are applied to the hand portion.

<5-2. Another Method for Fixing Detection Ring>

Figure 29:
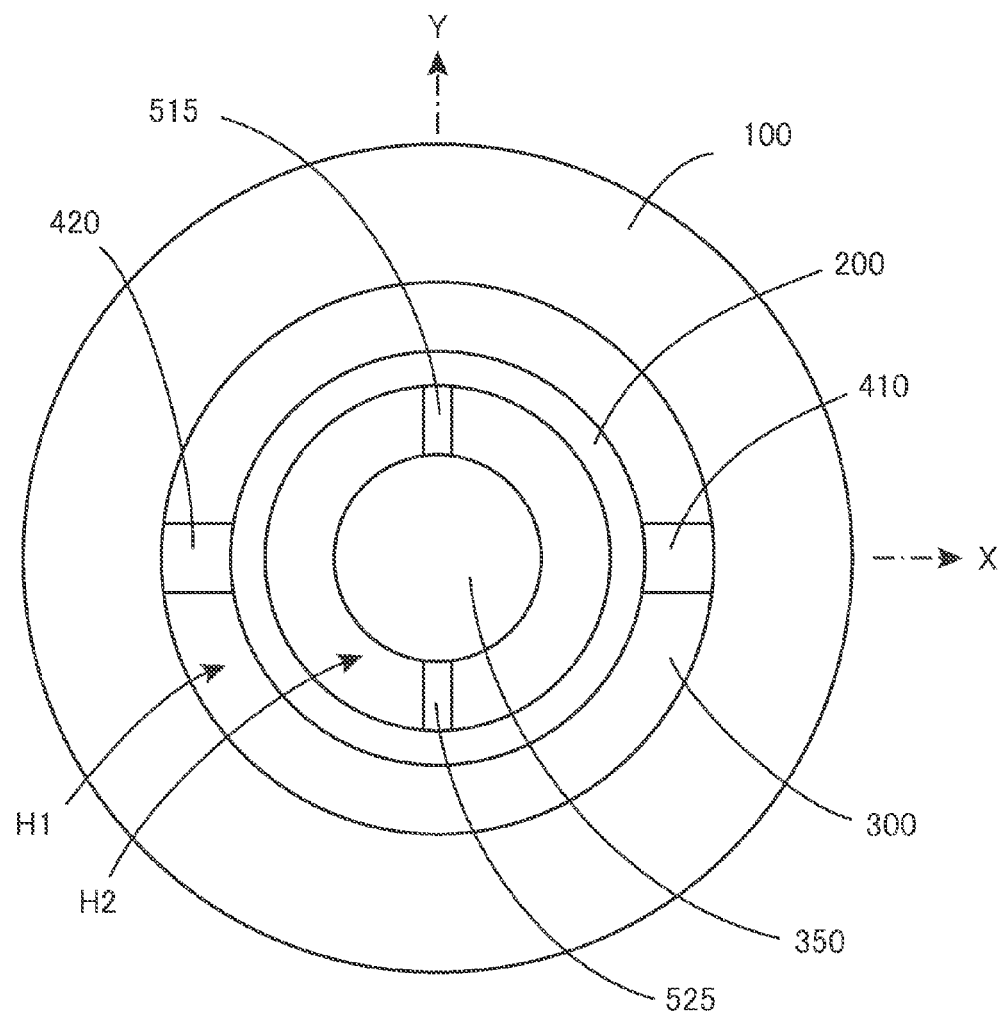
FIG. 29 is a top view showing a modification example in which a method for fixing the detection ring 200 to the basic structure shown in FIG. 1 is changed.

FIG. 29 is a top view showing a modification example in which a method is changed for fixing the detection ring 200 to the basic structure shown in FIG. 1. In this case as well, in reality, detection elements such as capacitive elements and strain gauges or the like are to be added to the basic structure. However, for the sake of convenience of description, only the basic structure is shown.

In the basic structure shown in FIG. 1, the detection ring 200 has been fixed to the supporting substrate 300 by the fixing members 510, 520. In this case, the fixing members 510, 520 have functions to connect the lower surface of the detection ring 200 with the upper surface of the supporting substrate 300. Meanwhile, in the basic structure shown in FIG. 29, the detection ring 200 is fixed to the fixed assistant body 350 by the fixing members 515, 525.

In order to adopt the above-described fixing method, it is a precondition that both the rings are arranged so that the force receiving ring 100 is outside and the detection ring 200 is inside, and the fixed assistant body 350 whose lower surface is fixed onto the upper surface of the supporting substrate 300 is provided further inside the detection ring 200. Each of the force sensors shown in FIG. 14 and FIG. 21 is provided with the basic structure having the above-described precondition. The force sensor shown in FIG. 29 is similar to the force sensors shown in FIG. 14 and FIG. 21 in that the force receiving ring 100 and the detection ring 200 are connected by the connection members 410, 420 along the X-axis. However, in the force sensor shown in FIG. 29, in order to fix the detection ring 200 onto the supporting substrate 300, the inner circumferential surface of the detection ring 200 is connected to the outer circumferential surface of the fixed assistant body 350 by the fixing members 515, 525.

Since the fixing members 515, 525 are arranged along the Y-axis, the fixing points P1, P2 and the exertion points Q1, Q2 defined on the detection ring 200 are not different in positions from those of the embodiments which have been described above. Therefore, although the method different from the above-described embodiments is adopted, this force sensor has the same basic motions as those of the embodiments which have been described above. The detection ring 200 is to be fixed to the supporting substrate 300 via the fixing members 515, 525 and the fixed assistant body 350. Since a member to be jointed on the upper surface of the supporting substrate 300 is only the fixed assistant body 350, this force sensor is slightly simplified in assembly steps as compared with the embodiments which have been described above. Packaging can be done more easily, in particular where the fixed assistant body 350 and the supporting substrate 300 are jointed together at a final stage to package the force sensor.

<5-3. Displacement Control Structure (1)>

Figure 30:
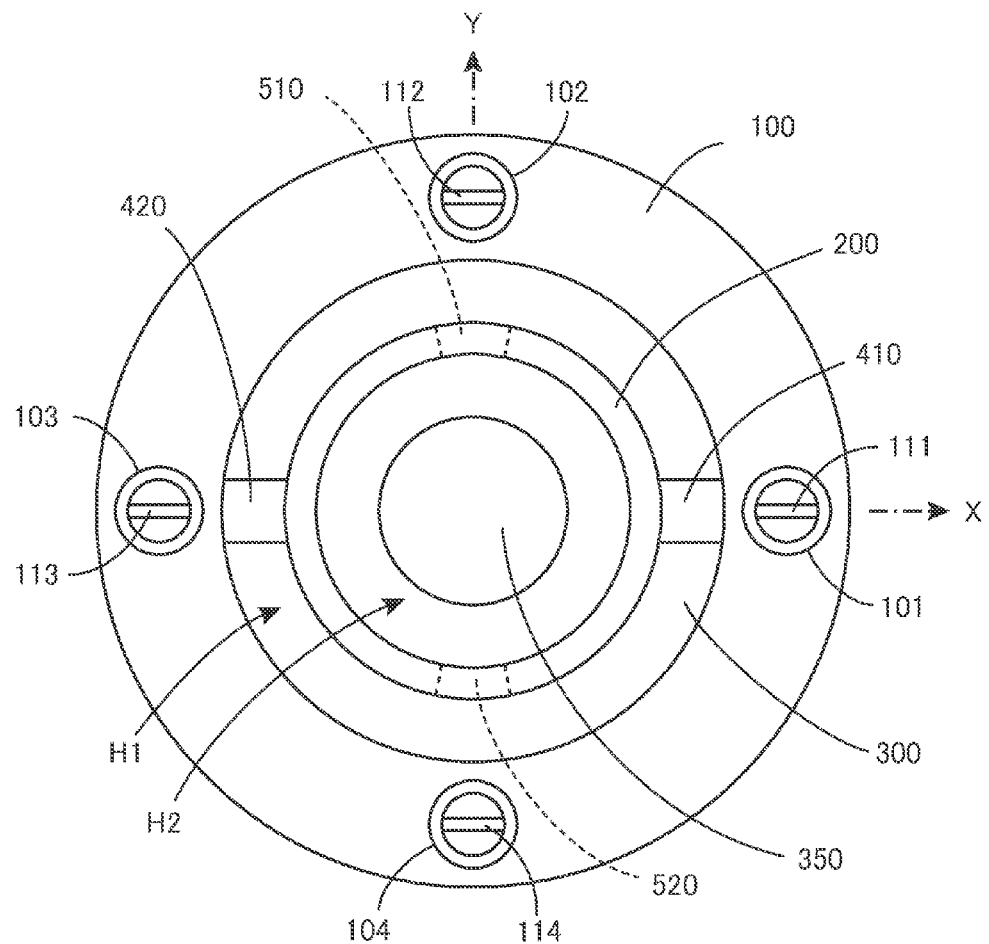
FIG. 30 is a top view showing an example in which a displacement control structure is added to the basic structure shown in FIG. 1.
Figure 31:
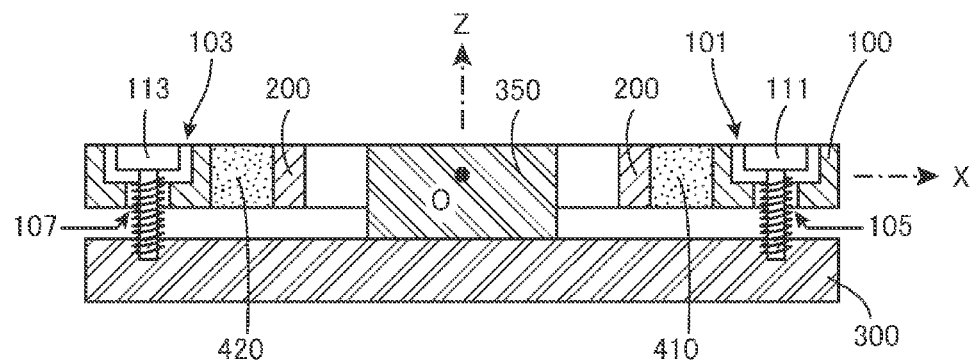
FIG. 31 is a longitudinal sectional view in which the example shown in FIG. 30 is cut along the XZ-plane.

FIG. 30 is a top view which shows an example in which a displacement control structure is added to the basic structure shown in FIG. 1. FIG. 31 is a longitudinal sectional view in which the example is cut along the XZ-plane. As shown in FIG. 31, vertically penetrating through-holes 105, 107 are formed in the vicinity of the both right and left ends of the force receiving ring 100. Grooves 101, 103 larger in diameter than the through-holes 105, 107 are formed at the positions of the through-holes 105, 107 on the upper surface of the force receiving ring 100.

Then, displacement control screws 111, 113 are fitted so as to be inserted through the through-holes 105, 107. The displacement control screws 111, 113 are those in which the leading ends thereof are fixed into threaded holes formed on the upper surface of the supporting substrate 300 and the heads thereof are accommodated into the grooves 101, 103. Further, clearances are formed between the displacement control screw 111 and the inner surface of the through-hole 105 and the inner surface of the groove 101. Clearances are also formed between the displacement control screw 113 and the inner surface of the through-hole 107 and the inner surface of the groove 103.

FIG. 31 is a sectional view cut along the XZ-plane and, therefore, shows only two displacement control screws 111, 113 and surrounding structures thereof. However, in reality, as shown in the top view of FIG. 30, four displacement control screws 111, 112, 113, 114 are arranged at predetermined sites (in this case, a total of four sites, that is positive and negative sites on the X-axis and positive and negative sites on the Y-axis) and they are all similar in structure around them. Heads of the four displacement control screws 111, 112, 113, 114 are accommodated respectively into the respective grooves 101, 102, 103, 104, and a clearance is formed between each of the displacement control screws and each of the grooves. This means that each of the displacement control screws 111 to 114 does not function to fix the force receiving ring 100.

Each of the displacement control screws 111 to 114 is that in which the leading end thereof is fixed into the threaded hole formed in the upper surface of the supporting substrate 300. Therefore, the displacement control screws themselves are fixed in a state of being erected perpendicularly with respect to the supporting substrate 300. Meanwhile, since the force receiving ring 100 is not fixed by the displacement control screws 111 to 114, displacement takes place upon exertion of force or moment. However, where an extent of displacement increases, the displacement control screws 111 to 114 come into contact with the inner surfaces of the through-holes 105 to 108 or the inner surfaces of the grooves 101 to 104, thereby restricting displacement of the force receiving ring 100.

Here, if a clearance is set in such a dimension so that the force receiving ring 100 is restricted for displacement by the displacement control screws 111 to 114 where force or moment exceeding a predetermined tolerance level is exerted on the force receiving ring 100, it is possible to restrict excessive displacement of the force receiving ring 100. By providing the above-described control structure for restricting displacement of the force receiving ring 100, it is possible to prevent the basic structure from being mechanically damaged upon exertion of excessive force or moment. In particular, the detection ring 200 is a flexible member and undergoes elastic deformation upon exertion of force within a predetermined tolerance level. However, exertion of force exceeding the tolerance level may damage the detection ring 200. Therefore, in practice, as shown in the example, it is preferable to provide a certain displacement control structure.

<5-4. Displacement Control Structure (2)>

Here, a description will be given of an example of another structure for controlling excessive displacement of the force receiving ring 100. The example shown here realizes a displacement control structure by utilizing a force receiving substrate 600 arranged above the force receiving ring 100. That is, this example is a force sensor obtained by improving the embodiment using the capacitive elements described in Section 3 so as to be more suitable for packaging. The example is identical in basic structure to the force sensor shown in FIG. 21.

Figure 32:
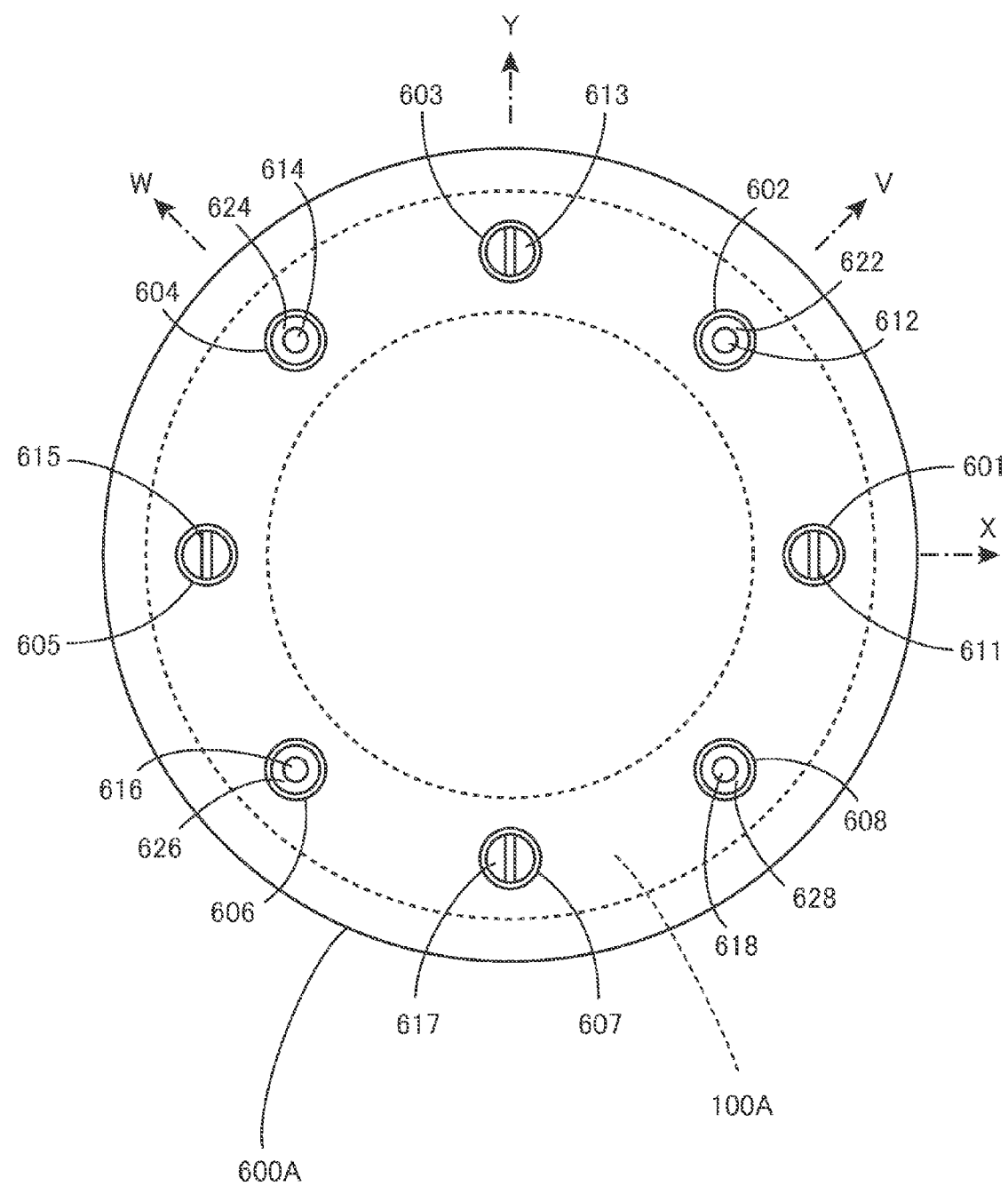
FIG. 32 is a top view showing a force sensor according to a practical embodiment using capacitive elements.
Figure 33:
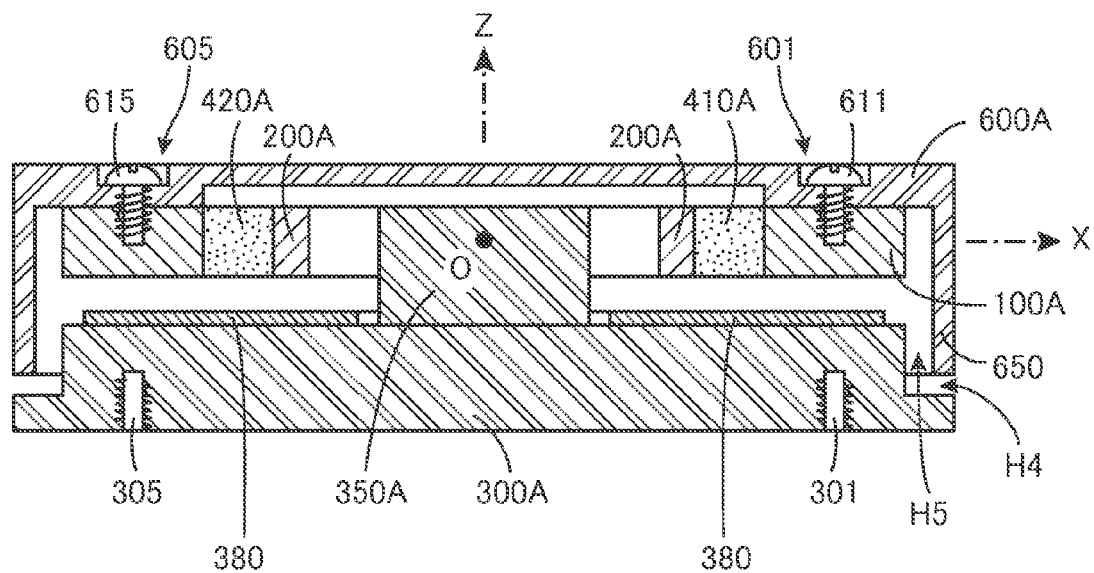
FIG. 33 is a longitudinal sectional view in which the force sensor shown in FIG. 32 is cut along the XZ-plane.
Figure 34:
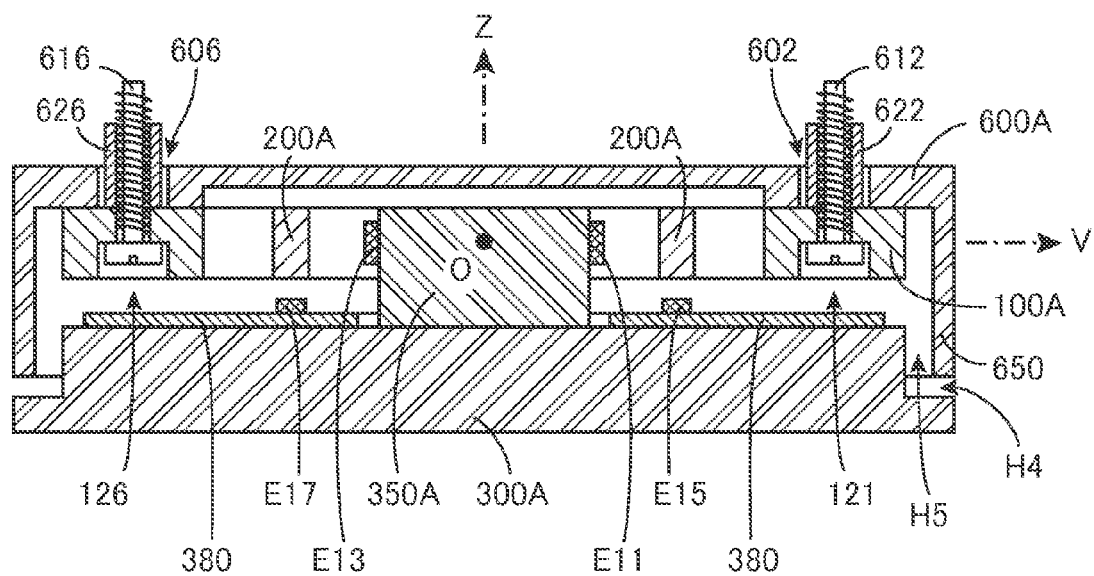
FIG. 34 is a longitudinal sectional view in which the force sensor shown in FIG. 32 is cut along the VZ-plane.

FIG. 32 is a top view of the above-described force sensor. FIG. 33 is a longitudinal sectional view in which the force sensor is cut along the XZ-plane. FIG. 34 is a longitudinal sectional view in which the force sensor is cut along the VZ-plane. Here, the V-axis and the W-axis are the same as those defined in the embodiment shown in FIG. 21. They are coordinate axes which are included in the XY-plane and inclined at 45 degrees with respect to the X-axis and the Y-axis.

As shown in FIG. 32, the upper part of the force sensor is covered with a disk-shaped force receiving substrate 600A. The broken lines in FIG. 32 depict a position of the force receiving ring 100A. As shown in the figure, circular grooves 601, 603, 605, 607 are formed at four sites above the X-axis and the Y-axis of the force receiving substrate 600A. And, through-holes are formed at the centers thereof into which fixing screws 611, 613, 615, 617 are inserted. The fixing screws 611, 613, 615, 617 have functions to fix the force receiving substrate 600A to the force receiving ring 100A.

FIG. 33 clearly shows a state that the fixing screws 611, 615 are fixed into threaded holes formed on the upper surface of the force receiving ring 100A. The heads of the fixing screws 611, 615 are accommodated into the grooves 601, 605. The fixing screws 613, 617 are also fixed in a similar manner. In addition, threaded holes 301, 303, 305, 307 are formed respectively immediately under the fixing screws 611, 613, 615, 617 on the lower surface of the supporting substrate 300A. These threaded holes have functions to fix the supporting substrate 300A to an object below (for example, an arm portion of a robot).

On the other hand, as shown in FIG. 32, circular through-holes 602, 604, 606, 608 are formed at four sites above the V-axis and the W-axis of the force receiving substrate 600A, and cylindrical spacers 622, 624, 626, 628 are fitted thereinto. And fixing screws 612, 614, 616, 618 are inserted through further inside. The fixing screws 612, 614, 616, 618 have functions to fix the force receiving ring 100A to an object above the force receiving substrate 600A (for example, a hand portion of a robot).

FIG. 34 clearly shows the fixing screws 612, 616 and structures around them. The head of the fixing screw 612 is accommodated into the groove 121 formed on the lower surface of the force receiving ring 100A, and the leading end thereof projects upward via a through-hole formed in the force receiving ring 100A and a through-hole 602 formed in the force receiving substrate 600A. The cylindrical spacer 622 is fitted between the fixing screw 612 and the inner wall surface of the through-hole 602. The head of the fixing screw 616 is similarly accommodated into the groove 126 formed on the lower surface of the force receiving ring 100A, and the leading end thereof projects upward through a through-hole formed in the force receiving ring 100A and a through-hole 606 formed in the force receiving substrate 600A. The cylindrical spacer 626 is fitted between the fixing screw 616 and the inner wall surface of the through-hole 606. The fixing screws 614, 618 are also similar in structures around them.

Threaded holes which screw with the leading ends of the fixing screws 612, 614, 616, 618 are formed on the lower surface of an object above the force receiving substrate 600A (for example a hand portion of a robot), by which the object is firmly fixed to the upper ends of the spacers 622, 624, 626, 628 by the fixing screws.

As shown in FIG. 33 and FIG. 34, an inclusive tubular body 650 (a cylindrical object in this example) which includes the force receiving ring 100A and the detection ring 200A is connected to an outer circumference of the lower surface of the force receiving substrate 600A (in the example shown in the figure, the force receiving substrate 600A and the inclusive tubular body 650 are unified into a structural body). Further, clearances H4, H5 are formed between the lower end of the inclusive tubular body 650 and the outer circumference of the supporting substrate 300A. That is, in this example, a step is provided at a circumferential edge of the supporting substrate 300A, and the clearance H4 is formed between the lower end surface of the inclusive tubular body 650 and the step. The clearance H5 is also formed between the inner wall surface of the inclusive tubular body 650 and the circumferential edge inside the step of the supporting substrate 300A.

Here, the clearances H4, H5 are set in such a dimension that, when force or moment exceeding a predetermined tolerance level is exerted on the force receiving substrate 600A, the lower end of the inclusive tubular body 650 is brought into contact with the outer circumference of the supporting substrate 300A, thereby restricting displacement of the force receiving substrate 600A. Therefore, the force sensor is also able to prevent the basic structure from being mechanically damaged upon exertion of excessive force or moment.

In the force sensor, a detection circuit substrate 380 which packages electronics constituting a detection circuit is provided on the upper surface of the supporting substrate 300A. In the example shown in the figure, the detection circuit substrate 380 is a washer-shaped circuit substrate which surrounds a fixed assistant body 350A. As shown in FIG. 34, fixed electrodes E15, E16, E17, E18 are arranged on the upper surface of the detection circuit substrate 380. In the figure, although the electronics packaged on the detection circuit substrate 380 are omitted, the electronics are components which constitute, for example, the circuits shown in FIG. 18. Wiring is provided between the electronics, a common displacement electrode E0 (that is, the detection ring 200A) and each of the fixed electrodes E11 to E18.

As described above, the detection circuit substrate 380 is provided on the upper surface of the supporting substrate 300A and components of the detection circuits are packaged, thus making it possible to assemble internally all constituents necessary for the force sensor. Therefore, the sensor in its entirety can be saved for space and made thin.

<<<Section 6. Diaphragm Forming Embodiment>>>

In the embodiments described above, a circular ring which is entirely flexible is used as the detection ring 200. However, a detection ring 200 used in the present invention is not necessarily flexible as a whole but a ring which undergoes at least partial elastic deformation will do. Here, a description will be given of an embodiment in which a diaphragm is formed at a part of the detection ring 200 so that the diaphragm has functions to undergo elastic deformation.

Figure 35:
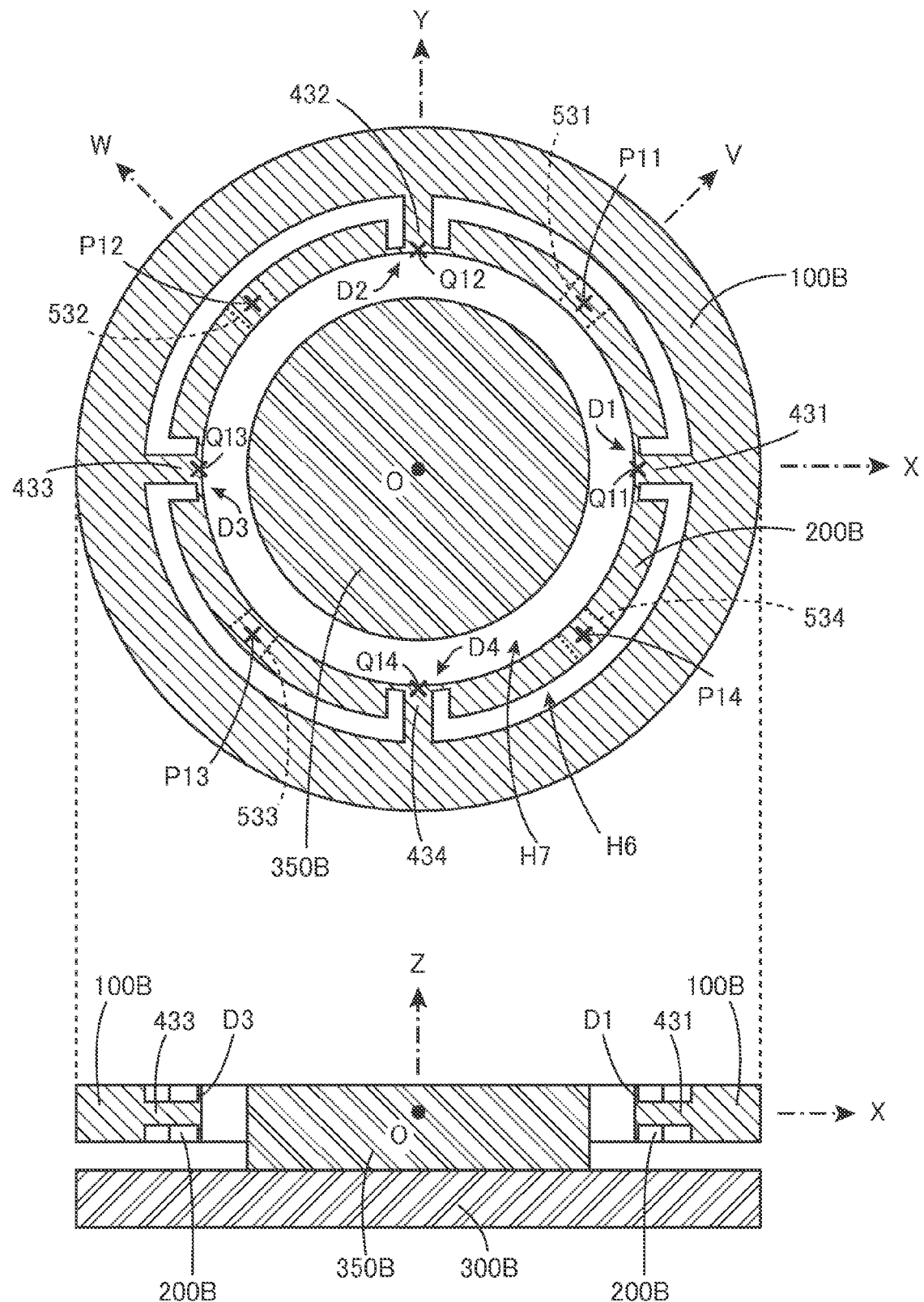
FIG. 35 is a cross sectional view (the upper part of the figure) in which a basic structure of an embodiment having diaphragms is cut along the XY-plane and a longitudinal sectional view (the lower part of the figure) in which the basic structure is cut along the XZ-plane.

FIG. 35 is a cross sectional view (the upper part of the figure) in which a basic structure of the embodiment having diaphragms formed on the detection ring is cut along the XY-plane and a longitudinal sectional view (the lower part of the figure) in which the basic structure is cut along the XZ-plane. In this case as well, the V-axis and the W-axis are the same as those defined in the embodiments described above, and they are coordinate axes which are included in the XY-plane and inclined at 45 degrees with respect to the X-axis and the Y-axis.

The basic structure shown here is constituted so that a detection ring 200B is arranged inside the force receiving ring 100B, a fixed assistant body 350B is arranged further inside and a supporting substrate 300B is arranged below them. A clearance H6 is secured between the force receiving ring 100B and the detection ring 200B, and a clearance H7 is secured between the detection ring 200B and the fixed assistant body 350B. Then, the force receiving ring 100B and the detection ring 200B are supported at a position suspended upward with respect to the supporting substrate 300B. Therefore, the detection ring 200B is able to undergo deformation and displacement within a predetermined tolerance level.

The force receiving ring 100B and the detection ring 200B are both circular rings and arranged on the XY-plane, with the Z-axis given as a central axis. Further, the supporting substrate 300B is provided with an upper surface parallel to the XY-plane and arranged at certain intervals below the force receiving ring 100B and the detection ring 200B. Then, the fixed assistant body 350B is a cylindrical structure which is arranged, with the Z-axis given as a central axis. The lower surface of the fixed assistant body 350B is jointed onto the upper surface of the supporting substrate 300B. These features are common to those of the basic structure shown in FIG. 8.

However, in the embodiment shown here, the detection ring 200B is not a geometrically perfect circular ring. As shown in the cross sectional view at the upper part of FIG. 35, four sets of diaphragms D1 to D4 are provided at a part of the detection ring 200B. Then, each of four connection members 431 to 434 connecting the force receiving ring 100B with the detection ring 200B is a cylindrical member, with the X-axis or the Y-axis given as a central axis. And, the inner end thereof is connected to the center position of each of the diaphragms D1 to D4. Therefore, the center position of each of the diaphragms D1 to D4 functions as each of the exertion points Q11 to Q14. In practice, the force receiving ring 100B, the detection ring 200B and the connection members 431 to 434 can be manufactured as a unified structure by using the same material such as a metal.

Figure 36:
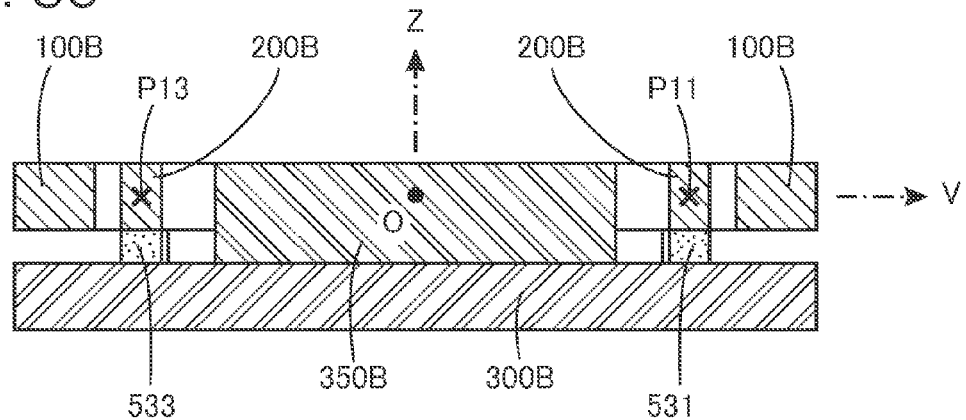
FIG. 36 is a longitudinal sectional view in which the basic structure shown in FIG. 35 is cut along the VZ-plane.

On the other hand, as shown in the figure, fixing points P11 to P14 are defined on the V-axis and the W-axis of the detection ring 200B. Then, the positions of the fixing points P11 to P14 on the detection ring 200B are fixed on the upper surface of the supporting substrate 300B by the fixing members 531 to 534. Fixing members 531 to 534 depicted by the broken lines in FIG. 35 are arranged on the lower surface of the positions of the fixing points P11 to P14 of the detection ring 200B. FIG. 36 is a longitudinal sectional view in which the basic structure shown in FIG. 35 is cut along the VZ-plane. This figure clearly shows a state that the lower surface in the vicinity of the fixing point P11 of the detection ring 200B is fixed on the upper surface of the supporting substrate 300B by the fixing member 531, and the lower surface in the vicinity of the fixing point P13 of the detection ring 200B is fixed on the upper surface of the supporting substrate 300B by the fixing member 533.

Consequently, as shown in the cross sectional view at the upper part of FIG. 35, the detection ring 200B is to receive force at four sites of exertion points Q11 to Q14 in a state of being fixed to the supporting substrate 300B at four sites of the fixing points P11 to P14. The diaphragms D1 to D4 are parts thinner in thickness than other parts formed on the detection ring 200B and flexible. Therefore, when force is exerted on each of the exertion points Q11 to Q14 from the force receiving ring 100B via the four connection members 431 to 434, elastic deformation exclusively occurs at the diaphragms D1 to D4. As a matter of course, specifically, where each part of the detection ring 200B is constituted by the same material, elastic deformation occurs to some extent at parts other than the diaphragms D1 to D4. However, in practice, elastic deformation concentrates on the diaphragms D1 to D4.

Therefore, in the embodiment shown here, elastic deformation occurring at the diaphragms D1 to D4 is to be detected electrically by detection elements. To be more specific, as with the embodiment described in Section 3, a method is adopted in which capacitive elements are used to measure displacement occurring at the diaphragms D1 to D4, thereby recognizing a mode of elastic deformation on the basis of the measurement result. As will be described later, when forces Fx, Fy, Fz in the direction of each coordinate axis and moments Mx, My, Mz around each coordinate axis are exerted on the force receiving ring 100B in a state that the supporting substrate 300B is fixed, deformation modes of the diaphragms D1 to D4 differ individually. It is, thus, possible to detect six-axis-components independently by measuring displacement occurring at the diaphragms D1 to D4.

Figure 37:
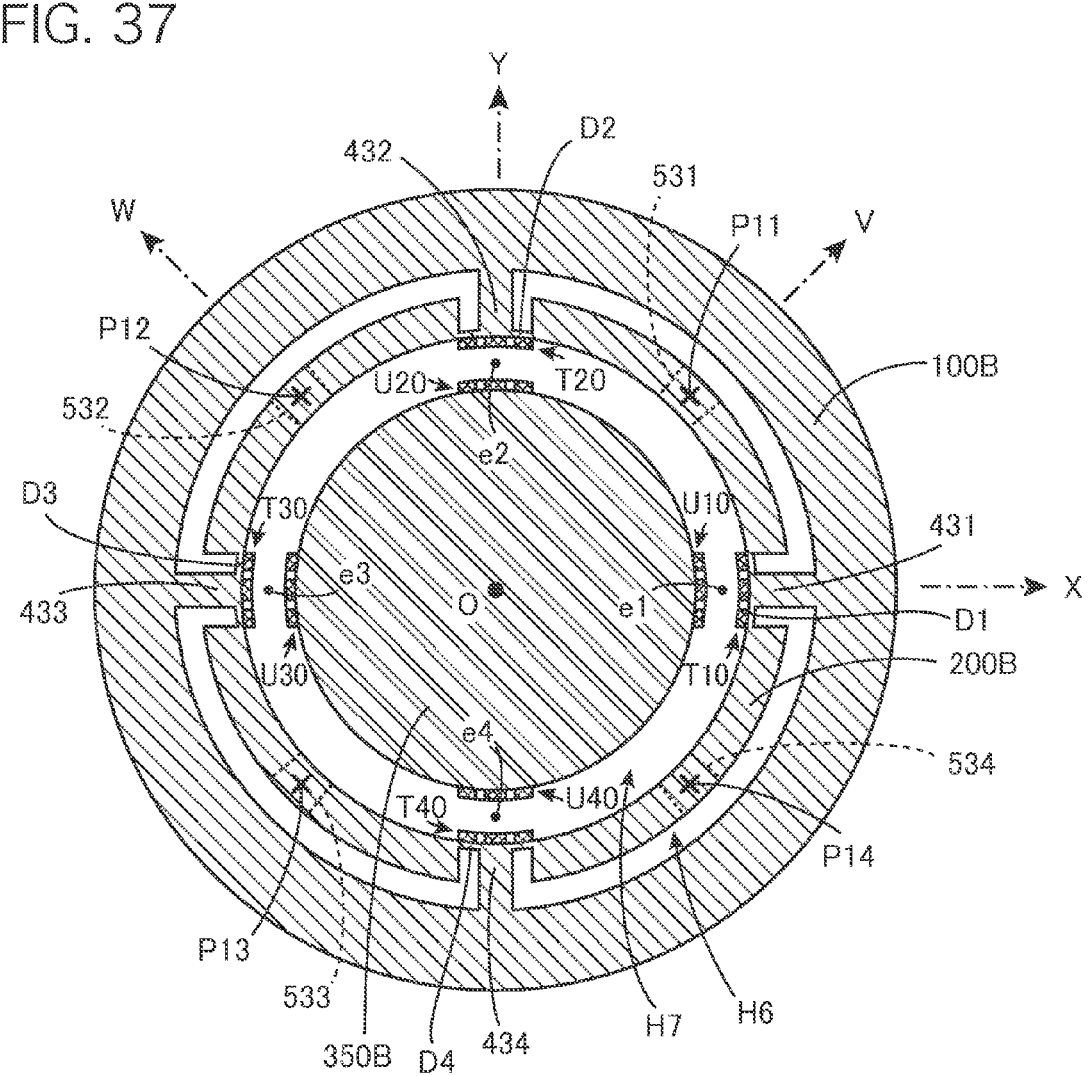
FIG. 37 is a cross sectional view in which a force sensor constituted by adding capacitive elements to the basic structure shown in FIG. 35 is cut along the XY-plane.

FIG. 37 is a cross sectional view in which a force sensor constituted by adding capacitive elements to the basic structure shown in FIG. 35 is cut along the XY-plane. In the force sensor, a total of 40 electrodes are provided to constitute a total of 20 sets of capacitive elements. In this case, for the sake of convenience, a description will be given of a case where five electrodes arranged adjacent to each other are given as one electrode group to constitute a total of eight sets of electrode groups. In FIG. 37, the electrode groups indicated by symbols T10, T20, T30, T40 are displacement electrode groups, each of which is constituted by five displacement electrodes, and arranged at the respective positions of diaphragms D1, D2, D3, D4 on the inner circumferential surface of the detection ring 200B. On the other hand, the electrode groups indicated by symbols U10, U20, U30, U40 are fixed electrode groups, each of which is constituted by five fixed electrodes and arranged at the respective positions facing the displacement electrode groups T10, T20, T30, T40 on the outer circumferential surface of the fixed assistant body 350B.

Figure 38:
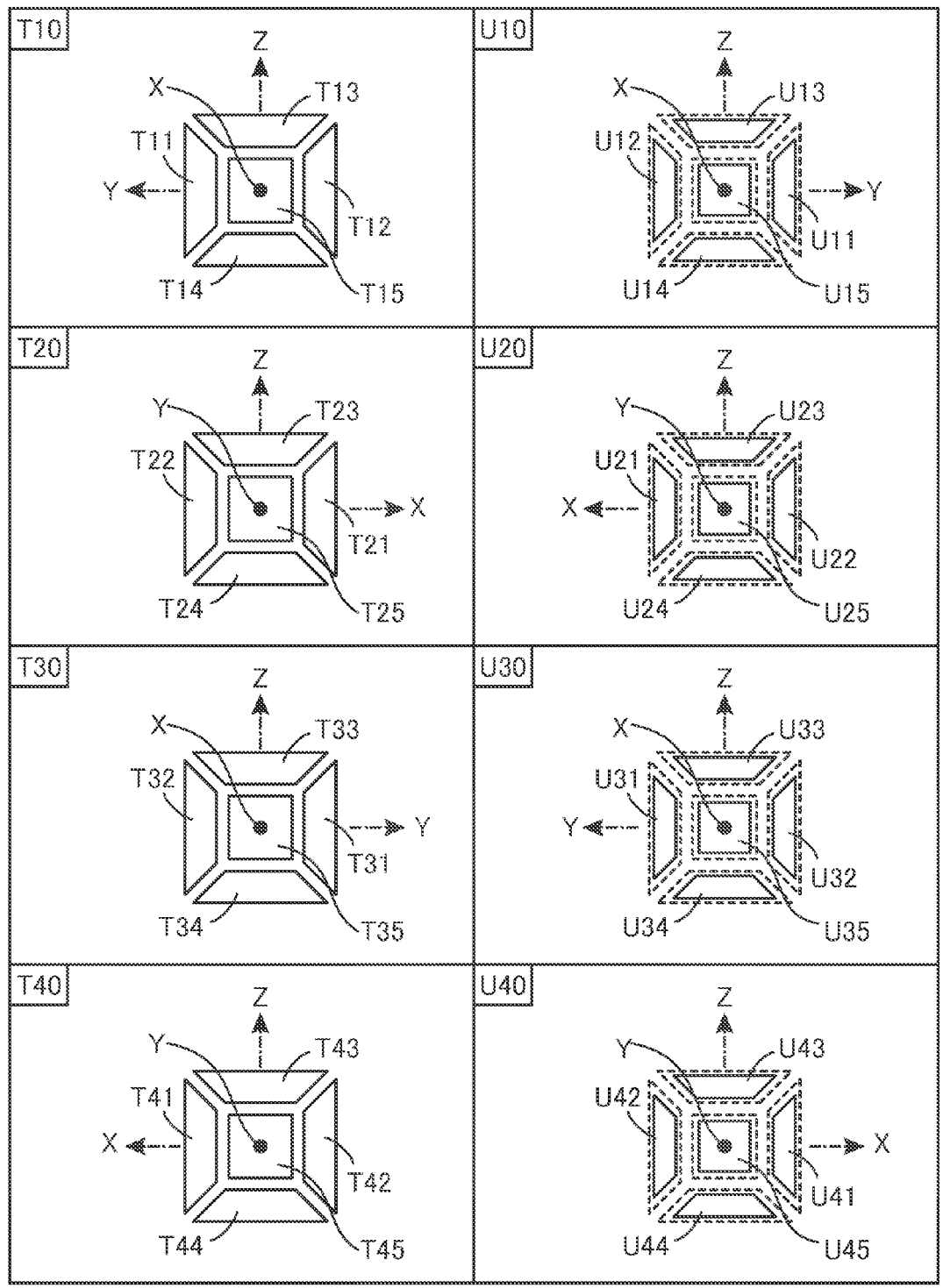
FIG. 38 is a table showing an electrode constitution of each of the capacitive elements used in the force sensor shown in FIG. 37 (showing a state when viewed respectively from view points of e1 to e4, with the positive direction of the Z-axis taken upward).

Since it is difficult to show the eight sets of electrode groups (40 electrodes) in detail in FIG. 37, a shape and arrangement of each of the electrodes is shown in the table of FIG. 38. In this table, cells given as T10, T20, T30, T40 show plan views of the displacement electrode groups T10, T20, T30, T40 shown in FIG. 37. Cells given as U10, U20, U30, U40 show plan views of the fixed electrode groups U10, U20, U30, U40 shown in FIG. 37. Each of the plan views shows a state that the electrode group is viewed from the respective positions of view points e1, e2, e3, e4 shown in FIG. 37. In order to clarify a positional relationship with respect to the XYZ coordinate system, each of the plan views shows the direction of each of the X, Y, Z axes. In any of the plan views, the Z-axis is placed upward. Broken lines in the plan view of each of the fixed electrode groups U10, U20, U30, U40 depict projection images (projection images in the direction of the X-axis or in the direction of the Y-axis) of displacement electrodes belonging to the displacement electrode groups T10, T20, T30, T40 facing thereto.

For example, the cell [T10] in FIG. 38 shows a plan view of five displacement electrodes T11 to T15 belonging to the displacement electrode group T10. This plan view is obtained by observing the electrodes in the positive direction of the X-axis from the position of view point e1 shown in FIG. 37. All the displacement electrodes T11 to T15 are arranged at the diaphragm D1 on the inner circumferential surface of the detection ring 200B. Therefore, in practice, each of the electrodes is to be formed on the curved surface. However, in FIG. 38, for the sake of convenience of description, the electrodes are assumed to be arranged on a flat surface. The displacement electrodes T11 to T14 are trapezoidal electrodes identical in dimension, while the displacement electrode T15 is a square electrode. The displacement electrode T15 is arranged so that the center point is on the X-axis. The displacement electrodes T11 to T14 are arranged so as to surround the displacement electrode T15. In the plan view shown here, the displacement electrode group T10 is symmetrical about the Y-axis and the Z-axis as well.

On the other hand, the cell [U10] in FIG. 38 shows a plan view of five fixed electrodes U11 to U15 belonging to the fixed electrode group U10. This plan view is obtained by observing in the negative direction of the X-axis from the position of the view point e1 shown in FIG. 37. The fixed electrodes U11 to U15 are arranged at the respective positions facing the displacement electrodes T11 to T15. In the plan view shown here, the fixed electrode group U10 is symmetrical about the Y-axis and the Z-axis as well. As described above, the broken lines in the figure depict projection images (projection images in the direction of the X-axis) of the displacement electrodes T11 to T15 facing thereto.

The five displacement electrodes T11 to T15 respectively face the five fixed electrodes U11 to U15, thereby forming five sets of capacitive elements C11 to C15. Further, as shown in the cell [U10] in FIG. 38, the fixed electrodes U11 to U15 depicted by the solid lines are respectively included in the projection images of the displacement electrodes T11 to T15 depicted by the broken lines. This means that a pair of opposing electrodes are in a relationship of the electrodes Ea, Eb shown in FIG. 15. That is, the capacitive elements C11 to C15 are capacitive elements which meet such a condition that a projection image in which one of the electrodes is projected on a surface on which the other electrode is formed is included in the other electrode. As long as displacement of the diaphragm D1 is within a predetermined tolerance level, an effective counter area of each of the capacitive elements C11 to C15 is kept constant.

This is entirely true for the displacement electrode groups shown in the cells [T20], [T30], [T40] and the fixed electrode groups shown in the cells [U20], [U30], [U40] in FIG. 38. Consequently, the displacement electrodes T11 to T15 and the fixed electrodes U11 to U15 constitute the capacitive elements C11 to C15 (hereinafter, referred to as a capacitive element group C10). The displacement electrodes T21 to T25 and the fixed electrodes U21 to U25 constitute the capacitive elements C21 to C25 (hereinafter, referred to as a capacitive element group C20). Further, the displacement electrodes T31 to T35 and the fixed electrodes U31 to U35 constitute the capacitive elements C31 to C35 (hereinafter, referred to as a capacitive element group C30). Still further, the displacement electrodes T41 to T45 and the fixed electrodes U41 to U45 constitute the capacitive elements C41 to C45 (hereinafter, referred to as a capacitive element group C40). In this case, the capacitive element groups C10, C20, C30, C40 have the functions to detect respectively displacement (elastic deformation) of the diaphragms D1, D2, D3, D4, as detection elements.

Then, in the force sensor, assessment will be made for changes in capacitance values of the capacitive element groups C10, C20, C30, C40, when forces +Fx, +Fy, +Fz in the direction of each coordinate axis and moments +Mx, +My, +Mz around each coordinate axis are exerted on the force receiving ring 100B, with the supporting substrate 300B being fixed. FIG. 39 is a table which shows changes in capacitance values of the capacitive elements C11 to C45 when the force in the direction of each coordinate axis and the moment around each coordinate axis are exerted on the force sensor shown in FIG. 37. In this table, [+] shows an increase in capacitance value, [−] shows a decrease in capacitance value and [0] shows no variation in capacitance value. The fact that the above results are obtained will be easily understood when consideration is given to a specific deformation mode of the detection ring 200B.

For example, in FIG. 37, when force +Fx in the positive direction of the X-axis is exerted on the force receiving ring 100B, the diaphragm D1 is stretched rightward and the diaphragm D3 is pushed out rightward. As a result, a distance between the electrodes of the capacitive element group C10 spreads to decrease the capacitance value. A distance between the electrodes of the capacitive element group C30 narrows to increase the capacitance value. At this time, although the capacitive element groups C20, C40 deviate in the direction of the X-axis, no substantial change in distance between the electrodes or in effective counter area occurs. Thus, the capacitance value does not change. The row +Fx in the table of FIG. 39 shows the above-described results. For the same reason, upon exertion of force +Fy in the positive direction of the Y-axis, the results are obtained shown in the row +Fy in the table of FIG. 39.

Then, consideration will be given to a case where force +Fz in the positive direction of the Z-axis is exerted on the force receiving ring 100B.

Figure 40:
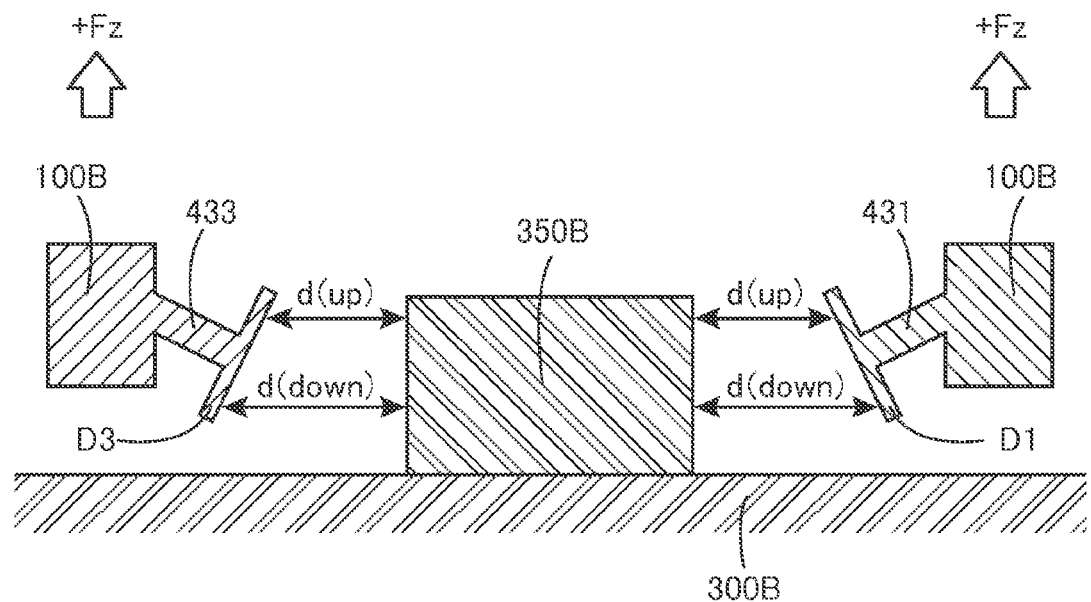
FIG. 40 is a longitudinal sectional view on the XZ-plane showing a deformed state when force +Fz in the positive direction of the Z-axis is exerted on the force sensor shown in FIG. 37 (for the sake of convenience of explanation, each part is depicted with deformation).

FIG. 40 is a longitudinal sectional view on the XZ-plane which shows a deformed state upon exertion of the force +Fz. For the sake of convenience of explanation, only necessary constituents are extracted and each part is shown in a deformed manner. Therefore, shapes of individual parts do not precisely show an actual deformation mode. As shown in the figure, upon upward movement of the force receiving ring 100B, upward force is transmitted to the center part of each of the diaphragms D1, D3 via connection members 431, 433. As a result, the diaphragms D1, D3 are inclined as shown in the figure. In the figure, the diaphragms D1, D3 are depicted as flat plates. In reality, they assume a complicated configuration including torsion. However, when consideration is given to variation in distance with respect to an outer circumferential surface of the fixed assistant body 350B, a distance d (up) at the upper part decreases, while a distance d (down) at the lower part increases, as shown in the figure.

As a result, in the table shown in FIG. 38, increased are capacitance values of the capacitive elements C13, C23, C33, C43 composed of counter electrodes arranged above. And, decreased are capacitance values of the capacitive elements C14, C24, C34, C44 composed of counter electrodes arranged below. Regarding counter electrodes arranged at the center or on the right and left sides, those at the upper half decrease in distance but those at the lower half increase in distance. Thus, the decrease in distance at the upper half is offset by the increase in distance at the lower half, and there is no change in capacitance values of the capacitive elements composed of the counter electrodes. The row +Fz in the table of FIG. 39 shows the above results.

Then, consideration will be given to a case where moment +My which is positive rotation around the Y-axis is exerted on the force receiving ring 100B. In this case, in FIG. 37, the left end of the force receiving ring 100B moves in the positive direction of the Z-axis (a direction in which it is lifted up from the sheet surface). Therefore, the diaphragm D3 is inclined as with that shown in FIG. 40, and a distance d (up) at the upper part decreases, while a distance d (down) at the lower part decreases. Thus, the capacitive element C33 increases in capacitance value, and the capacitive element C34 decreases in capacitance value. On the other hand, the right end of the force receiving ring 100B moves in the Z-axis negative direction (a direction in which it moves to the back of the sheet surface). Therefore, the diaphragm D1 is inclined in a direction reverse to that shown in FIG. 40, and a distance d (up) at the upper part increases, while a distance d (down) at the lower part decreases. As a result, the capacitive element C13 decreases in capacitance value, while the capacitive element C14 increases in capacitance value. The other capacitive elements do not change in capacitance value. The above results are shown in the row +My in the table of FIG. 39. For the same reason, the results shown in the row +Mx in the table of FIG. 39 are obtained upon exertion of moment +Mx which is positive rotation around the X-axis.

Figure 41:
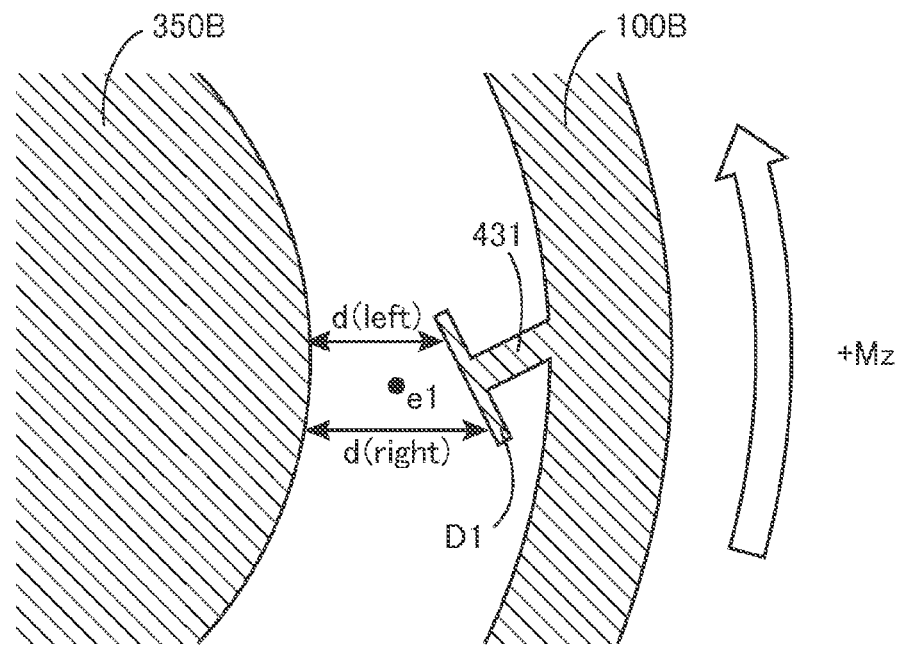
FIG. 41 is a cross sectional view on the XY-plane showing a deformed state when moment +Mz which is positive rotation around the Z-axis is exerted on the force sensor shown in FIG. 37 (for the sake of convenience of explanation, each part is depicted with deformation).

Finally, consideration will be given to a case where moment +Mz which is positive rotation around the Z-axis is exerted on the force receiving ring 100B. FIG. 41 is a cross sectional view on the XY-plane which shows a deformed state upon exertion of the moment +Mz around the Z-axis. In this figure as well, for the sake of convenience of explanation, only necessary constituents are extracted and each part is shown in a deformed manner. Therefore, shapes of individual parts do not precisely show an actual deformation mode. As shown in the figure, upon exertion of the moment +Mz, the force receiving ring 100B rotates counterclockwise, by which the diaphragm D1 is inclined as shown in the figure. In this case as well, the diaphragm D1 is depicted as a flat plate. However, in practice, it assumes a complicated configuration including torsion. When consideration is given to variation in distance with the outer circumferential surface of the fixed assistant body 350B, as shown in the figure, a distance d (left) on the left side (the upper side in FIG. 41) decreases when viewed from the view point e1, and a distance d (right) on the right side (the lower side in FIG. 41) increases. As a result, the capacitive element C11 increases in capacitance value, while the capacitive element C12 decreases in capacitance value. For the same reason, the capacitive elements C21, C32, C42 increase in capacitance value, while the capacitive elements C22, C31, C41 decrease in capacitance value. The other capacitive elements do not change in capacitance value. The row +Mz in the table of FIG. 39 shows the above results.

The table in FIG. 39 shows the results obtained upon exertion of force in a positive direction and moment which is positive rotation. The results in which [+] and [−] are reversed are to be obtained upon exertion of force in a negative direction and moment which is negative rotation. Consequently, patterns of change in capacitance values of 20 sets of the capacitive elements C11 to C45 differ depending on individual cases upon exertion of six-axis-components. The larger the exerting force and moment become, the larger the variance is. Thus, detection circuits are used to conduct a predetermined operation on the basis of measured values of the capacitance, thus making it possible to independently output detection values of the six-axis-components.

FIG. 42 is a view which shows specific arithmetic expressions for determining forces Fx, Fy, Fz in the direction of each coordinate axis and moments Mx, My, Mz around each coordinate axis which are exerted on the force sensor shown in FIG. 37. Each of C11 to C45 in the expressions shows a capacitance value of each of the capacitive elements C11 to C45 indicated by the same symbol. Reasons for obtaining individual detection values by the arithmetic expressions will be understood by referring to the table shown in FIG. 39. For example, a first expression on Fx shows a difference between a sum of capacitance values of five sets of capacitive elements which are indicated by [+] in the row +Fx in the table of FIG. 39 and a sum of capacitance values of five sets of capacitive elements which are indicated by [−]. Second and third expressions are expressions where, of five sets of capacitive elements, only four sets or one set is used. This is also true for other detection values.

Further, [+] and [−] shown in the table of FIG. 39 are reversed upon exertion of forces Fx, Fy, Fz in a negative direction and moments Mx, My, Mz, which is negative rotation. Therefore, the arithmetic expressions shown in FIG. 42 are used as they are, by which individual detection values can be obtained as negative values. The arithmetic expressions of six-axis-components in FIG. 42 are free of interference with other axis components, thus making it possible to obtain individual detection values of the six-axis-components independently. Still further, any of the arithmetic expressions can be used to calculate a difference. Therefore, even where a change in temperature environment causes the basic structure to swell or shrink, resulting in errors in which distances between counter electrodes vary, the errors can cancel each other out. Thus, it is possible to obtain accurate results free of disturbance components.

Here, examples of detection circuits for outputting detection values of the six-axis-components are omitted on the basis of the arithmetic expressions shown in FIG. 42. It is possible to constitute the detection circuits according to the circuit diagrams shown in FIG. 18. As a matter of course, a plurality of capacitive elements are connected in parallel, thus making it possible to omit computing elements for arithmetic addition. Further, A/D converters are used to take the capacitance values C11 to C45 individually as the digital values, by which each of the detection values can be output in terms of a digital value as a result of digital operation.

Figure 43:
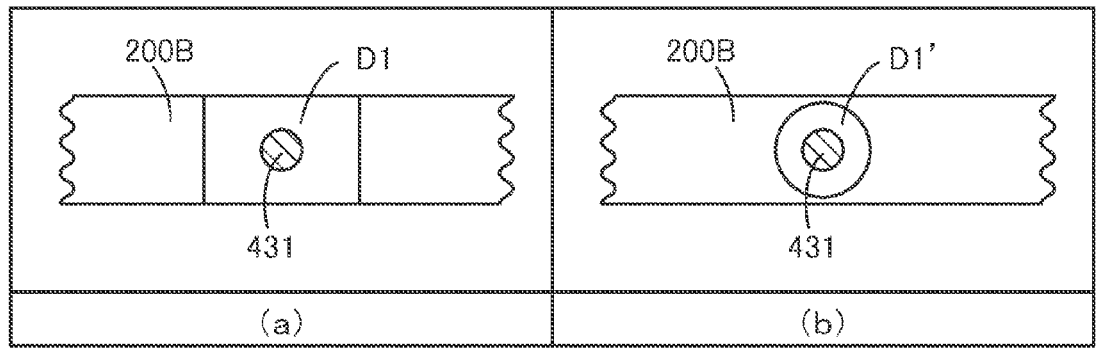
FIG. 43 is a front view showing a modification example of the diaphragm of the force sensor shown in FIG. 37.

Still further, the structure of the force sensor shown in FIG. 37 is one example, a detailed specification of which can be changed, whenever necessary, in view of design. For example, the diaphragm D1 of the force sensor shown in FIG. 37 is that in which, as shown in FIG. 43(a) (a view in which the direction of origin O is observed from the positive direction of the X-axis), the contour is rectangular and a connection member 431 (the cross section of which is shown) is jointed at the center thereof. The above-shaped diaphragm D1 can be formed by cutting a part of the detection ring 200B and manufactured in a relatively simple process. However, the diaphragm is not necessarily restricted to the rectangular shape.

The example shown in FIG. 43(b) (also a view in which the direction of origin O is observed from the positive direction of the X-axis) is an example in which formed is a diaphragm Dr having a circular contour. This example is similar in that a connection member 431 is jointed at the center of the diaphragm Dr. However, the diaphragm Dr is formed by grooving in a circular shape on a detection ring 200B and a periphery thereof in its entirety is surrounded by thick parts of the detection ring 200B.

Figure 44:
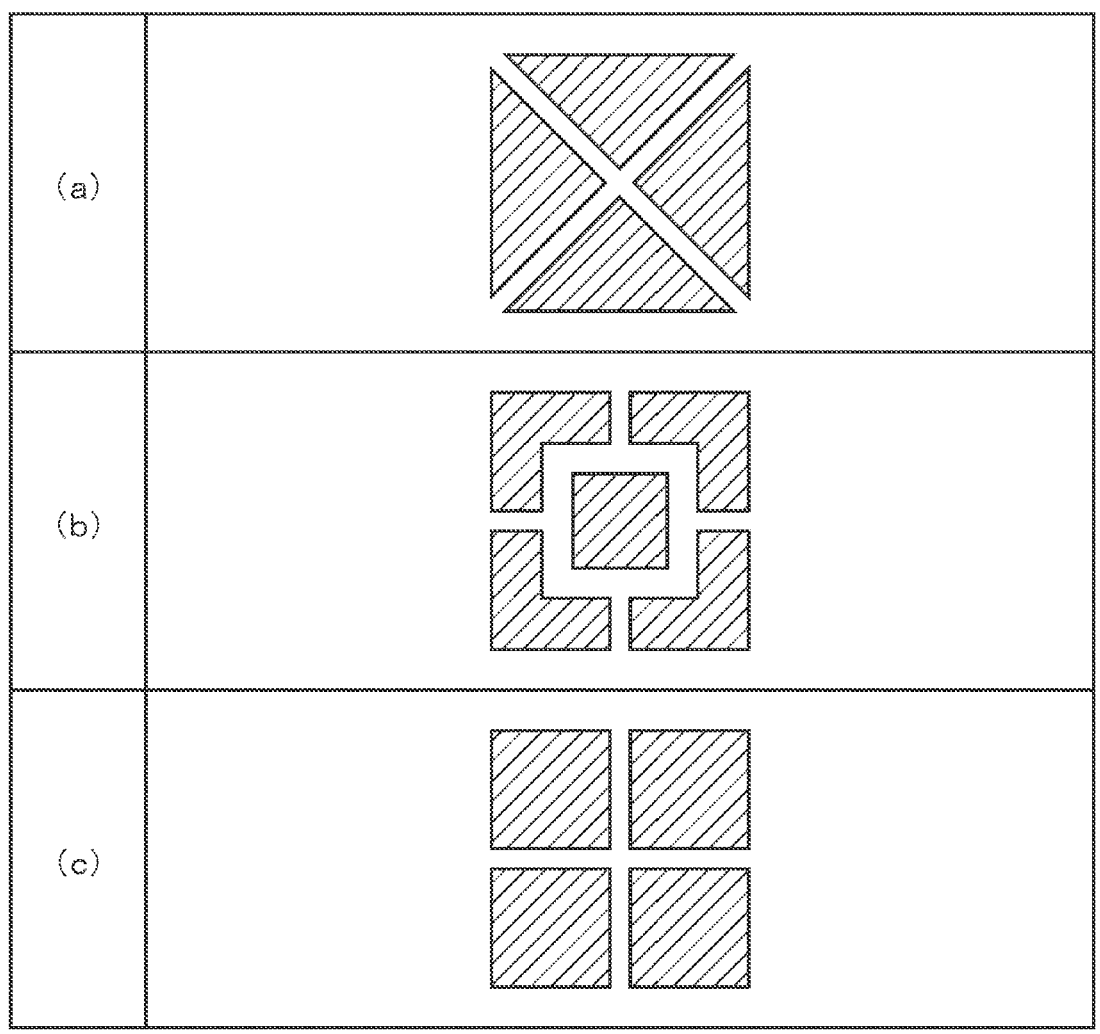
FIG. 44 is a plan view showing modification examples of electrode groups used in the force sensor shown in FIG. 37 (hatching is made to clarify the shape of each electrode and not for showing the cross section).

On the other hand, FIG. 44 is a plan view which shows modification examples of electrode groups used in the force sensor shown in FIG. 37 (hatching is made to clarify the shape of each electrode and not for showing the cross section). In the force sensor shown in FIG. 37, as shown in the plan view of FIG. 38, one set of electrode groups is constituted by five electrodes consisting of one square electrode and four trapezoidal electrodes. The number, shape and arrangement of the electrodes which constitute each electrode group are not restricted to those of the example shown in FIG. 38. FIG. 44(a) is an example in which one set of electrode groups is constituted by four isosceles-triangle electrodes. Further, FIG. 44(b) is an example in which one set of electrode groups is constituted by five electrodes consisting of one square electrode and four L-letter shaped electrodes. Still further, FIG. 44(c) is an example in which one set of electrode groups is constituted by four square electrodes. As a matter of course, in addition to this example, various constitutions of electrodes are also available.

A detailed description will be omitted here about a method for detecting six-axis-components where the constitutions of electrodes shown as modification examples in FIG. 44 are adopted. In any case, a table according to FIG. 39 can be prepared. This table can be used to define arithmetic expressions according to FIG. 42.

Finally, features of the embodiment described in Section 6 will be summarized as follows. First, as shown in FIG. 35, four exertion points Q11 to Q14 and four fixing points P11 to P14 are alternately arranged on an annular channel along the contour of the detection ring 200B, and vicinities of the four exertion points Q11 to Q14 on the detection ring 200B constitute diaphragms D1 to D4 which are thinner in thickness than other parts. Then, four connection members 431 to 434 are connected to the diaphragms D1 to D4 respectively at the exertion points Q11 to Q14, and four fixing members 531 to 534 are connected to the lower surface of the detection ring 200B at the fixing points P1 to P4.

As a matter of course, the number of exertion points and that of fixing points are not necessarily restricted to four and can be set to any given plural number of n. In brief, it is acceptable that n number of plural exertion points Q11 to Qin and n number of plural fixing points P11 to Pln are alternately arranged on an annular channel along the contour of the detection ring 200B, the vicinities of n number of exertion points Q11 to Qln on the detection ring 200B constitute diaphragms D1 to Dn which are thinner in thickness than other parts, n number of connection members are connected to the individual diaphragms, and the fixing points P11 to Pin are fixed individually on the supporting substrate 300B by n number of fixing members. Then, detection elements for electrically detecting elastic deformation of each of the diaphragms D1 to Dn may be added to the above-constituted basic structure.

However, in practical use, as described in the above embodiment, detection can be made in practice very efficiently in the following manner, that is, four exertion points and four fixing points are arranged on the annular channel along the contour of the detection ring 200B in the order of the first exertion point Q11, the first fixing point P11, the second exertion point Q12, the second fixing point P12, the third exertion point Q13, the third fixing point P13, the fourth exertion point Q14 and the fourth fixing point P14, then, the first diaphragm D1 is constituted in the vicinity of the first exertion point Q11 on the detection ring 200B, the second diaphragm D2 is constituted in the vicinity of the second exertion point Q12, the third diaphragm D3 is constituted in the vicinity of the third exertion point Q13, the fourth diaphragm D4 is constituted in the vicinity of the fourth exertion point Q14, and detection elements are used to electrically detect elastic deformation of the first to the fourth diaphragms D1 to D4.

In particular, the above-described embodiment is the most efficient constitution in realizing a force sensor which is capable of independently detecting six-axis-components, that is, forces Fx, Fy, Fz in the direction of each coordinate axis and moments Mx, My, Mz around each coordinate axis, in an XYZ three-dimensional orthogonal coordinate system. To be more specific, regarding exertion points, the first exertion point Q11, the second exertion point Q12, the third exertion point Q13 and the fourth exertion point Q14 are arranged respectively at a positive domain of the X-axis, a positive domain of the Y-axis, a negative domain of the X-axis and a negative domain of the Y-axis. Further, the first diaphragm D1, the second diaphragm D2, the third diaphragm D3 and the fourth diaphragm D4 are to be positioned respectively at the positive domain of the X-axis, the positive domain of the Y-axis, the negative domain of the X-axis and the negative domain of the Y-axis.

Then, the first diaphragm D1 is connected to the force receiving ring 100B via a first connection member 431 extending along the positive domain of the X-axis, the second diaphragm D2 is connected to the force receiving ring 100B via a second connection member 432 extending along the positive domain of the Y-axis, the third diaphragm D3 is connected to the force receiving ring 100B via a third connection member 433 extending along the negative domain of the X-axis, and the fourth diaphragm D4 is connected to the force receiving ring 100B via a fourth connection member 434 extending along the negative domain of the Y-axis.

On the other hand, regarding the fixing points, it is acceptable that the V-axis is defined so as to pass through the origin O in an XYZ three-dimensional orthogonal coordinate system, a positive domain being positioned at a first quadrant of the XY-plane and a negative domain being positioned at a third quadrant of the XY-plane and to form 45 degrees with respect to the X-axis and the W-axis is defined so as to pass through the origin O in an XYZ three-dimensional orthogonal coordinate system, a positive domain being positioned at a second quadrant of the XY-plane and a negative domain being positioned at a fourth quadrant of the XY-plane and to be orthogonal to the V-axis, the first fixing point P11, the second fixing point P12, the third fixing point P13 and the fourth fixing point P14 are defined to be arranged respectively at the positive domain of the V-axis, the positive domain of the W-axis, the negative domain of the V-axis and the negative domain of the W-axis, and the detection ring 200B is fixed to the supporting substrate 300B at each of the fixing points.

Here, elastic deformation of each of the diaphragms D1 to D4 may be electrically detected by a method in which capacitive elements or others are used to measure displacement of each part or by a method in which strain gauges or others are used to measure a mechanical strain caused at each part. The force sensor shown in FIG. 37 adopts the former method, and is provided with the following device in order to measure displacement efficiently by using the capacitive elements.

First, both the force receiving ring 100B and the detection ring 200B are given circular rings arranged on the XY-plane so that the Z-axis is a central axis, and these rings are arranged so that the force receiving ring 100B is outside and the detection ring 200B is inside. Then, in order to support the fixed electrodes, a cylindrical fixed assistant body 350B whose lower surface is fixed onto the upper surface of the supporting substrate 300B, with the Z-axis being a central axis, is provided further inside the detection ring 200B.

Then, the detection elements are constituted by the following four capacitive element groups. That is:

(1) a first capacitive element group C10 composed of a plurality of capacitive elements C11 to C15 constituted by a first displacement electrode group T10 composed of a plurality of displacement electrodes T11 to T15 arranged at a first diaphragm D1 on the inner circumferential surface of the detection ring 200B and a first fixed electrode group U10 composed of a plurality of fixed electrodes U11 to U15 arranged at positions facing individual displacement electrodes of the first displacement electrode group T10 on the outer circumferential surface of the fixed assistant body 350B, (2) a second capacitive element group C20 composed of a plurality of capacitive elements C21 to C25 constituted by a second displacement electrode group T20 composed of a plurality of displacement electrodes T21 to T25 arranged at a second diaphragm D2 on the inner circumferential surface of the detection ring 200B and a second fixed electrode group U20 composed of a plurality of fixed electrodes U21 to U25 arranged at positions facing individual displacement electrodes of the second displacement electrode group T20 on the outer circumferential surface of the fixed assistant body 350B, (3) a third capacitive element group C30 composed of a plurality of capacitive elements C31 to C35 constituted by a third displacement electrode group T30 composed of a plurality of displacement electrodes T31 to T35 arranged at a third diaphragm D3 on the inner circumferential surface of the detection ring 200B and a third fixed electrode group U30 composed of a plurality of fixed electrodes U31 to U35 arranged at positions facing individual displacement electrodes of the third displacement electrode group T30 on the outer circumferential surface of the fixed assistant body 350B, and (4) a fourth capacitive element group C40 composed of a plurality of capacitive elements C41 to C45 constituted by a fourth displacement electrode group T40 composed of a plurality of displacement electrodes T41 to T45 arranged at a fourth diaphragm D4 on the inner circumferential surface of the detection ring 200B and a fourth fixed electrode group U40 composed of a plurality of fixed electrodes U41 to U45 arranged at positions facing individual displacement electrodes of the fourth displacement electrode group T40 on the outer circumferential surface of the fixed assistant body 350B.

Here, there is found such a relationship that a projection image in which one of the electrodes constituting each of the capacitive elements C11 to C45 is projected on a surface on which the other electrode is formed is included in the other electrode. Then, detection circuits are used to output a predetermined detection value on the basis of a capacitance value of each of the capacitive elements C11 to C45.

As shown in FIG. 44, electrodes of individual capacitive elements which are members of each of the capacitive element groups may be available differently as to the number, shape and arrangement pattern thereof. In the force sensor adopting the embodiment shown in FIG. 38, each of the capacitive element groups is available in the following constitution.

(1) The first capacitive element group C10 is provided with an on-axis capacitive element C15 of the first group arranged on the X-axis, a first capacitive element C11 of the first group arranged in the positive direction of the Y-axis adjacent to the on-axis capacitive element C15 of the first group, a second capacitive element C12 of the first group arranged in the negative direction of the Y-axis adjacent to the on-axis capacitive element C15 of the first group, a third capacitive element C13 of the first group arranged in the positive direction of the Z-axis adjacent to the on-axis capacitive element C15 of the first group, and a fourth capacitive element C14 of the first group arranged in the negative direction of the Z-axis adjacent to the on-axis capacitive element C15 of the first group, (2) The second capacitive element group C20 is provided with an on-axis capacitive element C25 of the second group arranged on the Y-axis, a first capacitive element C21 of the second group arranged in the positive direction of the X-axis adjacent to the on-axis capacitive element C25 of the second group, a second capacitive element C22 of the second group arranged in the negative direction of the X-axis adjacent to the on-axis capacitive element C25 of the second group, a third capacitive element C23 of the second group arranged in the positive direction of the Z-axis adjacent to the on-axis capacitive element C25 of the second group, and a fourth capacitive element C24 of the second group arranged in the negative direction of the Z-axis adjacent to the on-axis capacitive element C25 of the second group, (3) The third capacitive element group C30 is provided with an on-axis capacitive element C35 of the third group arranged on the X-axis, a first capacitive element C31 of the third group arranged in the positive direction of the Y-axis adjacent to the on-axis capacitive element C35 of the third group, a second capacitive element C32 of the third group arranged in the negative direction of the Y-axis adjacent to the on-axis capacitive element C35 of the third group, a third capacitive element C33 of the third group arranged in the positive direction of the Z-axis adjacent to the on-axis capacitive element C35 of the third group, and a fourth capacitive element C34 of the third group arranged in the negative direction of the Z-axis adjacent to the on-axis capacitive element C35 of the third group.

(4) The fourth capacitive element group C40 is provided with an on-axis capacitive element C45 of the fourth group arranged on the Y-axis, a first capacitive element C41 of the fourth group arranged in the positive direction of the X-axis adjacent to the on-axis capacitive element C45 of the fourth group, a second capacitive element C42 of the fourth group arranged in the negative direction of the X-axis adjacent to the on-axis capacitive element C45 of the fourth group, a third capacitive element C43 of the fourth group arranged in the positive direction of the Z-axis adjacent to the on-axis capacitive element C45 of the fourth group, and a fourth capacitive element C44 of the fourth group arranged in the negative direction of the Z-axis adjacent to the on-axis capacitive element C45 of the fourth group.

In the embodiment which uses the above-constituted capacitive element groups, capacitance values of the individual capacitive elements C11 to C45 are expressed as C11 to C45 by using the same symbols, by which the detection circuits are able to detect detection values of force Fx in the direction of the X-axis, force Fy in the direction of the Y-axis, force Fz in the direction of the Z-axis, moment Mx around the X-axis, moment My around the Y-axis and moment Mz around the Z-axis on the basis of the following arithmetic expressions:

$$Fx = -(C11 + C12 + C13 + C14 + C15) +$$
$$\quad (C31 + C32 + C33 + C34 + C35) \text{ or}$$
$$\quad = -(C11 + C12 + C13 + C14) +$$
$$\quad (C31 + C32 + C33 + C34) \text{ or}$$
$$\quad = -C15 + C35$$

$$Fy = -(C21 + C22 + C23 + C24 + C25) +$$
$$\quad (C41 + C42 + C43 + C44 + C45) \text{ or}$$
$$\quad = -(C21 + C22 + C23 + C24) +$$
$$\quad (C41 + C42 + C43 + C44) \text{ or}$$
$$\quad = -C25 + C45$$

$$Fz = (C13 + C23 + C33 + C43) - (C14 + C24 + C34 + C44)$$
$$Mx = (C23 + C44) - (C24 + C43)$$
$$My = (C14 + C33) - (C13 + C34)$$
$$Mz = (C11 + C21 + C32 + C42) - (C12 + C22 + C31 + C41).$$

Also in the embodiment shown in FIG. 37, at least the diaphragms D1 to D4 on the detection ring 200B are composed of a flexible conductive material, by which the surface of each of the diaphragms can be given as a common displacement electrode E0 to constitute each of the capacitive elements C11 to C45. In practice, the detection ring 200B in its entirety is constituted by a metal such as an aluminum alloy so that the diaphragms D1 to D4 thinner in thickness can be flexible. In this case, the diaphragms D1 to D4 of the detection ring 200B have functions as the displacement electrode groups T10, T20, T30, T40, thereby eliminating a necessity for providing a displacement electrode as a separate body.

<<<Section 7. Other Modification Examples>>>

Finally, a description will be given of modification examples applicable to the embodiments described above.

<7-1. Modification Example on Detection of Displacement>

In Section 3 and Section 6, a description has been given of the embodiments in which capacitive elements are used to detect displacement at predetermined sites on the detection ring. The detection elements used in detecting the displacement are not necessarily limited to capacitive elements, and any detection elements may be used as long as they are, in general, elements capable of detecting a distance.

Figure 45:
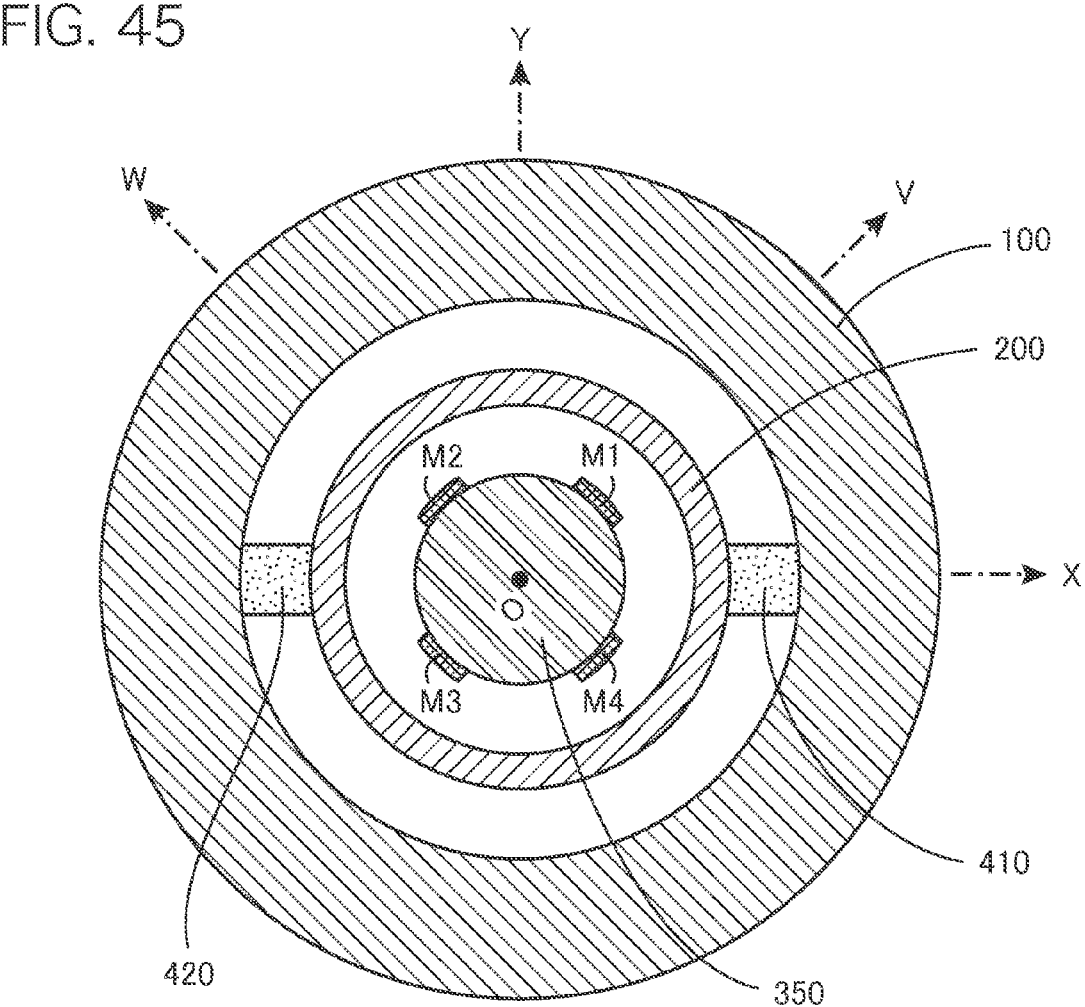
FIG. 45 is a cross sectional view in which a force sensor according to a modification example using an eddy current displacement sensor/a Hall element/a light beam distance meter is cut along the XY-plane.

FIG. 45 is a cross sectional view in which a force sensor according to a modification example having distance detection elements M1 to M4 on the V-axis and the W-axis on an outer circumferential surface of a fixed assistant body 350 is cut along the XY-plane in order to measure distances d1 to d4 at the basic structure shown in FIG. 10. Here, although an inner structure of each of the distance detection elements M1 to M4 is not shown, any elements can be used as long as it is a generally used element for detecting a distance.

Figure 46:
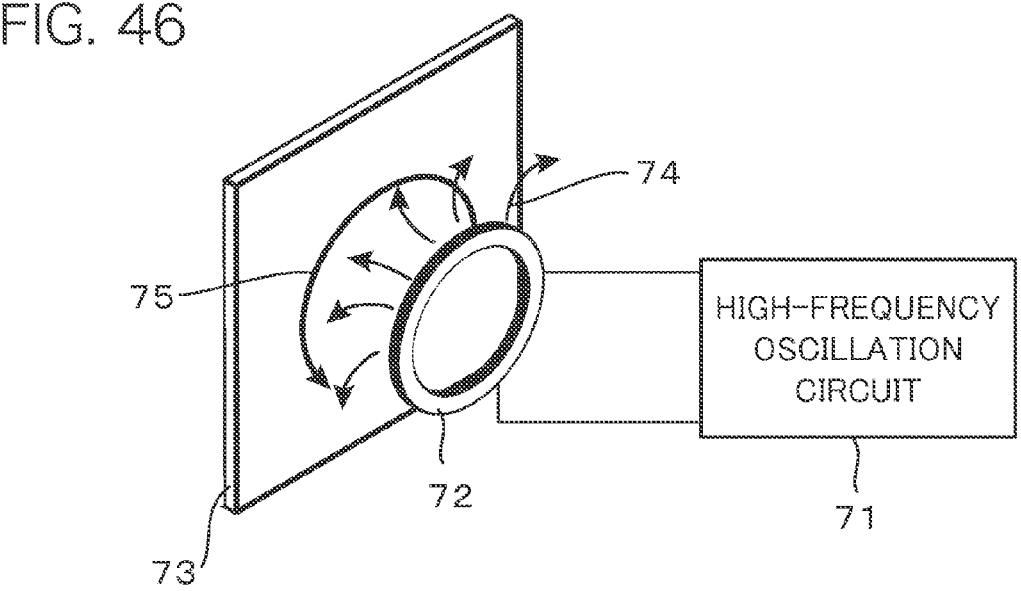
FIG. 46 shows a perspective view and a block diagram for explaining a principle of measuring a distance by using the eddy current displacement sensor.

For example, at least a measurement target surface of the detection ring 200 (an inner circumferential surface in the vicinities of the V-axis and the W-axis in the example shown in the figure) is constituted by a conductive material, by which an eddy current displacement sensor can be used as the distance detection elements M1 to M4 provided on the reference surface facing thereto. FIG. 46 is a view which shows a basic principle of measuring a distance by an eddy current displacement sensor. The eddy current displacement sensor is a device which is constituted by a high-frequency oscillation circuit 71 and a coil 72, having functions to electrically detect a distance between the coil 72 and a conductive detection object 73 arranged adjacent to the coil 72.

The following is a basic principle of detecting a distance by the eddy current displacement sensor. First, when high-frequency current is allowed to flow from the high-frequency oscillation circuit 71 to the coil 72, the coil 72 generates a high-frequency field 74. Next, eddy current 75 flows to the conductive detection object 73 due to electro-magnetic induction of the high-frequency field 74. Then, the eddy current 75 causes a change in impedance of the coil 72, thus resulting in a change in oscillation of the high-frequency oscillation circuit 71. The impedance change of the coil 72 depends on a distance between the coil 72 and the detection object 73. Therefore, a circuit for detecting a change in oscillation is provided on the high-frequency oscillation circuit 71, by which it is possible to electrically detect a distance between the coil 72 and the detection object 73.

Further, at least a measurement target surface of the detection ring 200 is constituted by a magnet, by which a Hall element can be used as distance detection elements M1 to M4 provided on a reference surface facing thereto. The Hall element is an element having functions to detect a magnetic field by the Hall effect. Therefore, as long as the measurement target surface of the detection ring 200 is constituted by a magnet, it is possible to detect displacement of the measurement target surface on the basis of variation in a magnetic field. To be more specific, the detection ring 200 in its entirety may be constituted by a magnet (in this case, it is necessary to use a magnet having a mechanical strength resistant to deformation) or a magnet may be firmly attached onto the inner circumferential surface of the detection ring 200. The magnetic field exerted on the Hall elements arranged as the distance detection elements M1 to M4 change in strength depending on displacement of the measurement target surface. Therefore, it is possible to use a detection value of the magnetic field of each of the Hall elements as a measured value of distance.

It is also possible to use a distance meter using a light beam as the distance detection elements M1 to M4. It is acceptable that, for example, a light beam irradiator for irradiating a light beam obliquely to a measurement target surface (in the example shown in the figure, an inner circumferential surface in the vicinities of the V-axis and the W-axis) and a light beam receiver for receiving the light beam reflected on the measurement target surface are fixed on a counter reference surface facing the measurement target surface (in the example of the figure, an outer circumferential surface of the fixed assistant body 350) and there is also provided a measurement circuit for outputting a measured value of distance on the basis of a light receiving position of the light beam by the light beam receiver. When the measurement target surface of the detection ring 200 (the inner circumferential surface) undergoes displacement, the light beam is changed in position of irradiation and the reflected beam is changed in direction of emission. Thereby, the light beam detected by the light beam receiver is also changed in light receiving position. Thus, the measurement circuit is able to output a measured value of distance on the basis of the light receiving position.

<7-2. Modification Example on Shape and Arrangement of Each Part>

In the embodiments which have been described above, circular ring members are used as the force receiving ring 100 and the detection ring 200. These rings are not necessarily a circular ring body but may be a loop-shaped member having an opening. They may be annular rings which are, for example, in a right octagonal, right hexagonal or square shape. They may be also annular rings in any given shape.

However, in practice, a circular ring body is preferably used as shown in the embodiments described above. Circular ring members are used as the force receiving ring 100 and the detection ring 200 and arranged concentrically, with the Z-axis being the central axis, by which the basic structure is structured to be in plane symmetry about both the XZ-plane and the YZ-plane. Here, each of the detection elements is arranged so as to be in plane symmetry about both the XZ-plane and the YZ-plane as the embodiments described above, thus making it possible to simplify signal processing by detection circuits.

For example, in the arithmetic expressions shown in FIG. 17, FIG. 20, FIG. 42, each term indicating a capacitance value is not multiplied by a coefficient. This is due to the fact that the above-described symmetry is secured. Where the detection ring 200 is constituted by an annular body in any given shape, it is necessary to multiply each term of the arithmetic expressions by a predetermined coefficient. As a result, the actual detection circuit ends up being complicated in constitution.

Further, shapes of the displacement electrode and the fixed electrode constituting a capacitive element are not limited to those shown in the embodiments described above. There may be adopted electrodes in any shape. However, as described above, in order to simplify the arithmetic expressions for obtaining detection values of individual axis components, it is preferable that an electrode forming pattern is such that which is in plane symmetry about both the XZ-plane and the YZ-plane.

<7-3. Omission Of Constituents Unnecessary for Detection>

Each of the embodiments which have been described above is such a force sensor that mainly detects six-axis-components. However, it is sufficient for the force sensor according to the present invention to have functions to detect at least force or moment with regard to one axis, among force in the direction of each coordinate axis and moment around each coordinate axis in an XYZ three-dimensional orthogonal coordinate system. Therefore, the present invention is applicable to a force sensor for detecting only force Fx exerted in the direction of the X-axis or a force sensor for detecting only moment My exerted around the Y-axis.

Therefore, in manufacturing a force sensor specialized in detecting only a particular component, it is possible to omit constituents which are not necessary for detection. For example, the force sensor shown in FIG. 37 is provided with functions to detect all the six-axis-components. However, where only force Fx exerted in the direction of the X-axis is required for detection, at least, the capacitive elements C15 and C35 will be sufficient as shown in the cell of Fx in FIG. 42. Similarly, where only moment My exerted around the Y-axis is required for detection, it is sufficient to provide only the capacitive elements C13, C14, C33, C34 as shown in the cell of My in FIG. 42.

<7-4. Combination of Disclosed Technical Ideas>

A description has been above given of technical ideas of the present invention by referring to various embodiments and also given of technical ideas on various modification examples. Many technical ideas described in the present application can be combined freely, unless special restrictive reasons are found. For example, a technical idea that an inside/outside positional relationship between the force receiving ring 100 and the detection ring 200 are reversed is applicable to the various embodiments which have been described above. Further, it is possible to use a strain gauge for detecting elastic deformation of the basic structure shown in FIG. 35 (in this case, no fixed assistant body 350B is required). It is also possible to fix the detection ring 200B via fixing members to the fixed assistant body 350B at the basic structure shown in FIG. 35.

The present application does not describe embodiments covering all and any possible combinations on the basis of various technical ideas which have been disclosed. However, a person skilled in the art is able to freely design an embodiment which is not directly disclosed in the present application by combining various technical ideas which have been disclosed in the present application.

INDUSTRIAL APPLICABILITY

The force sensor according to the present invention is optimally used in detecting force and moment for controlling motions of a robot and an industrial machine. The force sensor can be also used as a man/machine interface of an input device of electronics. This is in particular usable as a thin-type force sensor which detects six-axis-components which are force in the direction of each coordinate axis and moment around each coordinate axis in an XYZ three-dimensional orthogonal coordinate system.

The invention claimed is:
1. A force sensor detecting force or moment with regard to at least one axis, among force in a direction of each coordinate axis and moment around each coordinate axis, in an XYZ three-dimensional orthogonal coordinate system,
the force sensor comprising:
a force receiving ring which is arranged on an XY-plane so that a Z-axis is given as a central axis and receives exertions of force or moment to be detected;
a detection ring which is arranged on the XY-plane so that the Z-axis is given as a central axis and also arranged so as to be inside or outside the force receiving ring, at least a part of the detection ring undergoing elastic deformation by exertions of force or moment to be detected;
a supporting substrate which has an upper surface parallel to the XY-plane and is arranged at certain intervals below the force receiving ring and the detection ring;
a connection member which connects the detection ring to the force receiving ring at a predetermined exertion point;
a fixing member which fixes the detection ring to the supporting substrate at a predetermined fixing point;
a detection element which electrically detects elastic deformation of the detection ring; and
a detection circuit which detects a detection value of force in a predetermined coordinate axis direction or moment around a predetermined coordinate axis which is exerted on the force receiving ring, with the supporting substrate being fixed, on the basis of detection result of the detection element; wherein a projection image of the exertion point on the XY-plane and a projection image of the fixing point on the XY-plane are formed at mutually different positions;

four exertion points and four fixing points are arranged on an annular channel along a contour of the detection ring in an order of a first exertion point, a first fixing point, a second exertion point, a second fixing point, a third exertion point, a third fixing point, a fourth exertion point and a fourth fixing point;

vicinity of the first exertion point on the detection ring constitutes a first diaphragm thinner in thickness than other parts, vicinity of the second exertion point on the detection ring constitutes a second diaphragm thinner in thickness than other parts, vicinity of the third exertion point on the detection ring constitutes a third diaphragm thinner in thickness than other parts, vicinity of the fourth exertion point on the detection ring constitutes a fourth diaphragm thinner in thickness than other parts;

four connection members are respectively connected to the first to the fourth diaphragms; and the detection element electrically detects elastic deformation of the first to the fourth diaphragms.

2. The force sensor according to claim 1, wherein the first exertion point, the second exertion point, the third exertion point and the fourth exertion point are arranged respectively at a positive domain of an X-axis, a positive domain of a Y-axis, a negative domain of the X-axis and a negative domain of the Y-axis, and the first diaphragm, the second diaphragm, the third diaphragm and the fourth diaphragm are positioned respectively at the positive domain of the X-axis, the positive domain of the Y-axis, the negative domain of the X-axis and the negative domain of the Y-axis;

defining a V-axis which passes through an origin O in the XYZ three-dimensional orthogonal coordinate system, with a positive domain positioned at a first quadrant of the XY-plane and with a negative domain positioned at a third quadrant of the XY-plane, and forms 45 degrees with respect to the X-axis, and a W-axis which passes through the origin O in the XYZ three-dimensional orthogonal coordinate system, with a positive domain positioned at a second quadrant of the XY-plane and with a negative domain positioned at a fourth quadrant of the XY-plane and is orthogonal to the V-axis, the first fixing point, the second fixing point, the third fixing point and the fourth fixing point are arranged respectively at the positive domain of the V-axis, the positive domain of the W-axis, the negative domain of the V-axis and the negative domain of the W-axis; and the first diaphragm is connected to the force receiving ring via a first connection member extending along the positive domain of the X-axis, the second diaphragm is connected to the force receiving ring via a second connection member extending along the positive domain of the Y-axis, the third diaphragm is connected to the force receiving ring via a third connection member extending along the negative domain of the X-axis, and the fourth diaphragm is connected to the force receiving ring via a fourth connection member extending along the negative domain of the Y-axis.

3. The force sensor according to claim 2, wherein both the force receiving ring and the detection ring are circular rings arranged on the XY-plane so that the Z-axis is given as a central axis;

said rings are arranged so that the force receiving ring is outside and the detection ring is inside;

a cylindrical fixed assistant body whose lower surface is fixed on the upper surface of the supporting substrate, with the Z-axis being given as a central axis, is provided further inside the detection ring;

the detection element comprises:

a first capacitive element group including a plurality of capacitive elements constituted by a first displacement electrode group including a plurality of displacement electrodes arranged at a first diaphragm on an inner circumferential surface of the detection ring and a first fixed electrode group including a plurality of fixed electrodes arranged at positions facing the respective displacement electrodes of the first displacement electrode group on an outer circumferential surface of the fixed assistant body;

a second capacitive element group including a plurality of capacitive elements constituted by a second displacement electrode group including a plurality of displacement electrodes arranged at a second diaphragm on the inner circumferential surface of the detection ring and a second fixed electrode group including a plurality of fixed electrodes arranged at positions facing the respective displacement electrodes of the second displacement electrode group on the outer circumferential surface of the fixed assistant body;

a third capacitive element group including a plurality of capacitive elements constituted by a third displacement electrode group including a plurality of displacement electrodes arranged at a third diaphragm on the inner circumferential surface of the detection ring and a third fixed electrode group including a plurality of fixed electrodes arranged at positions facing the respective displacement electrodes of the third displacement electrode group on the outer circumferential surface of the fixed assistant body; and a fourth capacitive element group including a plurality of capacitive elements constituted by a fourth displacement electrode group including a plurality of displacement electrodes arranged at a fourth diaphragm on the inner circumferential surface of the detection ring and a fourth fixed electrode group including a plurality of fixed electrodes arranged at positions facing the respective displacement electrodes of the fourth displacement electrode group on the outer circumferential surface of the fixed assistant body;

a projection image of one of a pair of electrodes constituting said capacitive elements projected on a surface on which the other of said pair of electrodes is formed is included in the other electrode; and the detection circuit outputs a detection value on the basis of a capacitance value of each of the capacitive elements.

4. The force sensor according to claim 3, wherein the first capacitive element group includes an on-axis capacitive element of the first group arranged on the X-axis, a first capacitive element of the first group arranged in a positive direction of the Y-axis adjacent to the on-axis capacitive element of the first group, a second capacitive element of the first group arranged in a negative direction of the Y-axis adjacent to the on-axis capacitive element of the first group, a third capacitive element of the first group arranged in a positive direction of the Z-axis adjacent to the on-axis capacitive element of the first group, and a fourth capacitive element of the first group arranged in a negative direction of the Z-axis adjacent to the on-axis capacitive element of the first group;

the second capacitive element group includes an on-axis capacitive element of the second group arranged on the Y-axis, a first capacitive element of the second group arranged in a positive direction of the X-axis adjacent to the on-axis capacitive element of the second group, a second capacitive element of the second group arranged in a negative direction of the X-axis adjacent to the on-axis capacitive element of the second group, a third capacitive element of the second group arranged in the positive direction of the Z-axis adjacent to the on-axis capacitive element of the second group, and a fourth capacitive element of the second group arranged in the negative direction of the Z-axis adjacent to the on-axis capacitive element of the second group;

the third capacitive element group includes an on-axis capacitive element of the third group arranged on the X-axis, a first capacitive element of the third group arranged in the positive direction of the Y-axis adjacent to the on-axis capacitive element of the third group, a second capacitive element of the third group arranged in the negative direction of the Y-axis adjacent to the on-axis capacitive element of the third group, a third capacitive element of the third group arranged in the positive direction of the Z-axis adjacent to the on-axis capacitive element of the third group, and a fourth capacitive element of the third group arranged in the negative direction of the Z-axis adjacent to the on-axis capacitive element of the third group; and the fourth capacitive element group includes an on-axis capacitive element of the fourth group arranged on the Y-axis, a first capacitive element of the fourth group arranged in the positive direction of the X-axis adjacent to the on-axis capacitive element of the fourth group, a second capacitive element of the fourth group arranged in the negative direction of the X-axis adjacent to the on-axis capacitive element of the fourth group, a third capacitive element of the fourth group arranged in the positive direction of the Z-axis adjacent to the on-axis capacitive element of the fourth group, and a fourth capacitive element of the fourth group arranged in the negative direction of the Z-axis adjacent to the on-axis capacitive element of the fourth group; and when a capacitance value of the first capacitive element of the first group is given as $C11$, a capacitance value of the second capacitive element of the first group is given as $C12$, a capacitance value of the third capacitive element of the first group is given as $C13$, a capacitance value of the fourth capacitive element of the first group is given as $C14$ and a capacitance value of the on-axis capacitive element of the first group is given as $C15$;

when a capacitance value of the first capacitive element of the second group is given as $C21$, a capacitance value of the second capacitive element of the second group is given as $C22$, a capacitance value of the third capacitive element of the second group is given as $C23$, a capacitance value of the fourth capacitive element of the second group is given as $C24$, and a capacitance value of the on-axis capacitive element of the second group is given as $C25$;

when a capacitance value of the first capacitive element of the third group is given as $C31$, a capacitance value of the second capacitive element of the third group is given as $C32$, a capacitance value of the third capacitive element of the third group is given as $C33$, a capacitance value of the fourth capacitive element of the third group is given as $C34$, and a capacitance value of the on-axis capacitive element of the third group is given as $C35$; and when a capacitance value of the first capacitive element of the fourth group is given as $C41$, a capacitance value of the second capacitive element of the fourth group is given as $C42$, a capacitance value of the third capacitive element of the fourth group is given as $C43$, a capacitance value of the fourth capacitive element of the fourth group is given as $C44$, and a capacitance value of the on-axis capacitive element of the fourth group is given as $C45$;

the detection circuit outputs detection values of force Fx in a direction of the X-axis, force Fy in a direction of the Y-axis, force Fz in a direction of the Z-axis, moment Mx around the X-axis, moment My around the Y-axis, and moment Mz around the Z-axis, on the basis of the following arithmetic expressions:

$$Fx = -(C11 + C12 + C13 + C14 + C15) + (C31 + C32 + C33 + C34 + C35) \text{ or}$$
$$= -(C11 + C12 + C13 + C14) + (C31 + C32 + C33 + C34) \text{ or}$$
$$= -C15 + C35$$

$$Fy = -(C21 + C22 + C23 + C24 + C25) + (C41 + C42 + C43 + C44 + C45) \text{ or}$$
$$= -(C21 + C22 + C23 + C24) + (C41 + C42 + C43 + C44) \text{ or}$$
$$= -C25 + C45$$

$$Fz = (C13 + C23 + C33 + C43) - (C14 + C24 + C34 + C44)$$
$$Mx = (C23 + C44) - (C24 + C43)$$
$$My = (C14 + C33) - (C13 + C34)$$
$$Mz = (C11 + C21 + C32 + C42) - (C12 + C22 + C31 + C41).$$

5. The force sensor according to claim 3, wherein
at least the diaphragms of the detection ring are composed of flexible conductive material, and a surface of a diaphragm is used as a common displacement electrode to constitute each of capacitive elements.

6. The force sensor according to claim 1, wherein
a lower surface of the detection ring is connected to the upper surface of the supporting substrate via the fixing member.

7. A force sensor detecting force or moment with regard to at least one axis, among force in a direction of each coordinate axis and moment around each coordinate axis, in an XYZ three-dimensional orthogonal coordinate system,
the force sensor comprising:
a force receiving ring which is arranged on an XY-plane so that a Z-axis is given as a central axis and receives exertions of force or moment to be detected;
a detection ring which is arranged on the XY-plane so that the Z-axis is given as a central axis and also arranged so as to be inside the force receiving ring, at least a part of the detection ring undergoing elastic deformation by exertions of force or moment to be detected;
a supporting substrate which has an upper surface parallel to the XY-plane and is arranged at certain intervals below the force receiving ring and the detection ring;
a fixed assistant body whose lower surface is fixed onto the upper surface of the supporting substrate, said fixed assistant body being located further inside the detection ring;

a connection member which connects the detection ring to the force receiving ring at a predetermined exertion point;

a fixing member which fixes the detection ring to the supporting substrate at a predetermined fixing point via the fixed assistant body;

a detection element which electrically detects elastic deformation of the detection ring; and a detection circuit which detects a detection value of force in a predetermined coordinate axis direction or moment around a predetermined coordinate axis which is exerted on the force receiving ring, with the supporting substrate being fixed, on the basis of detection result of the detection element; wherein a projection image of the exertion point on the XY-plane and a projection image of the fixing point on the XY-plane are formed at mutually different positions; and an inner circumferential surface of the detection ring is connected to an outer circumferential surface of the fixed assistant body via the fixing member.

8. A force sensor detecting force or moment with regard to at least one axis, among force in a direction of each coordinate axis and moment around each coordinate axis, in an XYZ three-dimensional orthogonal coordinate system, the force sensor comprising:

a force receiving ring which is arranged on an XY-plane so that a Z-axis is given as a central axis and receives exertions of force or moment to be detected;

a detection ring which is arranged on the XY-plane so that the Z-axis is given as a central axis and also arranged so as to be inside the force receiving ring, at least a part of the detection ring undergoing elastic deformation by exertions of force or moment to be detected;

a supporting substrate which has an upper surface parallel to the XY-plane and is arranged at certain intervals below the force receiving ring and the detection ring;

a fixed assistant body whose lower surface is fixed onto the upper surface of the supporting substrate, said fixed assistant body being located further inside the detection ring;

a connection member which connects the detection ring to the force receiving ring at a predetermined exertion point;

a fixing member which fixes the detection ring to the supporting substrate at a predetermined fixing point via the fixed assistant body;

a detection element which electrically detects elastic deformation of the detection ring; and a detection circuit which detects a detection value of force in a predetermined coordinate axis direction or moment around a predetermined coordinate axis which is exerted on the force receiving ring, with the supporting substrate being fixed, on the basis of detection result of the detection element; wherein a projection image of the exertion point on the XY-plane and a projection image of the fixing point on the XY-plane are formed at mutually different positions;

an inner circumferential surface of the detection ring is connected to an outer circumferential surface of the fixed assistant body via the fixing member; and the detection element electrically detects a distance between a measurement target surface in vicinity of a predetermined measurement point on an inner circumferential surface of the detection ring and a counter reference surface positioned on an outer circumference of the fixed assistant body and facing the measurement target surface.

9. The force sensor according to claim 8, wherein
the detection element is constituted by a capacitive element having a displacement electrode provided on the measurement target surface and a fixed electrode provided on the counter reference surface.

10. The force sensor according to claim 9, wherein
the detection ring is composed of a flexible conductive material, and a surface of the detection ring is used as a common displacement electrode to constitute capacitive elements.

11. The force sensor according to claim 8, wherein
at least the measurement target surface on the detection ring is composed of a conductive material, and the detection element is constituted by an eddy current displacement sensor provided on the counter reference surface.

12. The force sensor according to claim 8, wherein
at least the measurement target surface on the detection ring is composed of a magnet, and the detection element is constituted by a Hall element provided on the counter reference surface.

13. The force sensor according to claim 8, wherein
the detection element is constituted by
a light beam irradiator which is fixed on the counter reference surface to irradiate a light beam obliquely with respect to a measurement target surface;

a light beam receiver which is fixed on the counter reference surface to receive the light beam reflected on the measurement target surface; and a measurement circuit which outputs a measured value of distance on the basis of a position at which the light beam is received by the light beam receiver.

14. The force sensor according to claim 1, comprising;
a force receiving substrate which is provided with an upper surface parallel to the XY-plane and arranged at certain intervals above the force receiving ring and the detection ring; wherein a lower surface of the force receiving substrate is partially connected to an upper surface of the force receiving ring; and a predetermined clearance is formed between the lower surface of the force receiving substrate and an upper surface of the detection ring.

15. The force sensor according to claim 14, wherein
an inclusive tubular body which includes the force receiving ring and the detection ring is connected to an outer circumference of the lower surface of the force receiving substrate, and a clearance is formed between a lower end of the inclusive tubular body and an outer circumference of the supporting substrate; and the clearance is set dimensionally in such a manner that the lower end of the inclusive tubular body is brought into contact with the outer circumference of the supporting substrate, thereby restricting displacement of the force receiving substrate, when force or moment exceeding a predetermined tolerance level is exerted on the force receiving substrate.

16. The force sensor according to claim 1, wherein
a vertically penetrating through-hole is formed at a predetermined site on the force receiving ring, and a groove larger in diameter than the through-hole is formed at a position of the through-hole on an upper surface of the force receiving ring;

a displacement control screw which is inserted through the through-hole whose leading end is fixed to the supporting substrate and whose head is accommodated into the groove is additionally provided, and a clearance is formed between the displacement control screw and inner surfaces of the through-hole and the groove; and the clearance is set dimensionally in such a manner that the displacement control screw is brought into contact with the inner surface of the through-hole or the inner surface of the groove, thereby restricting displacement of the force receiving ring, when force or moment exceeding a predetermined tolerance level is exerted on the force receiving ring.

17. The force sensor according to claim 1, wherein the force receiving ring is composed of a rigid body which does not substantially undergo deformation as long as exerting force or moment is within a predetermined tolerance level.

18. The force sensor according to claim 1, wherein both the force receiving ring and the detection ring are circular rings arranged on the XY-plane so that the Z-axis is given as a central axis.

19. The force sensor according to claim 1, wherein a detection circuit substrate which packages electronics constituting the detection circuit is provided on the upper surface of the supporting substrate.

20. A force sensor detecting force or moment with regard to at least one axis, among force in a direction of each coordinate axis and moment around each coordinate axis, in an XYZ three-dimensional orthogonal coordinate system, the force sensor comprising:

a force receiving ring which is arranged on an XY-plane so that a Z-axis is given as a central axis and receives exertions of force or moment to be detected;

a detection ring which is arranged on the XY-plane so that the Z-axis is given as a central axis and also arranged so as to be inside the force receiving ring, at least a part of the detection ring undergoing elastic deformation by exertions of force or moment to be detected;

a supporting substrate which has an upper surface parallel to the XY-plane and is arranged at certain intervals below the force receiving ring and the detection ring;

a fixed assistant body whose lower surface is fixed onto the upper surface of the supporting substrate, said fixed assistant body being located further inside the detection ring, a connection member which connects the detection ring to the force receiving ring at a predetermined exertion point;

a fixing member which fixes the detection ring to the supporting substrate at a predetermined fixing point;

a detection element which electrically detects elastic deformation of the detection ring; and a detection circuit which detects a detection value of force in a predetermined coordinate axis direction or moment around a predetermined coordinate axis which is exerted on the force receiving ring, with the supporting substrate being fixed, on the basis of detection result of the detection element; wherein a projection image of the exertion point on the XY-plane and a projection image of the fixing point on the XY-plane are formed at mutually different positions;

a first exertion point, a first fixing point, a second exertion point, and a second fixing point are arranged respectively at a positive domain of an X-axis, a positive domain of a Y-axis, a negative domain of the X-axis and a negative domain of the Y-axis;

vicinity of the first exertion point on the detection ring is connected to the force receiving ring via a first connection member extending along the positive domain of the X-axis, and vicinity of the second exertion point on the detection ring is connected to the force receiving ring via a second connection member extending along the negative domain of the X-axis;

defining a V-axis which passes through an origin O in the XYZ three-dimensional orthogonal coordinate system, with a positive domain positioned at the first quadrant of the XY-plane and with a negative domain positioned at the third quadrant of the XY-plane and forms 45 degrees with respect to the X-axis, and a W-axis which passes through the origin O in the XYZ three-dimensional orthogonal coordinate system, with a positive domain positioned at the second quadrant of the XY-plane and with a negative domain positioned at the fourth quadrant of the XY-plane and is orthogonal to the V-axis, a first measurement point, a second measurement point, a third measurement point and a fourth measurement point are arranged respectively at the positive domain of the V-axis, the positive domain of the W-axis, the negative domain of the V-axis and the negative domain of the W-axis;

both the force receiving ring and the detection ring are circular rings arranged on the XY-plane so that the Z-axis is given as a central axis, and the fixed assistant body is a cylindrical body with the Z-axis being given as a central axis;

the detection element comprises:

a first capacitive element including a first displacement electrode arranged in vicinity of the first measurement point on an inner circumferential surface of the detection ring and a first fixed electrode arranged at a position facing the first displacement electrode on an outer circumferential surface of the fixed assistant body;

a second capacitive element including a second displacement electrode arranged in vicinity of the second measurement point on the inner circumferential surface of the detection ring and a second fixed electrode arranged at a position facing the second displacement electrode on the outer circumferential surface of the fixed assistant body;

a third capacitive element including a third displacement electrode arranged in vicinity of the third measurement point on the inner circumferential surface of the detection ring and a third fixed electrode arranged at a position facing the third displacement electrode on the outer circumferential surface of the fixed assistant body;

a fourth capacitive element including a fourth displacement electrode arranged in vicinity of the fourth measurement point on the inner circumferential surface of the detection ring and a fourth fixed electrode arranged at a position facing the fourth displacement electrode on the outer circumferential surface of the fixed assistant body;

a fifth capacitive element including a fifth displacement electrode arranged in vicinity of the first measurement point on a lower surface of the detection ring and a fifth fixed electrode arranged at a position facing the fifth displacement electrode on the upper surface of the supporting substrate;

a sixth capacitive element including a sixth displacement electrode arranged in vicinity of the second measurement point on the lower surface of the detection ring and a sixth fixed electrode arranged at a position facing the sixth displacement electrode on the upper surface of the supporting substrate;

a seventh capacitive element including a seventh displacement electrode arranged in vicinity of the third measurement point on the lower surface of the detection ring and a seventh fixed electrode arranged at a position facing the seventh displacement electrode on the upper surface of the supporting substrate; and an eighth capacitive element including an eighth displacement electrode arranged in vicinity of the fourth measurement point on the lower surface of the detection ring and an eighth fixed electrode arranged at a position facing the eighth displacement electrode on the upper surface of the supporting substrate;

a projection image of one of a pair of electrodes constituting said capacitive elements projected on a surface on which the other of said pair of electrodes is formed is included in the other electrode; and when a capacitance value of the first capacitive element is given as C1, a capacitance value of the second capacitive element is given as C2, a capacitance value of the third capacitive element is given as C3, a capacitance value of the fourth capacitive element is given as C4, a capacitance value of the fifth capacitive element is given as C5, a capacitance value of the sixth capacitive element is given as C6, a capacitance value of the seventh capacitive element is given as C7, and a capacitance value of the eighth capacitive element is given as C8, the detection circuit outputs detection values of force Fx in a direction of the X-axis, force Fy in a direction of the Y-axis, force Fz in a direction of the Z-axis, moment Mx around the X-axis, moment My around the Y-axis and moment Mz around the Z-axis on the basis of the following arithmetic expressions:

$$Fx=(C1+C4)-(C2+C3)$$

$$Fy=(C3+C4)-(C1+C2)$$

$$Fz=-(C5+C6+C7+C8)$$

$$Mx=(C7+C8)-(C5+C6)$$

$$My=(C5+C8)-(C6+C7)$$

$$Mz=(C2+C4)-(C1+C3).$$

21. A force sensor detecting force or moment with regard to at least one axis, among force in a direction of each coordinate axis and moment around each coordinate axis, in an XYZ three-dimensional orthogonal coordinate system, the force sensor comprising:

a force receiving ring which is arranged on an XY-plane so that a Z-axis is given as a central axis and receives exertions of force or moment to be detected;

a detection ring which is arranged on the XY-plane so that the Z-axis is given as a central axis and also arranged so as to be inside the force receiving ring, at least a part of the detection ring undergoing elastic deformation by exertions of force or moment to be detected;

a supporting substrate which has an upper surface parallel to the XY-plane and is arranged at certain intervals below the force receiving ring and the detection ring;

a fixed assistant body whose lower surface is fixed onto the upper surface of the supporting substrate, said fixed assistant body being located further inside the detection ring;

a connection member which connects the detection ring to the force receiving ring at a predetermined exertion point;

a fixing member which fixes the detection ring to the supporting substrate at a predetermined fixing point;

a detection element which electrically detects elastic deformation of the detection ring; and a detection circuit which detects a detection value of force in a predetermined coordinate axis direction or moment around a predetermined coordinate axis which is exerted on the force receiving ring, with the supporting substrate being fixed, on the basis of detection result of the detection element; wherein a projection image of the exertion point on the XY-plane and a projection image of the fixing point on the XY-plane are formed at mutually different positions;

a first exertion point, a first fixing point, a second exertion point, and a second fixing point are arranged respectively at a positive domain of an X-axis, a positive domain of a Y-axis, a negative domain of the X-axis and a negative domain of the Y-axis;

vicinity of the first exertion point on the detection ring is connected to the force receiving ring via a first connection member extending along the positive domain of the X-axis, and vicinity of the second exertion point on the detection ring is connected to the force receiving ring via a second connection member extending along the negative domain of the X-axis;

defining a V-axis which passes through an origin O in the XYZ three-dimensional orthogonal coordinate system, with a positive domain positioned at the first quadrant of the XY-plane and with a negative domain positioned at the third quadrant of the XY-plane and forms 45 degrees with respect to the X-axis, and a W-axis which passes through the origin O in the XYZ three-dimensional orthogonal coordinate system, with a positive domain positioned at the second quadrant of the XY-plane and with a negative domain positioned at the fourth quadrant of the XY-plane and is orthogonal to the V-axis, a first measurement point, a second measurement point, a third measurement point and a fourth measurement point are arranged respectively at the positive domain of the V-axis, the positive domain of the W-axis, the negative domain of the V-axis and the negative domain of the W-axis;

both the force receiving ring and the detection ring are circular rings arranged on the XY-plane so that the Z-axis is given as a central axis, and the fixed assistant body is a cylindrical body with the Z-axis being given as a central axis;

with the first exertion point given as a fifth measurement point and the second exertion point given as a sixth measurement point, the detection element comprises:

a first capacitive element including a first displacement electrode arranged in vicinity of the first measurement point on an inner circumferential surface of the detection ring and a first fixed electrode arranged at a position facing the first displacement electrode on an outer circumferential surface of the fixed assistant body;

a second capacitive element including a second displacement electrode arranged in vicinity of the second measurement point on the inner circumferential surface of the detection ring and a second fixed electrode arranged at a position facing the second displacement electrode on the outer circumferential surface of the fixed assistant body;

a third capacitive element including a third displacement electrode arranged in vicinity of the third measurement point on the inner circumferential surface of the detection ring and a third fixed electrode arranged at a position facing the third displacement electrode on the outer circumferential surface of the fixed assistant body;

a fourth capacitive element including a fourth displacement electrode arranged in vicinity of the fourth measurement point on the inner circumferential surface of the detection ring and a fourth fixed electrode arranged at a position facing the fourth displacement electrode on the outer circumferential surface of the fixed assistant body;
a fifth capacitive element including a fifth displacement electrode arranged in vicinity of the fifth measurement point on a lower surface of the detection ring and a fifth fixed electrode arranged at a position facing the fifth displacement electrode on the upper surface of the supporting substrate; and
a sixth capacitive element including a sixth displacement electrode arranged in vicinity of the sixth measurement point on the lower surface of the detection ring and a sixth fixed electrode arranged at a position facing the sixth displacement electrode on the upper surface of the supporting substrate;
a projection image of one of a pair of electrodes constituting said capacitive elements projected on a surface on which the other of said pair of electrodes is formed is included in the other electrode; and
when a capacitance value of the first capacitive element is given as C1, a capacitance value of the second capacitive element is given as C2, a capacitance value of the third capacitive element is given as C3, a capacitance value of the fourth capacitive element is given as C4, a capacitance value of the fifth capacitive element is given as C9 and a capacitance value of the sixth capacitive element is given as C10, the detection circuit outputs detection values of force Fx in a direction of the X-axis, force Fy in a direction of the Y-axis, force Fz in a direction of the Z-axis, moment My around the Y-axis and moment Mz around the Z-axis on the basis of the following arithmetic expressions:

$Fx=(C1+C4)-(C2+C3)$ $Fy=(C3+C4)-(C1+C2)$ $Fz=-(C9+C10)$ $My=C9-C10$ $Mz=(C2+C4)-(C1+C3)$.

22. The force sensor according to claim 20, wherein the detection ring is composed of a flexible conductive material and a surface of the detection ring is used as a common displacement electrode to constitute each of the capacitive elements.

23. A force sensor detecting force or moment with regard to at least one axis, among force in a direction of each coordinate axis and moment around each coordinate axis, in an XYZ three-dimensional orthogonal coordinate system,
the force sensor comprising:
a force receiving ring which is arranged on an XY-plane so that a Z-axis is given as a central axis and receives exertions of force or moment to be detected;
a detection ring which is arranged on the XY-plane so that the Z-axis is given as a central axis and also arranged so as to be inside the force receiving ring, at least a part of the detection ring undergoing elastic deformation by exertions of force or moment to be detected;
a supporting substrate which has an upper surface parallel to the XY-plane and is arranged at certain intervals below the force receiving ring and the detection ring;
a connection member which connects the detection ring to the force receiving ring at a predetermined exertion point;
a fixing member which fixes the detection ring to the supporting substrate at a predetermined fixing point;
a detection element which electrically detects elastic deformation of the detection ring; and
a detection circuit which detects a detection value of force in a predetermined coordinate axis direction or moment around a predetermined coordinate axis which is exerted on the force receiving ring, with the supporting substrate being fixed, on the basis of detection result of the detection element; wherein
a projection image of the exertion point on the XY-plane and a projection image of the fixing point on the XY-plane are formed at mutually different positions;
a first exertion point, a first fixing point, a second exertion point, and a second fixing point are arranged respectively at a positive domain of an X-axis, a positive domain of a Y-axis, a negative domain of the X-axis and a negative domain of the Y-axis;
vicinity of the first exertion point on the detection ring is connected to the force receiving ring via a first connection member extending along the positive domain of the X-axis, and vicinity of the second exertion point on the detection ring is connected to the force receiving ring via a second connection member extending along the negative domain of the X-axis;
defining a V-axis which passes through an origin O in the XYZ three-dimensional orthogonal coordinate system, with a positive domain positioned at the first quadrant of the XY-plane and with a negative domain positioned at the third quadrant of the XY-plane and forms 45 degrees with respect to the X-axis, and a W-axis which passes through the origin O in the XYZ three-dimensional orthogonal coordinate system, with a positive domain positioned at the second quadrant of the XY-plane and with a negative domain positioned at the fourth quadrant of the XY-plane and is orthogonal to the V-axis, a first measurement point, a second measurement point, a third measurement point and a fourth measurement point are arranged respectively at the positive domain of the V-axis, the positive domain of the W-axis, the negative domain of the V-axis and the negative domain of the W-axis;
both the force receiving ring and the detection ring are circular rings arranged on the XY-plane so that the Z-axis is given as a central axis;
the detection element includes a plurality of strain gauges attached onto surfaces in vicinity of each of the first to the fourth measurement points of the detection ring so that a direction along an annular channel along a contour of the detection ring is a detection direction;
when one of an inner circumferential surface and an outer circumferential surface of the detection ring is defined as a laterally arranged surface and one of an upper surface and a lower surface of the detection ring is defined as a longitudinally arranged surface, each of the plurality of strain gauges is constituted by any one of strain gauges having the following eight attributes:
a strain gauge having a first attribute which is attached in vicinity of the first measurement point on the laterally arranged surface,
a strain gauge having a second attribute which is attached in vicinity of the second measurement point on the laterally arranged surface,
a strain gauge having a third attribute which is attached in vicinity of the third measurement point on the laterally arranged surface, a strain gauge having a fourth attribute which is attached in vicinity of the fourth measurement point on the laterally arranged surface,
a strain gauge having a fifth attribute which is attached in vicinity of the first measurement point on the longitudinally arranged surface,
a strain gauge having a sixth attribute which is attached in vicinity of the second measurement point on the longitudinally arranged surface,
a strain gauge having a seventh attribute which is attached in vicinity of the third measurement point on the longitudinally arranged surface, and
a strain gauge having an eighth attribute which is attached in vicinity of the fourth measurement point on the longitudinally arranged surface; and
a detection circuit outputs:
a detection value of force Fx in a direction of the X-axis by a Wheatstone bridge circuit in which a strain gauge having the first attribute and a strain gauge having the fourth attribute are given as first opposite sides, and a strain gauge having the second attribute and a strain gauge having the third attribute are given as second opposite sides;
a detection value of force Fy in a direction of the Y-axis by a Wheatstone bridge circuit in which a strain gauge having the first attribute and a strain gauge having the second attribute are given as first opposite sides, and a strain gauge having the third attribute and a strain gauge having the fourth attribute are given as second opposite sides;
a detection value of moment Mx around the X-axis by a Wheatstone bridge circuit in which a strain gauge having the fifth attribute and a strain gauge having the sixth attribute are given as first opposite sides, and a strain gauge having the seventh attribute and a strain gauge having the eighth attribute are given as second opposite sides;
a detection value of moment My around the Y-axis by a Wheatstone bridge circuit in which a strain gauge having the fifth attribute and a strain gauge having the eighth attribute are given as first opposite sides, and a strain gauge having the sixth attribute and a strain gauge having the seventh attribute are given as second opposite sides; and
a detection value of moment Mz around the Z-axis by a Wheatstone bridge circuit in which a strain gauge having the first attribute and a strain gauge having the third attribute are given as first opposite sides, and a strain gauge having the second attribute and a strain gauge having the fourth attribute are given as second opposite sides.

24. A force sensor detecting force or moment with regard to at least one axis, among force in a direction of each coordinate axis and moment around each coordinate axis, in an XYZ three-dimensional orthogonal coordinate system,
the force sensor comprising:
a force receiving ring which is arranged on an XY-plane so that a Z-axis is given as a central axis and receives exertions of force or moment to be detected;
a detection ring which is arranged on the XY-plane so that the Z-axis is given as a central axis and also arranged so as to be inside the force receiving ring, at least a part of the detection ring undergoing elastic deformation by exertions of force or moment to be detected;
a supporting substrate which has an upper surface parallel to the XY-plane and is arranged at certain intervals below the force receiving ring and the detection ring;
a connection member which connects the detection ring to the force receiving ring at a predetermined exertion point;
a fixing member which fixes the detection ring to the supporting substrate at a predetermined fixing point;
a detection element which electrically detects elastic deformation of the detection ring; and
a detection circuit which detects a detection value of force in a predetermined coordinate axis direction or moment around a predetermined coordinate axis which is exerted on the force receiving ring, with the supporting substrate being fixed, on the basis of detection result of the detection element; wherein
a projection image of the exertion point on the XY-plane and a projection image of the fixing point on the XY-plane are formed at mutually different positions;
a first exertion point, a first fixing point, a second exertion point, and a second fixing point are arranged respectively at a positive domain of an X-axis, a positive domain of a Y-axis, a negative domain of the X-axis and a negative domain of the Y-axis;
vicinity of the first exertion point on the detection ring is connected to the force receiving ring via a first connection member extending along the positive domain of the X-axis, and vicinity of the second exertion point on the detection ring is connected to the force receiving ring via a second connection member extending along the negative domain of the X-axis;
defining a V-axis which passes through an origin O in the XYZ three-dimensional orthogonal coordinate system, with a positive domain positioned at the first quadrant of the XY-plane and with a negative domain positioned at the third quadrant of the XY-plane and forms 45 degrees with respect to the X-axis, and a W-axis which passes through the origin O in the XYZ three-dimensional orthogonal coordinate system, with a positive domain positioned at the second quadrant of the XY-plane and with a negative domain positioned at the fourth quadrant of the XY-plane and is orthogonal to the V-axis, a first measurement point, a second measurement point, a third measurement point and a fourth measurement point are arranged respectively at the positive domain of the V-axis, the positive domain of the W-axis, the negative domain of the V-axis and the negative domain of the W-axis;
both the force receiving ring and the detection ring are circular rings arranged on the XY-plane so that the Z-axis is given as a central axis;
said rings are arranged so that the force receiving ring is outside and the detection ring is inside;
the detection elements include a plurality of strain gauges attached onto surface in vicinity of each of the first to the fourth measurement points of the detection ring so that a direction along an annular channel along a contour of the detection ring is a detection direction;
when one of an inner circumferential surface and an outer circumferential surface of the detection ring is defined as a laterally arranged surface, and one of an upper surface and a lower surface of the detection ring is defined as a first longitudinally arranged surface and the other of them is defined as a second longitudinally arranged surface, each of the plurality of strain gauges is constituted by any one of strain gauges having the following 12 different attributes:
a strain gauge having a first attribute which is attached in vicinity of the first measurement point on the laterally arranged surface, a strain gauge having a second attribute which is attached in vicinity of the second measurement point on the laterally arranged surface, a strain gauge having a third attribute which is attached in vicinity of the third measurement point on the laterally arranged surface, a strain gauge having a fourth attribute which is attached in vicinity of the fourth measurement point on the laterally arranged surface, a strain gauge having a fifth attribute which is attached in vicinity of the first measurement point on the first longitudinally arranged surface of the detection ring, a strain gauge having a sixth attribute which is attached in vicinity of the second measurement point on the first longitudinally arranged surface of the detection ring, a strain gauge having a seventh attribute which is attached in vicinity of the third measurement point on the first longitudinally arranged surface of the detection ring, a strain gauge having an eighth attribute which is attached in vicinity of the fourth measurement point on the first longitudinally arranged surface of the detection ring, a strain gauge having a ninth attribute which is attached in vicinity of the first measurement point on the second longitudinally arranged surface of the detection ring, a strain gauge having a tenth attribute which is attached in vicinity of the second measurement point on the second longitudinally arranged surface of the detection ring, a strain gauge having an eleventh attribute which is attached in vicinity of the third measurement point on the second longitudinally arranged surface of the detection ring, and a strain gauge having a twelfth attribute which is attached in vicinity of the fourth measurement point on the second longitudinally arranged surface of the detection ring; and the detection circuit outputs:

a detection value of force Fx in a direction of the X-axis by a Wheatstone bridge circuit in which a strain gauge having the first attribute and a strain gauge having the fourth attribute are given as first opposite sides, and a strain gauge having the second attribute and a strain gauge having the third attribute are given as second opposite sides;

a detection value of force Fy in a direction of the Y-axis by a Wheatstone bridge circuit in which a strain gauge having the first attribute and a strain gauge having the second attribute are given as first opposite sides, and a strain gauge having the third attribute and a strain gauge having the fourth attribute are given as second opposite sides;

a detection value of force Fz in a direction of the Z-axis by a Wheatstone bridge circuit in which a serial connection side of a strain gauge having the fifth attribute with a strain gauge having the sixth attribute and a serial connection side of a strain gauge having the seventh attribute with a strain gauge having the eighth attribute are given as first opposite sides, and a serial connection side of a strain gauge having the ninth attribute with a strain gauge having the tenth attribute and a serial connection side of a strain gauge having the eleventh attribute with a strain gauge having the twelfth attribute are given as second opposite sides;

a detection value of moment Mx around the X-axis by a Wheatstone bridge circuit in which a strain gauge having the fifth attribute and a strain gauge having the sixth attribute are given as first opposite sides, and a strain gauge having the seventh attribute and a strain gauge having the eighth attribute are given as second opposite sides;

a detection value of moment My around the Y-axis by a Wheatstone bridge circuit in which a strain gauge having the fifth attribute and a strain gauge having the eighth attribute are given as first opposite sides, and a strain gauge having the sixth attribute and a strain gauge having the seventh attribute are given as second opposite sides; and a detection value of moment Mz around the Z-axis by a Wheatstone bridge circuit in which a strain gauge having the first attribute and a strain gauge having the third attribute are given as first opposite sides, and a strain gauge having the second attribute and a strain gauge having the fourth attribute are given as second opposite sides.

25. The force sensor according to claim 4, wherein
at least the diaphragms of the detection ring are composed of flexible conductive material, and a surface of a diaphragm is used as a common displacement electrode to constitute each of capacitive elements.

26. The force sensor according to claim 21, wherein
the detection ring is composed of a flexible conductive material and a surface of the detection ring is used as a common displacement electrode to constitute each of the capacitive elements.

* * * * *